US008625496B2

(12) United States Patent
Brownrigg et al.

(10) Patent No.: US 8,625,496 B2
(45) Date of Patent: *Jan. 7, 2014

(54) WIRELESS NETWORK SYSTEM AND METHOD FOR PROVIDING SAME

(75) Inventors: Edwin B. Brownrigg, Roseville, CA (US); Thomas W. Wilson, Alameda, CA (US)

(73) Assignee: IPCO, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,913

(22) Filed: May 23, 2012

(65) Prior Publication Data

US 2012/0236792 A1    Sep. 20, 2012

Related U.S. Application Data

(63) Continuation of application No. 12/482,892, filed on Jun. 11, 2009, now Pat. No. 8,233,471, which is a continuation of application No. 11/300,902, filed on Dec. 15, 2005, now Pat. No. 8,000,314, which is a continuation of application No. 10/386,159, filed on Mar. 10, 2003, now Pat. No. 7,054,271, which is a continuation of application No. 09/492,933, filed on Jan. 27, 2000, now abandoned, which is a continuation of application No. 08/760,895, filed on Dec. 6, 1996, now Pat. No. 6,044,062.

(51) Int. Cl.
*H04W 4/00* (2009.01)

(52) U.S. Cl.
USPC ......................................... 370/328; 455/11.1

(58) Field of Classification Search
None
See application file for complete search history.

(56) References Cited

U.S. PATENT DOCUMENTS

| 3,665,475 A | 5/1972 | Gram |
| 3,705,385 A | 12/1972 | Batz |
| 3,723,876 A | 3/1973 | Seaborn, Jr. |
| 3,742,142 A | 6/1973 | Martin |
| 3,768,014 A | 10/1973 | Smith |
| 3,769,965 A | 11/1973 | Raddi et al. |

(Continued)

FOREIGN PATENT DOCUMENTS

| CA | 945277 | 4/1974 |
| CA | 2324563 | 9/1999 |

(Continued)

OTHER PUBLICATIONS

"Wayport's Value Proposition: To provide the industry's best high-speed Internet and business center experience for the airport passenger to stay productive," http://www.wayport.net/airportsoverview (visited Jul. 29, 2003) (2 pages).

"Welcome to UtiliNet: A Wireless Data Communications Solution from Metricom, Inc.," Author: unknown, available at http://web.archive.org/web/199806028045812/www.metricom.com/industrial/utilinet.html on May 10, 2010, pp. 1-10.

"What's Behind Ricochet: A Network Overview," Author: unknown, available at http://web.archive.org/web/20000815090824/www.ricochet.com/ricochet_advantage/tech_overview.html, Aug. 15, 2000, pp. 1-4.

(Continued)

*Primary Examiner* — Yong Zhou
(74) *Attorney, Agent, or Firm* — Dustin B. Weeks, Esq.; Troutman Sanders LLP

(57) ABSTRACT

A wireless network, which includes a wireless router client operable to broadcast data packets to at least one wireless server and one additional wireless client. Each client and server includes programs for determining optimum routes between them. The client also includes a program for determining if a received data packet is not addressed to it and if the packet has been sent via a new optimal route unknown to the client, and for notifying the respective server of such a new optimal route.

45 Claims, 42 Drawing Sheets

(56) References Cited

U.S. PATENT DOCUMENTS

| | | |
|---|---|---|
| 3,848,231 A | 11/1974 | Wootton |
| 3,885,552 A | 5/1975 | Kennedy |
| 3,892,948 A | 7/1975 | Constable |
| 3,906,460 A | 9/1975 | Halpern |
| 3,914,692 A | 10/1975 | Seaborn, Jr. |
| 3,922,492 A | 11/1975 | Lumsden |
| 3,925,763 A | 12/1975 | Wadhwani et al. |
| 4,025,315 A | 5/1977 | Mazelli |
| 4,056,684 A | 11/1977 | Lindstrom |
| 4,058,672 A | 11/1977 | Crager et al. |
| 4,083,003 A | 4/1978 | Haemmig |
| 4,120,452 A | 10/1978 | Kimura et al. |
| 4,124,839 A | 11/1978 | Cohen |
| 4,135,181 A | 1/1979 | Bogacki et al. |
| 4,204,195 A | 5/1980 | Bogacki |
| 4,213,119 A | 7/1980 | Ward et al. |
| 4,277,837 A | 7/1981 | Stuckert |
| 4,278,975 A | 7/1981 | Kimura et al. |
| 4,284,852 A | 8/1981 | Szybicki et al. |
| 4,322,842 A | 3/1982 | Martinez |
| 4,345,116 A | 8/1982 | Ash et al. |
| 4,354,181 A | 10/1982 | Spletzer |
| 4,395,780 A | 7/1983 | Gohm et al. |
| 4,396,910 A | 8/1983 | Enemark et al. |
| 4,396,915 A | 8/1983 | Farnsworth et al. |
| 4,399,531 A | 8/1983 | Grande et al. |
| 4,406,016 A | 9/1983 | Abrams et al. |
| 4,417,450 A | 11/1983 | Morgan, Jr. et al. |
| 4,436,957 A | 3/1984 | Mazza et al. |
| 4,446,454 A | 5/1984 | Pyle |
| 4,446,458 A | 5/1984 | Cook |
| 4,454,414 A | 6/1984 | Benton |
| 4,468,656 A | 8/1984 | Clifford et al. |
| 4,488,152 A | 12/1984 | Arnason et al. |
| 4,495,496 A | 1/1985 | Miller, III |
| 4,551,719 A | 11/1985 | Carlin et al. |
| 4,611,198 A | 9/1986 | Levinson et al. |
| 4,621,263 A | 11/1986 | Takenaka et al. |
| 4,630,035 A | 12/1986 | Stahl et al. |
| 4,631,357 A | 12/1986 | Grunig |
| 4,665,519 A | 5/1987 | Kirchner et al. |
| 4,669,113 A | 5/1987 | Ash et al. |
| 4,670,739 A | 6/1987 | Kelly, Jr. |
| 4,692,761 A | 9/1987 | Robinton |
| 4,704,724 A | 11/1987 | Krishnan et al. |
| 4,707,852 A | 11/1987 | Jahr et al. |
| 4,731,810 A | 3/1988 | Watkins |
| 4,742,296 A | 5/1988 | Petr et al. |
| 4,757,185 A | 7/1988 | Onishi |
| 4,788,721 A | 11/1988 | Krishnan et al. |
| 4,792,946 A | 12/1988 | Mayo |
| 4,799,059 A | 1/1989 | Grindahl et al. |
| 4,800,543 A | 1/1989 | Lyndon-James et al. |
| 4,814,763 A | 3/1989 | Nelson et al. |
| 4,825,457 A | 4/1989 | Lebowitz |
| 4,829,561 A | 5/1989 | Matheny |
| 4,849,815 A | 7/1989 | Streck |
| 4,851,654 A | 7/1989 | Nitta |
| 4,856,046 A | 8/1989 | Streck et al. |
| 4,857,912 A | 8/1989 | Everett, Jr. et al. |
| 4,864,559 A | 9/1989 | Perlman |
| 4,875,231 A | 10/1989 | Hara et al. |
| 4,884,123 A | 11/1989 | Dixit et al. |
| 4,884,132 A | 11/1989 | Morris et al. |
| 4,897,644 A | 1/1990 | Hirano |
| 4,906,828 A | 3/1990 | Halpern |
| 4,908,769 A | 3/1990 | Vaughan et al. |
| 4,912,656 A | 3/1990 | Cain et al. |
| 4,918,432 A | 4/1990 | Pauley |
| 4,918,690 A | 4/1990 | Markkula, Jr. et al. |
| 4,918,995 A | 4/1990 | Pearman et al. |
| 4,924,462 A | 5/1990 | Sojka |
| 4,928,299 A | 5/1990 | Tansky et al. |
| 4,939,726 A | 7/1990 | Flammer et al. |
| 4,940,976 A | 7/1990 | Gastouniotis et al. |
| 4,949,077 A | 8/1990 | Mbuthia |
| 4,952,928 A | 8/1990 | Carroll et al. |
| 4,962,496 A | 10/1990 | Vercellotti et al. |
| 4,967,366 A | 10/1990 | Kaehler |
| 4,968,970 A | 11/1990 | LaPorte |
| 4,968,978 A | 11/1990 | Stolarczyk |
| 4,972,504 A | 11/1990 | Daniel, Jr. et al. |
| 4,973,957 A | 11/1990 | Shimizu et al. |
| 4,973,970 A | 11/1990 | Reeser |
| 4,977,612 A | 12/1990 | Wilson |
| 4,980,907 A | 12/1990 | Raith et al. |
| 4,987,536 A | 1/1991 | Humblet |
| 4,989,230 A | 1/1991 | Gillig et al. |
| 4,991,008 A | 2/1991 | Nama |
| 4,993,059 A | 2/1991 | Smith et al. |
| 4,998,095 A | 3/1991 | Shields |
| 4,999,607 A | 3/1991 | Evans |
| 5,007,052 A | 4/1991 | Flammer |
| 5,032,833 A | 7/1991 | Laporte |
| 5,038,372 A | 8/1991 | Elms et al. |
| 5,055,851 A | 10/1991 | Sheffer |
| 5,057,814 A | 10/1991 | Onan et al. |
| 5,061,997 A | 10/1991 | Rea et al. |
| 5,079,768 A | 1/1992 | Flammer |
| 5,086,391 A | 2/1992 | Chambers |
| 5,088,032 A | 2/1992 | Bosack |
| 5,091,713 A | 2/1992 | Horne et al. |
| 5,111,199 A | 5/1992 | Tomoda et al. |
| 5,113,183 A | 5/1992 | Mizuno et al. |
| 5,113,184 A | 5/1992 | Katayama |
| 5,115,224 A | 5/1992 | Kostusiak et al. |
| 5,115,433 A | 5/1992 | Baran et al. |
| 5,117,422 A | 5/1992 | Hauptschein et al. |
| 5,124,624 A | 6/1992 | de Vries et al. |
| 5,128,855 A | 7/1992 | Hilber et al. |
| 5,130,519 A | 7/1992 | Bush et al. |
| 5,130,987 A | 7/1992 | Flammer |
| 5,131,038 A | 7/1992 | Puhl et al. |
| 5,134,650 A | 7/1992 | Blackmon |
| 5,136,285 A | 8/1992 | Okuyama |
| 5,138,615 A | 8/1992 | Lamport et al. |
| 5,155,481 A | 10/1992 | Brennan, Jr. et al. |
| 5,159,317 A | 10/1992 | Brav |
| 5,159,592 A | 10/1992 | Perkins |
| 5,162,776 A | 11/1992 | Bushnell et al. |
| 5,170,393 A | 12/1992 | Peterson et al. |
| 5,177,342 A | 1/1993 | Adams |
| 5,189,287 A | 2/1993 | Parienti |
| 5,191,192 A | 3/1993 | Takahira et al. |
| 5,191,326 A | 3/1993 | Montgomery |
| 5,193,111 A | 3/1993 | Matty et al. |
| 5,195,018 A | 3/1993 | Kwon et al. |
| 5,197,095 A | 3/1993 | Bonnet et al. |
| 5,200,735 A | 4/1993 | Hines |
| 5,204,670 A | 4/1993 | Stinton |
| 5,212,645 A | 5/1993 | Wildes et al. |
| 5,216,502 A | 6/1993 | Katz |
| 5,221,838 A | 6/1993 | Gutman et al. |
| 5,223,844 A | 6/1993 | Mansell et al. |
| 5,224,468 A | 7/1993 | Simon et al. |
| 5,231,658 A | 7/1993 | Eftechiou |
| 5,235,630 A | 8/1993 | Moody et al. |
| 5,239,294 A | 8/1993 | Flanders et al. |
| 5,239,575 A | 8/1993 | White et al. |
| 5,241,410 A | 8/1993 | Streck et al. |
| 5,243,338 A | 9/1993 | Brennan, Jr. et al. |
| 5,245,633 A | 9/1993 | Schwartz et al. |
| 5,251,205 A | 10/1993 | Callon et al. |
| 5,252,967 A | 10/1993 | Brennan et al. |
| 5,253,167 A | 10/1993 | Yoshida et al. |
| 5,265,150 A | 11/1993 | Helmkamp et al. |
| 5,265,162 A | 11/1993 | Bush et al. |
| 5,266,782 A | 11/1993 | Alanara et al. |
| 5,272,747 A | 12/1993 | Meads |
| 5,276,680 A | 1/1994 | Messenger |
| 5,282,204 A | 1/1994 | Shpancer et al. |
| 5,282,250 A | 1/1994 | Dent et al. |
| 5,289,165 A | 2/1994 | Belin |
| 5,289,362 A | 2/1994 | Liebl et al. |

(56) References Cited

U.S. PATENT DOCUMENTS

| | | |
|---|---|---|
| 5,291,516 A | 3/1994 | Dixon et al. |
| 5,295,154 A | 3/1994 | Meier et al. |
| 5,305,370 A | 4/1994 | Kearns et al. |
| 5,309,501 A | 5/1994 | Kozik et al. |
| 5,315,645 A | 5/1994 | Matheny |
| 5,317,309 A | 5/1994 | Vercellotti et al. |
| 5,319,364 A | 6/1994 | Waraksa et al. |
| 5,319,698 A | 6/1994 | Glidewell et al. |
| 5,319,711 A | 6/1994 | Servi |
| 5,321,618 A | 6/1994 | Gessman |
| 5,323,384 A | 6/1994 | Norwood et al. |
| 5,325,429 A | 6/1994 | Kurgan |
| 5,329,394 A | 7/1994 | Calvani et al. |
| 5,331,318 A | 7/1994 | Montgomery |
| 5,334,974 A | 8/1994 | Simms et al. |
| 5,335,265 A | 8/1994 | Cooper et al. |
| 5,343,493 A | 8/1994 | Karimullah |
| 5,344,068 A | 9/1994 | Haessig |
| 5,345,231 A | 9/1994 | Koo et al. |
| 5,345,595 A | 9/1994 | Johnson et al. |
| 5,347,263 A | 9/1994 | Carroll et al. |
| 5,352,278 A | 10/1994 | Korver et al. |
| 5,354,974 A | 10/1994 | Eisenberg |
| 5,355,278 A | 10/1994 | Hosoi et al. |
| 5,355,513 A | 10/1994 | Clarke et al. |
| 5,365,217 A | 11/1994 | Toner |
| 5,371,736 A | 12/1994 | Evan |
| 5,382,778 A | 1/1995 | Takahira et al. |
| 5,383,134 A | 1/1995 | Wrzesinski |
| 5,383,187 A | 1/1995 | Vardakas et al. |
| 5,390,206 A | 2/1995 | Rein et al. |
| 5,406,619 A | 4/1995 | Akhteruzzaman et al. |
| 5,412,192 A | 5/1995 | Hoss |
| 5,412,654 A | 5/1995 | Perkins |
| 5,412,760 A | 5/1995 | Peitz |
| 5,416,475 A | 5/1995 | Tolbert et al. |
| 5,416,725 A | 5/1995 | Pacheco et al. |
| 5,418,812 A | 5/1995 | Reyes et al. |
| 5,420,910 A | 5/1995 | Rudokas et al. |
| 5,424,708 A | 6/1995 | Ballesty et al. |
| 5,430,729 A | 7/1995 | Rahnema |
| 5,432,507 A | 7/1995 | Mussino et al. |
| 5,438,329 A | 8/1995 | Gastouniotis et al. |
| 5,439,414 A | 8/1995 | Jacob |
| 5,440,545 A | 8/1995 | Buchholz et al. |
| 5,442,553 A | 8/1995 | Parrillo |
| 5,442,633 A | 8/1995 | Perkins et al. |
| 5,445,287 A | 8/1995 | Center et al. |
| 5,445,347 A | 8/1995 | Ng |
| 5,448,230 A | 9/1995 | Schanker et al. |
| 5,451,929 A | 9/1995 | Adelman et al. |
| 5,451,938 A | 9/1995 | Brennan, Jr. |
| 5,452,344 A | 9/1995 | Larson |
| 5,454,024 A | 9/1995 | Lebowitz |
| 5,455,569 A | 10/1995 | Sherman et al. |
| 5,465,401 A | 11/1995 | Thompson |
| 5,467,074 A | 11/1995 | Pedtke |
| 5,467,082 A | 11/1995 | Sanderson |
| 5,467,345 A | 11/1995 | Cutler, Jr. et al. |
| 5,468,948 A | 11/1995 | Koenck et al. |
| 5,471,201 A | 11/1995 | Cerami et al. |
| 5,473,322 A | 12/1995 | Carney |
| 5,475,689 A | 12/1995 | Kay et al. |
| 5,479,400 A | 12/1995 | Dilworth et al. |
| 5,481,259 A | 1/1996 | Bane |
| 5,481,532 A | 1/1996 | Hassan et al. |
| 5,484,997 A | 1/1996 | Haynes |
| 5,488,608 A | 1/1996 | Flammer, III |
| 5,493,273 A | 2/1996 | Smurlo et al. |
| 5,493,287 A | 2/1996 | Bane |
| 5,502,726 A | 3/1996 | Fischer |
| 5,504,746 A | 4/1996 | Meier |
| 5,506,837 A | 4/1996 | Sollner et al. |
| 5,508,412 A | 4/1996 | Kast et al. |
| 5,509,073 A | 4/1996 | Monnin |
| 5,513,244 A | 4/1996 | Joao et al. |
| 5,515,419 A | 5/1996 | Sheffer |
| 5,517,188 A | 5/1996 | Carroll et al. |
| 5,522,089 A | 5/1996 | Kikinis et al. |
| 5,528,215 A | 6/1996 | Siu et al. |
| 5,528,507 A | 6/1996 | McNamara et al. |
| 5,539,825 A | 7/1996 | Akiyama et al. |
| 5,541,938 A | 7/1996 | Di Zenzo et al. |
| 5,542,100 A | 7/1996 | Hatakeyama |
| 5,544,036 A | 8/1996 | Brown, Jr. et al. |
| 5,544,322 A | 8/1996 | Cheng et al. |
| 5,544,784 A | 8/1996 | Malaspina |
| 5,548,632 A | 8/1996 | Walsh et al. |
| 5,550,358 A | 8/1996 | Tait et al. |
| 5,550,359 A | 8/1996 | Bennett |
| 5,550,535 A | 8/1996 | Park |
| 5,553,094 A | 9/1996 | Johnson et al. |
| 5,555,258 A | 9/1996 | Snelling et al. |
| 5,555,286 A | 9/1996 | Tendler |
| 5,557,320 A | 9/1996 | Krebs |
| 5,557,748 A | 9/1996 | Norris |
| 5,562,537 A | 10/1996 | Zver et al. |
| 5,565,857 A | 10/1996 | Lee |
| 5,568,535 A | 10/1996 | Sheffer et al. |
| 5,570,084 A | 10/1996 | Ritter et al. |
| 5,572,438 A | 11/1996 | Ehlers et al. |
| 5,572,528 A | 11/1996 | Shuen |
| 5,573,181 A | 11/1996 | Ahmed |
| 5,574,111 A | 11/1996 | Brichta et al. |
| 5,583,850 A | 12/1996 | Snodgrass et al. |
| 5,583,914 A | 12/1996 | Chang et al. |
| 5,587,705 A | 12/1996 | Morris |
| 5,588,005 A | 12/1996 | Ali et al. |
| 5,589,878 A | 12/1996 | Cortjens et al. |
| 5,590,038 A | 12/1996 | Pitroda |
| 5,590,179 A | 12/1996 | Shincovich et al. |
| 5,592,491 A | 1/1997 | Dinkins |
| 5,594,431 A | 1/1997 | Sheppard et al. |
| 5,596,719 A | 1/1997 | Ramakrishnan et al. |
| 5,596,722 A | 1/1997 | Rahnema |
| 5,602,843 A | 2/1997 | Gray |
| 5,604,414 A | 2/1997 | Milligan et al. |
| 5,604,869 A | 2/1997 | Mincher et al. |
| 5,606,361 A | 2/1997 | Davidsohn et al. |
| 5,608,721 A | 3/1997 | Natarajan et al. |
| 5,608,786 A | 3/1997 | Gordon |
| 5,613,620 A | 3/1997 | Center et al. |
| 5,615,227 A | 3/1997 | Schumacher, Jr. et al. |
| 5,615,277 A | 3/1997 | Hoffman |
| 5,617,084 A | 4/1997 | Sears |
| 5,619,192 A | 4/1997 | Ayala |
| 5,623,495 A | 4/1997 | Eng et al. |
| 5,625,410 A | 4/1997 | Washino et al. |
| 5,628,050 A | 5/1997 | McGraw et al. |
| 5,629,687 A | 5/1997 | Sutton et al. |
| 5,629,875 A | 5/1997 | Adair, Jr. |
| 5,630,209 A | 5/1997 | Wizgall et al. |
| 5,631,554 A | 5/1997 | Briese et al. |
| 5,636,216 A | 6/1997 | Fox et al. |
| 5,640,002 A | 6/1997 | Ruppert et al. |
| 5,644,294 A | 7/1997 | Ness |
| 5,655,219 A | 8/1997 | Jusa et al. |
| 5,657,389 A | 8/1997 | Houvener |
| 5,659,300 A | 8/1997 | Dresselhuys et al. |
| 5,659,303 A | 8/1997 | Adair, Jr. |
| 5,668,876 A | 9/1997 | Falk et al. |
| 5,673,252 A | 9/1997 | Johnson et al. |
| 5,673,259 A | 9/1997 | Quick, Jr. |
| 5,673,304 A | 9/1997 | Connor et al. |
| 5,673,305 A | 9/1997 | Ross |
| 5,682,139 A | 10/1997 | Pradeep et al. |
| 5,682,476 A | 10/1997 | Tapperson et al. |
| 5,689,229 A | 11/1997 | Chaco et al. |
| 5,691,980 A | 11/1997 | Welles, II et al. |
| 5,696,695 A | 12/1997 | Ehlers et al. |
| 5,699,328 A | 12/1997 | Ishizaki et al. |
| 5,701,002 A | 12/1997 | Oishi et al. |
| 5,702,059 A | 12/1997 | Chu et al. |
| 5,704,046 A | 12/1997 | Hogan |

(56) References Cited

U.S. PATENT DOCUMENTS

| | | |
|---|---|---|
| 5,704,517 A | 1/1998 | Lancaster, Jr. |
| 5,706,191 A | 1/1998 | Bassett et al. |
| 5,706,976 A | 1/1998 | Purkey |
| 5,708,223 A | 1/1998 | Wyss |
| 5,708,655 A | 1/1998 | Toth et al. |
| 5,712,619 A | 1/1998 | Simkin |
| 5,712,980 A | 1/1998 | Beeler et al. |
| 5,714,931 A | 2/1998 | Petite et al. |
| 5,717,718 A | 2/1998 | Rowsell et al. |
| 5,719,564 A | 2/1998 | Sears |
| 5,722,076 A | 2/1998 | Sakabe et al. |
| 5,726,534 A | 3/1998 | Seo |
| 5,726,544 A | 3/1998 | Lee |
| 5,726,634 A | 3/1998 | Hess et al. |
| 5,726,644 A | 3/1998 | Jednacz et al. |
| 5,726,984 A | 3/1998 | Kubler et al. |
| 5,732,074 A | 3/1998 | Spaur et al. |
| 5,732,078 A | 3/1998 | Arango |
| 5,736,965 A | 4/1998 | Mosebrook et al. |
| 5,737,318 A | 4/1998 | Melnik |
| 5,740,232 A | 4/1998 | Pailles et al. |
| 5,740,366 A | 4/1998 | Mahany et al. |
| 5,742,509 A | 4/1998 | Goldberg et al. |
| 5,745,849 A | 4/1998 | Britton |
| 5,748,104 A | 5/1998 | Argyroudis et al. |
| 5,748,619 A | 5/1998 | Meier |
| 5,754,111 A | 5/1998 | Garcia |
| 5,754,227 A | 5/1998 | Fukuoka |
| 5,757,783 A | 5/1998 | Eng et al. |
| 5,757,788 A | 5/1998 | Tatsumi et al. |
| 5,760,742 A | 6/1998 | Branch et al. |
| 5,761,083 A | 6/1998 | Brown, Jr. et al. |
| 5,764,742 A | 6/1998 | Howard et al. |
| 5,767,791 A | 6/1998 | Stoop et al. |
| 5,771,274 A | 6/1998 | Harris |
| 5,774,052 A | 6/1998 | Hamm et al. |
| 5,781,143 A | 7/1998 | Rossin |
| 5,790,644 A | 8/1998 | Kikinis |
| 5,790,662 A | 8/1998 | Valerij et al. |
| 5,790,938 A | 8/1998 | Talarmo |
| 5,796,727 A | 8/1998 | Harrison et al. |
| 5,798,964 A | 8/1998 | Shimizu et al. |
| 5,801,643 A | 9/1998 | Williams et al. |
| 5,812,531 A | 9/1998 | Cheung et al. |
| 5,815,505 A | 9/1998 | Mills |
| 5,818,822 A | 10/1998 | Thomas et al. |
| 5,822,273 A | 10/1998 | Bary et al. |
| 5,822,309 A | 10/1998 | Ayanoglu et al. |
| 5,822,544 A | 10/1998 | Chaco et al. |
| 5,825,772 A | 10/1998 | Dobbins et al. |
| 5,826,195 A | 10/1998 | Westerlage et al. |
| 5,828,044 A | 10/1998 | Jun et al. |
| 5,832,057 A | 11/1998 | Furman |
| 5,838,223 A | 11/1998 | Gallant et al. |
| 5,838,237 A | 11/1998 | Revell et al. |
| 5,838,812 A | 11/1998 | Pare, Jr. et al. |
| 5,841,118 A | 11/1998 | East et al. |
| 5,841,764 A | 11/1998 | Roderique et al. |
| 5,842,976 A | 12/1998 | Williamson |
| 5,844,808 A | 12/1998 | Konsmo et al. |
| 5,845,230 A | 12/1998 | Lamberson |
| 5,848,054 A | 12/1998 | Mosebrook et al. |
| 5,852,658 A | 12/1998 | Knight et al. |
| 5,854,994 A | 12/1998 | Canada et al. |
| 5,856,974 A | 1/1999 | Gervais et al. |
| 5,862,201 A | 1/1999 | Sands |
| 5,864,772 A | 1/1999 | Alvarado et al. |
| 5,867,688 A | 2/1999 | Donahue |
| 5,870,686 A | 2/1999 | Monson |
| 5,872,773 A | 2/1999 | Katzela et al. |
| 5,873,043 A | 2/1999 | Comer |
| 5,874,903 A | 2/1999 | Shuey et al. |
| 5,875,185 A | 2/1999 | Wang et al. |
| 5,880,677 A | 3/1999 | Lestician |
| 5,883,884 A | 3/1999 | Atkinson |
| 5,883,886 A | 3/1999 | Eaton et al. |
| 5,884,184 A | 3/1999 | Sheffer |
| 5,884,271 A | 3/1999 | Pitroda |
| 5,886,333 A | 3/1999 | Miyake |
| 5,889,468 A | 3/1999 | Banga |
| 5,892,690 A | 4/1999 | Boatman et al. |
| 5,892,758 A | 4/1999 | Argyrouis |
| 5,892,924 A | 4/1999 | Lyon et al. |
| 5,896,097 A | 4/1999 | Cardozo |
| 5,897,607 A | 4/1999 | Jenney et al. |
| 5,898,369 A | 4/1999 | Godwin |
| 5,898,733 A | 4/1999 | Satyanarayana |
| 5,905,438 A | 5/1999 | Weiss et al. |
| 5,905,442 A | 5/1999 | Mosebrook et al. |
| 5,907,291 A | 5/1999 | Chen et al. |
| 5,907,491 A | 5/1999 | Canada et al. |
| 5,907,540 A | 5/1999 | Hayashi |
| 5,907,807 A | 5/1999 | Chavez, Jr. et al. |
| 5,909,429 A | 6/1999 | Satyanarayana et al. |
| 5,914,656 A | 6/1999 | Ojala et al. |
| 5,914,672 A | 6/1999 | Glorioso et al. |
| 5,914,673 A | 6/1999 | Jennings et al. |
| 5,917,405 A | 6/1999 | Joao |
| 5,917,629 A | 6/1999 | Hortensius et al. |
| 5,923,269 A | 7/1999 | Shuey et al. |
| 5,926,101 A | 7/1999 | Dasgupta |
| 5,926,103 A | 7/1999 | Petite |
| 5,926,529 A | 7/1999 | Hache et al. |
| 5,926,531 A | 7/1999 | Petite |
| 5,933,073 A | 8/1999 | Shuey |
| 5,940,771 A | 8/1999 | Gollnick et al. |
| 5,941,363 A | 8/1999 | Partyka et al. |
| 5,941,955 A | 8/1999 | Wilby et al. |
| 5,946,631 A | 8/1999 | Melnik |
| 5,948,040 A | 9/1999 | DeLorme et al. |
| 5,949,779 A | 9/1999 | Mostafa et al. |
| 5,949,799 A | 9/1999 | Grivna et al. |
| 5,953,319 A | 9/1999 | Dutta et al. |
| 5,953,371 A | 9/1999 | Rowsell et al. |
| 5,953,507 A | 9/1999 | Cheung et al. |
| 5,955,718 A | 9/1999 | Levasseur et al. |
| 5,957,718 A | 9/1999 | Cheng et al. |
| 5,960,074 A | 9/1999 | Clark |
| 5,963,146 A | 10/1999 | Johnson et al. |
| 5,963,452 A | 10/1999 | Etoh et al. |
| 5,963,650 A | 10/1999 | Simionescu et al. |
| 5,966,658 A | 10/1999 | Kennedy, III et al. |
| 5,969,608 A | 10/1999 | Sojdehei et al. |
| 5,973,756 A | 10/1999 | Erlin |
| 5,974,236 A | 10/1999 | Sherman |
| 5,978,364 A | 11/1999 | Melnik |
| 5,978,371 A | 11/1999 | Mason, Jr. et al. |
| 5,978,578 A | 11/1999 | Azarya et al. |
| 5,986,574 A | 11/1999 | Colton |
| 5,987,011 A | 11/1999 | Toh |
| 5,987,331 A | 11/1999 | Grube et al. |
| 5,987,421 A | 11/1999 | Chuang |
| 5,991,625 A | 11/1999 | Vanderpool |
| 5,991,639 A | 11/1999 | Rautiola et al. |
| 5,994,892 A | 11/1999 | Turino et al. |
| 5,995,022 A | 11/1999 | Plis et al. |
| 5,995,592 A | 11/1999 | Shirai et al. |
| 5,995,593 A | 11/1999 | Cho |
| 5,997,170 A | 12/1999 | Brodbeck |
| 5,999,094 A | 12/1999 | Nilssen |
| 6,005,759 A | 12/1999 | Hart et al. |
| 6,005,884 A | 12/1999 | Cook et al. |
| 6,005,963 A | 12/1999 | Bolle et al. |
| 6,018,659 A | 1/2000 | Ayyagari et al. |
| 6,021,664 A | 2/2000 | Granato et al. |
| 6,023,223 A | 2/2000 | Baxter, Jr. |
| 6,026,095 A | 2/2000 | Sherer et al. |
| 6,028,522 A | 2/2000 | Petite |
| 6,028,857 A | 2/2000 | Poor |
| 6,031,455 A | 2/2000 | Grube et al. |
| 6,032,197 A | 2/2000 | Birdwell et al. |
| 6,035,213 A | 3/2000 | Tokuda et al. |
| 6,035,266 A | 3/2000 | Williams et al. |
| 6,036,086 A | 3/2000 | Sizer, II et al. |

(56) References Cited

U.S. PATENT DOCUMENTS

| | | | |
|---|---|---|---|
| 6,038,491 A | 3/2000 | McGarry et al. |
| 6,044,062 A | 3/2000 | Brownrigg et al. |
| 6,046,978 A | 4/2000 | Melnik |
| 6,054,920 A | 4/2000 | Smith et al. |
| 6,055,561 A | 4/2000 | Feldman et al. |
| 6,060,994 A | 5/2000 | Chen |
| 6,061,604 A | 5/2000 | Russ et al. |
| 6,064,318 A | 5/2000 | Kirchner, III et al. |
| 6,067,017 A | 5/2000 | Stewart et al. |
| 6,067,030 A | 5/2000 | Burnett et al. |
| 6,069,886 A | 5/2000 | Ayerst et al. |
| 6,073,169 A | 6/2000 | Shuey et al. |
| 6,073,266 A | 6/2000 | Ahmed et al. |
| 6,073,840 A | 6/2000 | Marion |
| 6,075,451 A | 6/2000 | Lebowitz et al. |
| 6,078,251 A | 6/2000 | Landt et al. |
| 6,084,867 A | 7/2000 | Meier |
| 6,087,957 A | 7/2000 | Gray |
| 6,088,659 A | 7/2000 | Kelley et al. |
| 6,094,622 A | 7/2000 | Hubbard et al. |
| 6,097,703 A | 8/2000 | Larsen et al. |
| 6,100,816 A | 8/2000 | Moore |
| 6,100,817 A | 8/2000 | Mason, Jr. et al. |
| 6,101,427 A | 8/2000 | Yang |
| 6,101,445 A | 8/2000 | Alvarado et al. |
| 6,108,614 A | 8/2000 | Lincoln et al. |
| 6,112,983 A | 9/2000 | D'Anniballe et al. |
| 6,115,393 A | 9/2000 | Engel et al. |
| 6,115,580 A | 9/2000 | Chuprun et al. |
| 6,119,076 A | 9/2000 | Williams et al. |
| 6,121,593 A | 9/2000 | Mansbery et al. |
| 6,121,885 A | 9/2000 | Masone et al. |
| 6,122,759 A * | 9/2000 | Ayanoglu et al. ............ 714/57 |
| 6,124,806 A | 9/2000 | Cunningham et al. |
| 6,127,917 A | 10/2000 | Tuttle |
| 6,128,551 A | 10/2000 | Davis et al. |
| 6,130,622 A | 10/2000 | Hussey et al. |
| 6,133,850 A | 10/2000 | Moore |
| 6,137,423 A | 10/2000 | Glorioso et al. |
| 6,140,975 A | 10/2000 | Cohen |
| 6,141,347 A | 10/2000 | Shaughnessy et al. |
| 6,150,936 A | 11/2000 | Addy |
| 6,150,955 A | 11/2000 | Tracy et al. |
| 6,157,464 A | 12/2000 | Bloomfield et al. |
| 6,157,824 A | 12/2000 | Bailey |
| 6,163,276 A | 12/2000 | Irving et al. |
| 6,167,239 A | 12/2000 | Wright et al. |
| 6,172,616 B1 | 1/2001 | Johnson et al. |
| 6,173,159 B1 | 1/2001 | Wright et al. |
| 6,174,205 B1 | 1/2001 | Madsen et al. |
| 6,175,922 B1 | 1/2001 | Wang |
| 6,177,883 B1 | 1/2001 | Jennetti et al. |
| 6,178,173 B1 | 1/2001 | Mundwiler et al. |
| 6,181,255 B1 | 1/2001 | Crimmins et al. |
| 6,181,284 B1 | 1/2001 | Madsen et al. |
| 6,181,981 B1 | 1/2001 | Varga et al. |
| 6,185,307 B1 | 2/2001 | Johnson, Jr. |
| 6,188,354 B1 | 2/2001 | Soliman et al. |
| 6,188,675 B1 | 2/2001 | Casper et al. |
| 6,192,282 B1 | 2/2001 | Smith et al. |
| 6,192,390 B1 | 2/2001 | Berger et al. |
| 6,195,018 B1 | 2/2001 | Ragle et al. |
| 6,198,390 B1 | 3/2001 | Schlager et al. |
| 6,199,068 B1 | 3/2001 | Carpenter |
| 6,201,962 B1 | 3/2001 | Sturniolo et al. |
| 6,205,143 B1 | 3/2001 | Lemieux |
| 6,208,247 B1 | 3/2001 | Agre et al. |
| 6,208,266 B1 | 3/2001 | Lyons et al. |
| 6,212,175 B1 | 4/2001 | Harsch |
| 6,215,404 B1 | 4/2001 | Morales |
| 6,215,440 B1 | 4/2001 | Geldart et al. |
| 6,218,953 B1 | 4/2001 | Petite |
| 6,218,958 B1 | 4/2001 | Eichstaedt et al. |
| 6,218,983 B1 | 4/2001 | Kerry et al. |
| 6,219,409 B1 | 4/2001 | Smith et al. |
| 6,229,439 B1 | 5/2001 | Tice |
| 6,233,327 B1 | 5/2001 | Petite |
| 6,234,111 B1 | 5/2001 | Ulman et al. |
| 6,236,332 B1 | 5/2001 | Conkright et al. |
| 6,243,010 B1 | 6/2001 | Addy et al. |
| 6,246,676 B1 | 6/2001 | Chen et al. |
| 6,246,677 B1 | 6/2001 | Nap et al. |
| 6,246,886 B1 | 6/2001 | Oliva |
| 6,249,516 B1 | 6/2001 | Brownrigg et al. |
| 6,259,369 B1 | 7/2001 | Monico |
| 6,271,752 B1 | 8/2001 | Vaios |
| 6,275,166 B1 | 8/2001 | del Castillo et al. |
| 6,275,707 B1 | 8/2001 | Reed et al. |
| 6,286,050 B1 | 9/2001 | Pullen et al. |
| 6,286,756 B1 | 9/2001 | Stinson et al. |
| 6,288,634 B1 | 9/2001 | Weiss et al. |
| 6,288,641 B1 | 9/2001 | Casais |
| 6,295,291 B1 | 9/2001 | Larkins |
| 6,301,514 B1 | 10/2001 | Canada et al. |
| 6,304,556 B1 | 10/2001 | Haas |
| 6,305,205 B1 | 10/2001 | Derks et al. |
| 6,305,602 B1 | 10/2001 | Grabowski et al. |
| 6,307,843 B1 | 10/2001 | Okanoue |
| 6,308,111 B1 | 10/2001 | Koga |
| 6,311,167 B1 | 10/2001 | Davis et al. |
| 6,314,169 B1 | 11/2001 | Schelberg, Jr. et al. |
| 6,317,029 B1 | 11/2001 | Fleeter |
| 6,327,245 B1 | 12/2001 | Satyanarayana et al. |
| 6,329,902 B1 | 12/2001 | Lee et al. |
| 6,334,117 B1 | 12/2001 | Covert et al. |
| 6,351,223 B1 | 2/2002 | DeWeerd et al. |
| 6,356,205 B1 | 3/2002 | Salvo et al. |
| 6,357,034 B1 | 3/2002 | Muller et al. |
| 6,362,745 B1 | 3/2002 | Davis |
| 6,363,057 B1 | 3/2002 | Ardalan et al. |
| 6,363,422 B1 | 3/2002 | Hunter et al. |
| 6,366,217 B1 | 4/2002 | Cunningham et al. |
| 6,366,622 B1 | 4/2002 | Brown et al. |
| 6,369,769 B1 | 4/2002 | Nap et al. |
| 6,370,489 B1 | 4/2002 | Williams et al. |
| 6,373,399 B1 | 4/2002 | Johnson et al. |
| 6,380,851 B1 | 4/2002 | Gilbert et al. |
| 6,384,722 B1 | 5/2002 | Williams |
| 6,389,477 B1 | 5/2002 | Simmon et al. |
| 6,392,692 B1 | 5/2002 | Monroe |
| 6,393,341 B1 | 5/2002 | Lawrence et al. |
| 6,393,381 B1 | 5/2002 | Williams et al. |
| 6,393,382 B1 | 5/2002 | Williams et al. |
| 6,396,839 B1 | 5/2002 | Ardalan et al. |
| 6,400,819 B1 | 6/2002 | Nakano et al. |
| 6,401,081 B1 | 6/2002 | Montgomery et al. |
| 6,405,018 B1 | 6/2002 | Reudink et al. |
| 6,411,889 B1 | 6/2002 | Mizunuma et al. |
| 6,415,155 B1 | 7/2002 | Koshima et al. |
| 6,415,245 B2 | 7/2002 | Williams et al. |
| 6,416,471 B1 | 7/2002 | Kumar et al. |
| 6,421,354 B1 | 7/2002 | Godlewski |
| 6,421,731 B1 | 7/2002 | Ciotti, Jr. et al. |
| 6,422,464 B1 | 7/2002 | Terranova |
| 6,424,270 B1 | 7/2002 | Ali |
| 6,424,931 B1 | 7/2002 | Sigmar et al. |
| 6,430,268 B1 | 8/2002 | Petite |
| 6,431,439 B1 | 8/2002 | Suer et al. |
| 6,437,692 B1 | 8/2002 | Petite et al. |
| 6,438,575 B1 | 8/2002 | Khan et al. |
| 6,441,723 B1 | 8/2002 | Mansfield, Jr. et al. |
| 6,445,291 B2 | 9/2002 | Addy et al. |
| 6,456,960 B1 | 9/2002 | Williams et al. |
| 6,457,038 B1 | 9/2002 | Defosse |
| 6,462,644 B1 | 10/2002 | Howell et al. |
| 6,462,672 B1 | 10/2002 | Besson |
| 6,477,558 B1 | 11/2002 | Irving et al. |
| 6,483,290 B1 | 11/2002 | Hemminger et al. |
| 6,484,939 B1 | 11/2002 | Blaeuer |
| 6,489,884 B1 | 12/2002 | Lamberson et al. |
| 6,491,828 B1 | 12/2002 | Sivavec et al. |
| 6,492,910 B1 | 12/2002 | Ragle et al. |
| 6,496,696 B1 | 12/2002 | Melnik |
| 6,504,357 B1 | 1/2003 | Hemminger et al. |

(56) References Cited

U.S. PATENT DOCUMENTS

| | | |
|---|---|---|
| 6,504,834 B1 | 1/2003 | Fifield |
| 6,507,794 B1 | 1/2003 | Hubbard et al. |
| 6,509,722 B2 | 1/2003 | Lopata |
| 6,513,060 B1 | 1/2003 | Nixon et al. |
| 6,515,586 B1 | 2/2003 | Wymore |
| 6,519,568 B1 | 2/2003 | Harvey et al. |
| 6,532,077 B1 | 3/2003 | Arakawa |
| 6,538,577 B1 | 3/2003 | Ehrke et al. |
| 6,542,076 B1 | 4/2003 | Joao |
| 6,542,077 B2 | 4/2003 | Joao |
| 6,543,690 B2 | 4/2003 | Leydier et al. |
| 6,560,223 B1 | 5/2003 | Egan et al. |
| 6,574,234 B1 | 6/2003 | Myer et al. |
| 6,574,603 B1 | 6/2003 | Dickson et al. |
| 6,584,080 B1 | 6/2003 | Ganz et al. |
| 6,600,726 B1 | 7/2003 | Nevo et al. |
| 6,608,551 B1 | 8/2003 | Anderson et al. |
| 6,618,578 B1 | 9/2003 | Petite |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B2 | 11/2003 | Johnson et al. |
| 6,654,357 B1 | 11/2003 | Wiedeman |
| 6,665,278 B2 | 12/2003 | Grayson |
| 6,671,586 B2 | 12/2003 | Davis et al. |
| 6,671,819 B1 | 12/2003 | Passman et al. |
| 6,674,403 B2 | 1/2004 | Gray et al. |
| 6,678,255 B1 | 1/2004 | Kuriyan |
| 6,678,285 B1 | 1/2004 | Garg |
| 6,691,173 B2 | 2/2004 | Morris et al. |
| 6,731,201 B1 | 5/2004 | Bailey et al. |
| 6,735,630 B1 | 5/2004 | Gelvin et al. |
| 6,747,557 B1 | 6/2004 | Petite et al. |
| 6,751,196 B1 | 6/2004 | Hulyalkar et al. |
| 6,771,981 B1 | 8/2004 | Zalewski et al. |
| 6,775,258 B1 | 8/2004 | van Valkenburg et al. |
| 6,804,532 B1 | 10/2004 | Moon et al. |
| 6,816,088 B1 | 11/2004 | Knoskat et al. |
| 6,826,607 B1 | 11/2004 | Gelvin et al. |
| 6,832,251 B1 | 12/2004 | Gelvin et al. |
| 6,842,430 B1 | 1/2005 | Melnik |
| 6,858,876 B2 | 2/2005 | Gordon et al. |
| 6,859,831 B1 | 2/2005 | Gelvin et al. |
| 6,888,876 B1 | 5/2005 | Mason, Jr. et al. |
| 6,891,838 B1 | 5/2005 | Petite et al. |
| 6,900,737 B1 | 5/2005 | Ardalan et al. |
| 6,906,636 B1 | 6/2005 | Kraml |
| 6,914,533 B2 | 7/2005 | Petite |
| 6,914,893 B2 | 7/2005 | Petite |
| 6,922,558 B2 | 7/2005 | Delp et al. |
| 6,959,550 B2 | 11/2005 | Freeman et al. |
| 6,970,434 B1 | 11/2005 | Mahany et al. |
| 7,020,701 B1 | 3/2006 | Gelvin et al. |
| 7,027,416 B1 | 4/2006 | Kriz |
| 7,027,773 B1 | 4/2006 | McMillin |
| 7,053,767 B2 | 5/2006 | Petite et al. |
| 7,054,271 B2 | 5/2006 | Brownrigg et al. |
| 7,064,679 B2 | 6/2006 | Ehrke et al. |
| 7,103,511 B2 | 9/2006 | Petite |
| 7,117,239 B1 | 10/2006 | Hansen |
| 7,181,501 B2 | 2/2007 | Defosse |
| 7,254,372 B2 | 8/2007 | Janusz et al. |
| 7,304,587 B2 | 12/2007 | Boaz |
| 7,349,682 B1 | 3/2008 | Bennett, III et al. |
| 7,424,527 B2 | 9/2008 | Petite |
| 7,468,661 B2 | 12/2008 | Petite et al. |
| 7,480,501 B2 | 1/2009 | Petite |
| 7,484,008 B1 | 1/2009 | Gelvin et al. |
| 7,573,813 B2 | 8/2009 | Melnik |
| 7,653,394 B2 | 1/2010 | McMillin |
| 7,739,378 B2 | 6/2010 | Petite |
| 2001/0002210 A1 | 5/2001 | Petite |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0012323 A1 | 1/2002 | Petite et al. |
| 2002/0013679 A1 | 1/2002 | Petite |
| 2002/0016829 A1 | 2/2002 | Defosse |
| 2002/0019725 A1 | 2/2002 | Petite |
| 2002/0027504 A1 | 3/2002 | Davis et al. |
| 2002/0031101 A1 | 3/2002 | Petite et al. |
| 2002/0032560 A1 | 3/2002 | Simmon et al. |
| 2002/0032746 A1 | 3/2002 | Lazaridis |
| 2002/0035637 A1 | 3/2002 | Simmon et al. |
| 2002/0036619 A1 | 3/2002 | Simmon et al. |
| 2002/0038377 A1 | 3/2002 | Simmon et al. |
| 2002/0038378 A1 | 3/2002 | Simmon et al. |
| 2002/0040406 A1 | 4/2002 | Simmon et al. |
| 2002/0061031 A1 | 5/2002 | Sugar et al. |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0097273 A1 | 7/2002 | Simmon et al. |
| 2002/0098858 A1 | 7/2002 | Struhsaker |
| 2002/0109607 A1 | 8/2002 | Cumeralto et al. |
| 2002/0136233 A1 | 9/2002 | Chen et al. |
| 2002/0158774 A1 | 10/2002 | Johnson et al. |
| 2002/0163442 A1 | 11/2002 | Fischer |
| 2002/0169643 A1 | 11/2002 | Petite et al. |
| 2002/0184384 A1 | 12/2002 | Simmon et al. |
| 2002/0193144 A1 | 12/2002 | Belski et al. |
| 2003/0001754 A1 | 1/2003 | Johnson et al. |
| 2003/0023146 A1 | 1/2003 | Shusterman |
| 2003/0028632 A1 | 2/2003 | Davis |
| 2003/0030926 A1 | 2/2003 | Aguren et al. |
| 2003/0034900 A1 | 2/2003 | Han |
| 2003/0035438 A1 | 2/2003 | Larsson |
| 2003/0036822 A1 | 2/2003 | Davis et al. |
| 2003/0046377 A1 | 3/2003 | Daum et al. |
| 2003/0058818 A1 | 3/2003 | Wilkes et al. |
| 2003/0069002 A1 | 4/2003 | Hunter et al. |
| 2003/0073406 A1 | 4/2003 | Benjamin et al. |
| 2003/0078029 A1 | 4/2003 | Petite |
| 2003/0093484 A1 | 5/2003 | Petite |
| 2003/0133473 A1 | 7/2003 | Manis et al. |
| 2003/0169710 A1 | 9/2003 | Fan et al. |
| 2003/0185204 A1 | 10/2003 | Murdock |
| 2003/0210638 A1 | 11/2003 | Yoo et al. |
| 2004/0047324 A1 | 3/2004 | Diener |
| 2004/0053639 A1 | 3/2004 | Petite et al. |
| 2004/0090950 A1 | 5/2004 | Lauber et al. |
| 2004/0113810 A1 | 6/2004 | Mason, Jr. et al. |
| 2004/0131125 A1 | 7/2004 | Sanderford, Jr. et al. |
| 2004/0133917 A1 | 7/2004 | Schilling |
| 2004/0183687 A1 | 9/2004 | Petite et al. |
| 2004/0228330 A1 | 11/2004 | Kubler et al. |
| 2005/0017068 A1 | 1/2005 | Zalewski et al. |
| 2005/0190055 A1 | 9/2005 | Petite |
| 2005/0195768 A1 | 9/2005 | Petite et al. |
| 2005/0195775 A1 | 9/2005 | Petite et al. |
| 2005/0201397 A1 | 9/2005 | Petite |
| 2005/0243867 A1 | 11/2005 | Petite |
| 2005/0270173 A1 | 12/2005 | Boaz |
| 2006/0095876 A1 | 5/2006 | Chandra |
| 2007/0112907 A1 | 5/2007 | Defosse |
| 2008/0186898 A1 | 8/2008 | Petite |
| 2009/0006617 A1 | 1/2009 | Petite |
| 2009/0068947 A1 | 3/2009 | Petite |
| 2009/0096605 A1 | 4/2009 | Petite |
| 2009/0215424 A1 | 8/2009 | Petite |
| 2009/0243840 A1 | 10/2009 | Petite et al. |
| 2010/0250054 A1 | 9/2010 | Petite |

FOREIGN PATENT DOCUMENTS

| | | |
|---|---|---|
| DE | 2205336 | 8/1973 |
| DE | 4401443 | 8/1994 |
| EP | 0550517 | 12/1998 |
| FR | 2126301 | 10/1972 |
| FR | 2624749 | 6/1989 |
| GB | 1384573 | 2/1975 |

(56) References Cited

FOREIGN PATENT DOCUMENTS

| | | |
|---|---|---|
| JP | 60261288 A | 12/1985 |
| JP | 2001357483 A | 12/2001 |
| JP | 2002007672 A | 1/2002 |
| JP | 2002007826 A | 1/2002 |
| JP | 2002085354 A | 3/2002 |
| JP | 2002171354 A | 6/2002 |
| KR | 2001025431 A | 4/2001 |
| SE | 377048 | 6/1975 |
| WO | WO 90/13197 | 11/1990 |
| WO | WO 95/12942 | 5/1995 |
| WO | WO 95/24177 | 9/1995 |
| WO | WO 95/34177 | 12/1995 |
| WO | WO 96/10307 | 4/1996 |
| WO | WO 97/00708 | 1/1997 |
| WO | WO 98/00056 | 1/1998 |
| WO | WO 98/10393 | 3/1998 |
| WO | WO 98/37528 | 8/1998 |
| WO | WO 98/45717 | 10/1998 |
| WO | WO 99/13426 | 3/1999 |
| WO | WO 99/45510 | 9/1999 |
| WO | WO 99/48065 | 9/1999 |
| WO | WO 00/23956 | 4/2000 |
| WO | WO 00/36812 | 6/2000 |
| WO | WO 00/55825 | 9/2000 |
| WO | WO 00/58745 | 10/2000 |
| WO | WO 01/15114 | 3/2001 |
| WO | WO 01/24109 | 4/2001 |
| WO | WO 01/35190 | 5/2001 |
| WO | WO 02/08725 | 1/2002 |
| WO | WO 02/08866 | 1/2002 |
| WO | WO 02/052521 | 7/2002 |
| WO | WO 03/007264 | 1/2003 |
| WO | WO 03/021877 | 3/2003 |
| WO | WO 04/002014 | 12/2003 |

OTHER PUBLICATIONS

"Wireless Access List—Atlanta Hartsfield International Airport," http://www.ezgoal.com/hotsports/wireless/f.asp?fid=63643 (visited Jul. 29, 2003) (1 page).
"Wireless Access List—0 ATL Admirals Club," http://www.ezgoal.com/hotspots/wireless/f.asp?fid=60346 (visited Jul. 29, 2003) (1 page).
"Wireless Accessories, catalog pages," Home Automation, Inc (archived web page), 1997.
"ESTeem Model 96C," ESTeem Radios (describing a system that was for sale at least as early as 1994).
"Site Survey Report," ESTeem Radios, Sep. 24, 1993.
"Technical Bulletin—Johnson Controls," ESTeem Radios, Jan. 29, 1998.
Abbott et al., "Wireless Product Applications for Utilities," Electric Power Research Institute, Feb. 1996, pp. 1-137.
About AES Corporation, AES IntelliNet, Author: unknown, available at http://web.archive.org/web/19990127093116/www/aes-intellinet.com/ae, on Mar. 5, 2009, pp. 1-2.
ADEMCO Group, 7720NX Network Extender, ADEMCO Group, Author: unknown, 1998; pp. 1-2.
ADEMCO Group, 4110DL Security System, Installation Instructions, Oct. 1996, ADEMCO Group, Author: unknown, pp. 1-15.
ADEMCO Group, 4110XM Security System, Installation Instructions, Jul. 1996, ADEMCO Group, Author: unknown, pp. 1-20.
ADEMCO Group, 4120EC Security System, Installation Instructions, Nov. 1990, ADEMCO Group, Author: unknown, pp. 1-17.
ADEMCO Group, 4120XM Security System, Installation Instructions, Oct. 1993, ADEMCO Group, Author: Unknown, pp. 1-80.
ADEMCO Group, 4140XMPT2 Partitioned Security System with Scheduling Users Manual, May 1993, ADEMCO Group, Author: unknown; pp. 1-54.
ADEMCO Group, 4281, 5881, and 5882 Series RF Receivers Installation Instructions, Oct. 1996, ADEMCO Group, Author: unknown; pp. 1-6.
ADEMCO Group, 5330 Alpha Console, Installation Instructions, May 1990, ADEMCO Group, Author: unknown, pp. 1-24.

ADEMCO Group, 5706 Smoke Detector with Built-In Wireless Transmitter, Installation Instructions, Dec. 1991, ADEMCO Group, Author: unknown, pp. 1-8.
ADEMCO Group, 5707 Smoke Detector with Built-in Wireless transmitter, Installation Instructions, Aug. 1992, ADEMCO Group, Author: unknown, pp. 1-12.
ADEMCO Group, 5715 Universal Transmitter, Installation Instructions, Mar. 1989, ADEMCO Group; Author: unknown; pp. 1-4.
ADEMCO Group, 5775 Passive Infrared Motion Detector/Transmitter, Installation Instructions, Jul. 1991, ADEMCO Group, Author: unknown; pp. 1-4.
ADEMCO Group, 5808C Photoelectronic Smoke Detector with Built-In Wireless Transmitter Installation Instructions, 1998, ADEMCO Group, Author: unknown; pp. 1-4.
ADEMCO Group, 5800TM Transmitter Module Installation Instructions, Apr. 1994, ADEMCO Group, Author: unknown; pp. 1.
ADEMCO Group, 5801 Remote Wireless Panic Transmitter Installation Instructions, Apr. 1994, ADEMCO Group, Author: unknown; pp. 2.
ADEMCO Group, 5802CP Belt Clip Transmitter Installation Instructions, Nov. 1994, ADEMCO Group, Author: unknown; pp. 1.
ADEMCO Group, 5802MN, Supervised Miniature Transmitter Installation Instructions, Jan. 1995, ADEMCO Group, Author: unknown; pp. 1.
ADEMCO Group, 5802MN2 Supervised Miniature Transmitter Installation Instructions, Jun. 1997, ADEMCO Group, Author: unknown; pp. 1.
ADEMCO Group, 5803 Wireless Key Transmitter Installation Instructions, Nov. 1994, ADEMCO Group, Author: unknown, pp. 2.
ADEMCO Group, 5804 Wireless Key Transmitter Installation Instructions, Jul. 1995, ADEMCO Group, Author: unknown, pp. 3.
ADEMCO Group, 5804BD Bi-Directional Key Transmitter Installation Instructions, Apr. 1997, ADEMCO Group, Author: unknown, pp. 4.
ADEMCO Group, 5806 Smoke Detector with Built-In Wireless Transmitter Installation Instructions, May 1998, ADEMCO Group, Author: unknown, pp. 1-4.
ADEMCO Group, 5807 Smoke Detector with Built-In Wireless Installation Instructions, May 1998, ADEMCO Group, Author: unknown, pp. 1-6.
ADEMCO Group, 5808 Photoelectronic Smoke/Heat Detector with Built-In Wireless Transmitter Installation Instructions, 1998, ADEMCO Group, Author: unknown, pp. 1-8.
ADEMCO Group, 5808 Wireless Smoke Detector, 1999, available at http://web.archive.org/web/20000118015507/www.ademco.com/ademco on Mar. 5, 2009 pp. 1-4.
ADEMCO Group, 5809 Rate-of Rise Heat Detector/Transmitter Installation Instructions, Nov. 1994, ADEMCO Group, Author: unknown; pp. 1-2.
ADEMCO Group, 5816 Door/Window Transmitter Installation Instructions, Nov. 1994, ADEMCO Group, Author: unknown; pp. 1-2.
ADEMCO Group, 5816TEMP Low Temperature Transmitter Installation Instructions, May 1998, ADEMCO Group, Author: unknown; pp. 1-2.
ADEMCO Group, 5818 Recessed Transmitter Installation Instructions, Jan. 1994, ADEMCO Group, Author: unknown; pp. 1-2.
ADEMCO Group, 5819 Shock Processor Transmitter Installation Instructions, May 1998, ADEMCO Group, Author: unknown; pp. 1-2.
ADEMCO Group, 5819WHS Wireless Shock Sensor and Processor, 1997, available at http://web.archive.org/web/19990428164624/www.ademco.com/ademco on Mar. 5, 2009, pp. 1.
ADEMCO Group, 5819WHS/5819BRS Shock Processor Transmitter Installation Instructions, May 1998, ADEMCO Group, Author: unknown; pp. 1-2.
ADEMCO Group, 5827 Remote Wireless Keypad/Transmitter Installation Instructions, Apr. 1994, ADEMCO Group, Author: unknown; pp. 1.
ADEMCO Group, 5827BD and 5827BDE Wireless Bi-Directional Keypads Installation Instructions and Operating Guide, Mar. 1996, ADEMCO Group, Author: unknown; pp. 1-6.

(56) References Cited

OTHER PUBLICATIONS

ADEMCO Group, 5849 Glass Break Detector/Transmitter Installation Instructions, Oct. 1997, ADEMCO Group, Author: unknown; pp. 1-4.
ADEMCO Group, 5850 Glass Break Detector/Transmitter Installation Instructions, May 1998, ADEMCO Group, Author: unknown; pp. 1-4.
ADEMCO Group, 5890 Passive Infrared Motion Detector/Transmitter Installation Instructions, May 1998, ADEMCO Group, Author: unknown; pp. 1-8.
ADEMCO Group, 5890 Wireless PIR Motion Detector, 1997, available at http://web.archive.org/web/19990429054256/www.ademco.com/asc on Mar. 5, 2009, pp. 1-3.
ADEMCO Group, 5890PI Passive Infrared Motion Detector/Transmitter Installation Instructions, Mar. 1998, ADEMCO Group, Author: unknown; pp. 1-4.
ADEMCO Group, 6128RF Keypad/Receiver—full wireless capability, 1997, ADEMCO Group, Author: unknown; pp. 1-2.
ADEMCO Group, 6128RF Keypad/Transceiver Installation Instructions, Jul. 1998, ADEMCO Group, Author: unknown; pp. 1-8.
ADEMCO Group, 6128RF Keypad/Transceiver, User Guide, May 1998, ADEMCO Group, Author: unknown; pp. 1.
ADEMCO Group, 6128WL Keypad/Receiver Installation Instructions, Oct. 1998, ADEMCO Group, Author: unknown; pp. 1-8.
ADEMCO Group, 6128WL Keypad/Receiver User Guide, Oct. 1998, ADEMCO Group, Author: unknown; pp. 1.
ADEMCO Group, 7715DF MicroFAST Installation Tool, User Manual, Feb. 1998, ADEMCO Group, Author: unknown; pp. 1-32.
ADEMCO Group, 7720 Subscriber Radio, Installation Instructions, Jan. 1992, ADEMCO Group, Author: unknown, available at http://www.guardianalarms.net, pp. 1-18.
ADEMCO Group, 7720NX Network Extender, 1997, ADEMCO Group, Author: unknown, available at http://web.archive.org/web/19990220035932/www.ademco.com/ademco on Mar. 5, 2009, pp. 1-3.
ADEMCO Group, 7720P Programming Tool, User Guide, Mar. 1992, ADEMCO Group, Author: unknown, available at http://www.guardianalarms.net; pp. 1-8.
ADEMCO Group, 7720Plus Subscriber Radio Installation Instructions, Oct. 1996, ADEMCO Group, Author: unknown, available at http://www.guardianalarms.net; pp. 1-30.
ADEMCO Group, 7720ULF Combination Fire Control and Long Range Radio Transmitter, 1997, ADEMCO Group, Author: unknown, available at http://web.archive.org/web/19990501210612/www.ademco.com/ademco on Mar. 5, 2009, pp. 1-3.
ADEMCO Group, 7720ULF Subscriber Radio, Installation Instructions, Mar. 1995, ADEMCO Group, Author: unknown, available at http://www.guardianalarms.net, pp. 1-20.
ADEMCO Group, 7720V2 Self-Contained Long Range Radio Transmitter, 1997, ADEMCO Group, Author: unknown, available at http://web.archive.org/web/19990501212349/www.ademco.com/ademco on Mar. 5, 2009 pp. 1-4.
ADEMCO Group, 7720V2 Subscriber Radio, Installation Instructions, Jun. 1996, ADEMCO Group, Author: unknown, available at http://www.guardianalarms.net, pp. 1-24.
ADEMCO Group, 7810iR Internet Receiver, Installation and Setup Guide, May 2002, ADEMCO Group, Author: unknown, available at http://www.guardianalarms.net, pp. 1-58.
ADEMCO Group, 7820 Appendicies, Mar. 1995, ADEMCO Group, Author: unknown, available at http://www.guardianalarms.net, pp. 1-2.
ADEMCO Group, 7820 Integrated Radio Transmitter, Installation Instructions, Aug. 1995, ADEMCO Group, Author: unknown, available at http://www.guardianalarms.net, pp. 1-52.
ADEMCO Group, 7825 Outdoor Antenna with Bracket, Installation Instructions, Feb. 1995, ADEMCO Group, Author: unknown, available at http://www.guardianalarms.net, pp. 1-2.
ADEMCO Group, 7830R SafetyNet Subscriber Radio, Installation Instructions, Jun. 1996, ADEMCO Group, Author: unknown, available at http://www.guardianalarms.net, pp. 1-32.
ADEMCO Group, 7830R Subscriber Transmitter, 1997, available at http://web.archive.org/web/19990501215427/www.ademco.com.ademco on Mar. 5, 2009, pp. 1-3.
ADEMCO Group, 7835C Cellular Control Channel Transceiver, Installation and Setup Guide, Sep. 1998, ADEMCO Group, Author: unknown, available at http://www.guardianalarms.net, pp. 1-32.
ADEMCO Group, 7835C Cellular SafetyNet Subscriber Radio Transceiver, 1997ADEMCO Group, Author: unknown, available at http://web.archive.org/web/19990801221202/www.ademco.com/on May 3, 2009, pp. 1-3.
ADEMCO Group, 7845C Cellular Control Channel Transceiver, Installation and Setup Guide, Sep. 1990, ADEMCO Group, Author: unknown, available at http://www.guardianalarms.net, pp. 1-104.
ADEMCO Group, 7845CZ Seven Zone Cellular Control Channel Transceiver, Installation and Setup Guide, Sep. 2001, ADEMCO Group, Author: unknown, available at http://www.guardianalarms.net, pp. 1-64.
ADEMCO Group, 7845i Internet Communications Module, Installation and Setup Guide, Mar. 2002, ADEMCO Group, Author: unknown, available at http://www.guardianalarms.net, pp. 1-42.
ADEMCO Group, 7920SE 900MHz Fully Synthesized Transceiver, 1997, ADEMCO Group, Author: unknown, available at http://web.archive.org/web/19990501222639/www.ademco.com/ on Mar. 5, 2009, pp. 1-3.
ADEMCO Group, 7920SE Transceiver, Installation Instructions, Apr. 1995, ADEMCO Group, Author: unknown, available at http://www.guardianalarms.net, pp. 1-80.
ADEMCO Group, ADEMCO World Leader in Home Security Products, 1997, ADEMCO Group, Author: unknown, available at http://web.archive.org/web/19990428164624/www.ademco.com/ademco on Mar. 5, 2009, pp. 1-2.
ADEMCO Group, AlarmNet Introduces Control Channel Cellular for Commercial Fire/Burglary Applications, ADEMCO Group (press release), Aug. 31, 1999, available at http://web.archive.org/web/19990420234120/www.ademco.com/pr0831 on Mar. 31, 2009.
ADEMCO Group, AlarmNet, 1997, ADEMCO Group, Author: unknown, available at http://web.archive.org/web/199904240234130/www.ademco.com/ademco on Mar. 5, 2009, pp. 1-3.
ADEMCO Group, Alpha Vista No. 5130XT Security System, Installation Instructions, Mar. 1989, ADEMCO Group, Author: unknown, pp. 96.
ADEMCO Group, Compass, 1997, ADEMCO Group, Author: unknown, available at http://web.archive.org/web/19990209094401/www.ademco.com/ademco on Mar. 5, 2009.
ADEMCO Group, Control/Communicator 5110XM User's Manual, Apr. 1996, Ademco Group, Author: unknown, pp. 1-30.
ADEMCO Group, Fire and Burglary System Model 5120XM User's Manual, Apr. 1996, Ademco Group, Author: unknown, pp. 1-40.
ADEMCO Group, Home Page, ADEMCO Group, Author: unknown, available at http://web.archive.org/web/19961023204954/http://ademco.com/ on Mar. 5, 2009, pp. 1.
ADEMCO Group, LYNX—Quick Install Security System, 1997, ADEMCO Group, Author: unknown, available at http://web.archive.org/web/19990116225005 pp. 1-3.
ADEMCO Group, Lynx Quick Start Guide, Oct. 1998, Ademco Group, Author: unknown, pp. 1-4.
ADEMCO Group, Lynx Security System Installation and Setup Guide, Oct. 1998, Ademco Group, Author: unknown, pp. 1-48.
ADEMCO Group, Lynx Security System Programming Form & Summary of Connections, Oct. 1998, Ademco Group, Author: unknown, pp. 1-16.
ADEMCO Group, Lynx Security System User Guide, Oct. 1998, Ademco Group, Author: unknown, pp. 1-40.
ADEMCO Group, Powerline Carrier Device Modules, 1997 ADEMCO Group, Author: unknown, available at http://web.archive.org/web/19990218035115/www.ademco.com/ademco on Mar. 5, 2009, pp. 1-2.
ADEMCO Group, Remote Keypads 6128, 6137, 6137R, 6138, 6139 & 6139R, Installation Guide, Aug. 1998, Ademco Group, Author: unknown, pp. 1-2.
ADEMCO Group, Security System Model 4110DL Programming Form, Oct. 1996, ADEMCO Group, Author: unknown, pp. 1-8.

(56) References Cited

OTHER PUBLICATIONS

ADEMCO Group, Security System Model 4110XM Programming Form, Jul. 1996, ADEMCO Group, Author: unknown, pp. 1-4.
ADEMCO Group, Security System Model 4120EC Programming Form, Sep. 1993, ADEMCO Group, Author: unknown, pp. 1-2.
ADEMCO Group, Security System Model 4120XM Programming Form, Sep. 1992, ADEMCO Group, Author: unknown, pp. 1-4.
ADEMCO Group, Security System Model 4130XT/4140/5130XT Programming Form, Jul. 1989, ADEMCO Group, Author: unknown, pp. 1-2.
ADEMCO Group, Security System Model 4140XMP Programming Form, Jan. 1992, ADEMCO Group, Author: unknown, pp. 1-2.
ADEMCO Group, Security System Model 4140XMPT2 Programming Form, Apr. 1996, ADEMCO Group, Author: unknown, pp. 1-4.
ADEMCO Group, Security System Model 5110XM Programming Form, Apr. 1996, ADEMCO Group, Author: unknown, pp. 1-4.
ADEMCO Group, Security System Model 5120XM Programming Form, Jun. 1996, ADEMCO Group, Author: unknown, pp. 1-4.
ADEMCO Group, Security System Model 5140XM Programming Form, Jun. 1993, ADEMCO Group, Author: unknown, pp. 1-4.
ADEMCO Group, Security System Model Vista-10 Programming Form, Sep. 1994, ADEMCO Group, Author: unknown, pp. 1-4.
ADEMCO Group, Security System Model Vista-10SE Programming Form, Apr. 1997, ADEMCO Group, Author: unknown, pp. 1-24.
ADEMCO Group, Security System Model Vista-128B Commercial Burglary Partitioned Security System with Scheduling, Quick Start Guide, Jun. 1998, ADEMCO Group, Author: unknown, pp. 1-39.
ADEMCO Group, Security System User's Manual, Sep. 1996, ADEMCO Group, Author: unknown, pp. 1-88.
ADEMCO Group, The Vista-100 Series, 1997, ADEMCO Group, Author: unknown, available at http://web.archive.org/web19970620010543/www.ademco.com/ademco on Mar. 5, 2009.
ADEMCO Group, The Vista-10SE, 1997, ADEMCO Group, Author: unknown, available at http://web.archive.org/web/19990502214402/www.ademco/com/ademco on Mar. 5, 2009, pp. 1-4.
ADEMCO Group, via16 Programming Form, Jul. 1993, ADEMCO Group, Author: unknown, pp. 1-2.
ADEMCO Group, via16 Security System, Installation Instructions, Jan. 1992, ADEMCO Group, Author: unknown, pp. 1-24.
ADEMCO Group, via-30+, Vista 10, 4111XM Security System User's Manual, Jul. 1994, ADEMCO Group, Author: unknown, pp. 1-44.
ADEMCO Group, via-30Pse Security System Programming Guide, Apr. 1997, ADEMCO Group, Author: unknown, pp. 1-24.
ADEMCO Group, via-30PSE, VISTA-1SE Security System User's Manual, Jan. 1997, ADEMCO Group, Author: unknown, pp. 1-88.
ADEMCO Group, Vista 4120XM and 4140XMP Security System User's Manual, Jan. 1994, ADEMCO Group, Author: unknown, pp. 1-60.
Custom Solutions, Inc., HomeVision-PC Version 2.62, Owner's Manual (1997), pp. 1-234.
Custom Solutions, Inc., Media Information, Feb. 16, 1999, available at http://web.archive.org/web/19990502073249/www.csi3.com/hv_media.htm on Feb. 27, 2009, pp. 1-2.
Custom Solutions, Inc., Using Enerzone StatNet Thermostats with HomeVision (1998) pp. 1-16.
Davies et al., "Internetworking in the Military Environment," Proceedings of IEEE Infocom '82 (1982) pp. 19-29.
Davies et al., "The Application of Packet Switching Techniques to Combat Net Radio," Proceedings of the IEEE, vol. 75, No. 1, Jan. 1987, pp. 43-55.
Davis et al., "Knowledge-Based Management of Cellular Clone Fraud," IEEE (1992), pp. 230-234.
Deering et al., "Internet Protocol, Version 6 (IPv6)," RFC1883, Publisher: unknown, Dec. 1995, pp. 1-37.
Deering et al., "Internet Protocol, Version 6 (IPv6)," RFC2460, The Internet Society, Dec. 1998, pp. 1-39.
Diaz, "Intervehicular Information System (IVIS): the Basis for a Tactical Information System," SAE International, Mar. 1994, pp. 1-14.

Dixon et al., "Addressing, Bridging and Source Routing," IEEE Network, Jan. 1988, vol. 2, No. 1, pp. 25-32.
Dong et al., "Low Power Signal Processing Architectures for Network Microsensors," ACM, 1997, pp. 173-177.
Echelon Corp., "LonTalk® Protocol Specification," Doc. No. 19550, available at http://ww w.enerlon.com/JobAids/Lontalk%20Protocol%20Spec.pdf (1994).
Echelon Corp., "Series 90™-30 PLC LonWorks® Bus Interface Module User's Manual," Doc. No. GFK-1322A, available at http://www.pdfsupply.com/pdfs/gfk1322a.pdf (1997).
Elson et al., "Fine-Grained Network Time Synchronization Using Reference Broadcasts," UCLA Computer Science Department, May 17, 2002, pp. 1-14.
Eng et al., "BAHAMA: A Broadband Ad-Hoc Wireless ATM Local-Area Network," 1995 IEEE International Conference on Communications, Jun. 18-22, 1995, pp. 1216-1223.
Ephremides et al., "A Design Concept for Reliable Mobile Radio Networks with a Frequency Hopping Signaling," IEEE 1987, pp. 1-18.
ESTeem Application Paper—AgriNorthwest Employee's Provide Wireless Control System (describing a system that was in use prior to Mar. 1999).
ESTeem Application Paper—Allen-Bradley Goes Wireless on Alaska's North Slope (describing a system that was in use prior to Mar. 1999).
ESTeem Application Paper—Build Your Own Wireless Power Distribution System (describing a system that was in use prior to Mar. 1999).
ESTeem Application Paper—Lost Cabin Gas Plant Uses Wireless Control to Enhance Production & Safety (describing a system that was in use prior to Mar. 1999).
ESTeem Application Paper—Northwest Farm Applies Wireless Solution (describing a system that was in use prior to Mar. 1999).
ESTeem Application Paper—Wireless Control of Polluted Water (describing a system that was in use prior to Mar. 1999).
ESTeem Application Paper—Wireless Mobile Mapping System (describing a system that was in use prior to Mar. 1999).
ESTeem Application Paper—Wireless Networking for Kodiak's Coast Guard Station (describing a system that was in use prior to Mar. 1999).
ESTeem Application Paper—Wireless Networking for Natural Gas Extraction (describing a system that was in use prior to Mar. 1999).
ESTeem Models 85, 95, 96, & 98 User's Manual (describing the ESTeem 96C and 96F radios used prior to 1999).
Estrin et al., "Next Century Challenges: Scallable Coordination in Sensor Networks," ACM, 1999, pp. 263-270.
Estrin et al., "RFC1940—Source Demand Routing: Packet Format and Forwarding Specification (Version 1)," Network Working Group, May 1996, available at http://www.faqs.org/rfcs/rfc1940.html, Sep. 14, 2009, pp. 1-20.
Estrin et al., "Source Demand Routing: Packet Format and Forwarding Specification (Version 1)", Network Working Group, Internet Draft, Jan. 19, 1995, pp. 1-28.
Federal Communications Commission, "Notice of Proposed Rule Making and Order," Adopted Dec. 17, 2003, Released Dec. 30, 2003 (54 pages).
Frank, "Transmission of IP Datagrams Over NET/ROM Networks, ARRL Amateur Radio 7th Computer Networking Conference," Oct. 1988, pp. 65-70.
Frank, "Understanding Smart Sensors," Artech House (1996).
Frankel, "Packet Radios Provide Link for Distributed Survivable Command Control Communications in Post-Attack Scenarios," Microwave System News, Jun. 1983, Circle Reader Service No. 77, pp. 80-108.
Franz, "HiperLAN—Der ETSI-Standard fur locale Funknetze," NTZ, Sep. 1995, 10 pages.
Fullmer, "Collision Avoidance Techniques for Packet-Radio Networks," Dissertation, University of California at Santa Cruz, Jun. 1998, pp. 1-162.
Gale et al., "The Impact of Optical Media on Information Publishing," Bulletin of the American Society for Information Science, vol. 12, No. 6, Aug./Sep. 1986, pp. 12-14.

(56) References Cited

OTHER PUBLICATIONS

Garbee, "Thoughts on the Issues of Address Resolution and Routing in Amateur Packet Radio TCP/IP Networks," ARRL Amateur Radio 6th Computer Networking Conference, Aug. 1987, p. 56-58.
Garcia-Luna-Aceves, "A Fail-Safe Routing Algorithm for Multishop Packet-Radio Networks," IEEE Infocom '86, Technical Sessions: Apr. 8-10, 1986, pp. 434-442.
Garcia-Luna-Aceves, "A Minimum-hop Routing Algorithm Based on Distributed Information," Elsevier Science Publishers, B.V. (North Holland), 1989, pp. 367-382.
Garcia-Luna-Aceves, "Routing Management in Very Large Scale Networks," Elsevier Science Publishers, B.V. (North Holland), 1988, pp. 81-93.
Garcia-Luna-Aceves, J.J et al., "Wireless Internet Gateways (WINGS)", 1997 IEEE, pp. 1271-1276, 1997.
GE Security, "NetworkX NX-4," 2004, pp. 1-2.
GE Security, "NetworkX NX-548E," 2006, pp. 1-2.
Geier et al., "Networking Routing Techniques and their Relevance to Packet Radio Networks," ARRL/CRRL Amateur Radio 6th Computer Networking Conference, London, Ontario, Canada, Sep. 1990, pp. 105-117.
Gerla et al., "Multicluster, Mobile, Multimedia Radio Network," UCLA Computer Science Department; Baltzer Journals; Wireless Networks; Jul. 12, 1995, pp. 255-265.
Golden Power Manufacturing, "6030 PCT Programmable Communicating Thermostat," Author: unknown, 2007, pp. 1-3.
Golden Power Manufacturing, "Ritetemp Universal Wireless Thermostat," Author: unknown, 2007, pp. 1-2.
Goldman et al., "Impact of Information and Communications Technologies on Residential Customer Energy Services," Paper, Berkeley: UCLA, Oct. 1996, pp. 1-89.
Gower et al., "Congestion Control Using Pacing in a Packet Radio Network", Rockwell International, Collins Communications Systems Division, Richardson, TX, IEEE 1982, pp. 23.1-1-23.1-6, 1982.
Grady et al., "Telemetry Options for Small Water Systems," Special Report SR14-1999, Publisher: unknown, Sep. 1999, pp. 1-23.
Guardian Alarms, Inc., "Home Security System—Model 7068 Digital Dialer Interface," Author: unknown, available at www.guardianalarms.net, 2007, pp. 1.
Guardian Alarms, Inc., "Security Company—Home Alarm System Monitoring—AES 7067 IntelliTap-II Digital Dialer Interface," Author: unknown, available at www.guardianalarms.net, 2007, pp. 1.
Guardian Alarms, Inc., "Security System—Alarm System Monitoring—7160 EZ Router," Author: unknown, available at www.guardianalarms.net, 2007, pp. 1.
Guardian Alarms, Inc., "Security System—Alarm System Monitoring—NET 7000," Author: unknown, available at www.guardianalarms.net, 2007, pp. 1.
Guardian Alarms, Inc., "Security System—Alarm System Monitoring—Radionics FDX," Author: unknown, available at www.guardianalarms.net, 2007, pp. 1.
ADEMCO Group, Vista 4130XT Security System Installation Instructions, Oct. 1998, ADEMCO Group, Author: unknown, pp. 1-84.
ADEMCO Group, Vista 4140XMPT2 Partitioned Security System with Scheduling Installation Instructions, May 1993, ADEMCO Group, Author: unknown, pp. 1-68.
ADEMCO Group, Vista AT 4140 Security System Installation Instructions, Sep. 1998, ADEMCO Group, Author: unknown, pp. 1-68.
ADEMCO Group, Vista Series 4120EC Security System Users Manual, Sep. 1992, ADEMCO Group, Author: unknown, pp. 1-28.
ADEMCO Group, Vista Series 4130XM, 5130XM, 4140XMP Security System User's Manual, Feb. 1992, ADEMCO Group, Author: unknown, pp. 1-32.
ADEMCO Group, Vista Series 4140XMPT/4140XMPT-UL Partitioned Security System User's Manual, Jun. 1993, ADEMCO Group, Author: unknown, pp. 1-32.
ADEMCO Group, Vista Series 4140XMP, Installation Instructions, Jan. 1992, ADEMCO Group, Author: unknown, pp. 1-52.
ADEMCO Group, Vista Series 5140XM User's Manual, Aug. 1992, ADEMCO Group, Author: unknown, pp. 1-28.
ADEMCO Group, Vista XM Series 4140XM, 5130XM, 4130XM, Installation Instructions, Jul. 1990, ADEMCO Group, Author: unknown, pp. 1-26.
ADEMCO Group, Vista XM Series, Installation Instructions, ADEMCO Group, Author: unknown, Oct. 1991, pp. 1-16.
ADEMCO Group, Vista-10 Security System, Installation Instructions, Sep. 1994, ADEMCO Group, Author: unknown, pp. 1-56.
ADEMCO Group, Vista-100 Commercial Fire & Burglary Alarm Partitioned Security System with Scheduling, Installation Instructions and Programming Guide, Jan. 1998, ADEMCO Group, Author: unknown, pp. 1-233.
ADEMCO Group, Vista-100 Commercial Fire & Burglary Alarm System User's Manual, Nov. 1995, ADEMCO Group, Author: unknown, pp. 1-66.
ADEMCO Group, Vista-100 Commercial Fire & Burglary Alarm System with Scheduling Quick Start, Apr. 1996, ADEMCO Group, Author: unknown, pp. 1-24.
ADEMCO Group, Vista-10SE Security System, Installation Instructions, May 1997, ADEMCO Group, Author: unknown, pp. 1-88.
ADEMCO Group, Vista-128B Commercial Burglary Partitioned Security System with Scheduling, Installation and Setup Guide, Jul. 1998, ADEMCO Group, Author: unknown, pp. 1-252.
ADEMCO Group, Vista-128FB Commercial Fire and Burglary Partioned Security System with Scheduling, Installation, and Setup Guide, Oct. 1998, ADEMCO Group, Author: unknown, pp. 1-220.
ADEMCO Group, Vista-128FB Commercial Fire and Burglary Partitioned Security System User Guide, Oct. 1998, ADEMCO Group, Author: unknown, pp. 1-80.
ADEMCO Group, Vista-20 2-Partitioned Security System, Installation Instructions, Nov. 1995, ADEMCO Group, Author: unknown, pp. 1-120.
ADEMCO Group, Vista-20 2-Partitioned Security System, Programming Form, Apr. 1996, ADEMCO Group, Author: unknown, pp. 1-8.
ADEMCO Group, Vista-20 Security System User's Manual, Apr. 1995, ADEMCO Group, Author: unknown, pp. 1-52.
ADEMCO Group, Vista-20HW 2-Partitioned Security System, Installation Instructions, Apr. 1996, ADEMCO Group, Author: unknown, pp. 1-100.
ADEMCO Group, Vista-20HW 2-Partitioned Security System, Programming Form, Apr. 1996, ADEMCO Group, Author: unknown, pp. 1-8.
ADEMCO Group, Vista-20HWse 2-Partitioned Security System, Installation Instructions, Aug. 1997, ADEMCO Group, Author: unknown, pp. 1-84.
ADEMCO Group, Vista-20HWse 2-Partitioned Security System, Programming Form, Aug. 1997, ADEMCO Group, Author: unknown, pp. 1-8.
ADEMCO Group, Vista-20SE 2-Partitioned Security System, Installation Instructions, Aug. 1997, ADEMCO Group, Author: unknown, pp. 1-100.
ADEMCO Group, Vista-20SE 2-Partitioned Security System, Programming Guide, Aug. 1997, ADEMCO Group, Author: unknown, pp. 1-8.
ADEMCO Group, Vista-20SE/Vista-20HWse Security System User's Manual, Jun. 1997, ADEMCO Group, Author: unknown; pp. 1-52.
ADEMCO Group, Vista-30Pse Security System, Installation Instructions, Apr. 1997, ADEMCO Group, Author: unknown; pp. 1-104.
ADEMCO Group, Vista-40 2-Partition Security System, Installation and Setup Guide, Jul. 1998, ADEMCO Group, Author: unknown; pp. 1-380.
ADEMCO Group, Vista-40 2-Partition Security System, Programming Guide, Jul. 1998, ADEMCO Group, Author: unknown; pp. 1-24.
ADEMCO Group, Vista-40 Programming Guide, Jun. 1997, ADEMCO Group, Author: unknown; available at www.guardianalarms.net pp. 1-20.
ADEMCO Group, Vista-40 Security System User's Guide, Jul. 1998, ADEMCO Group, Author: unknown; pp. 1-60.
ADEMCO Group, Vista-50, Vista 50UL Security System, Nov. 1994, ADEMCO Group, Author: unknown; pp. 1-66.

(56) References Cited

OTHER PUBLICATIONS

ADEMCO Group, Vista-50P, Vista-50PUL Partitioned Security System with Scheduling, Installation Instructions and Programming Guide, Oct. 1997, ADEMCO Group, Author: unknown; pp. 1-199.
ADEMCO Group, Vista-50P, Vista-50PUL Security System User's Manual, Jul. 1995, ADEMCO Group, Author: unknown; pp. 1-66.
ADEMCO Group, Vista-50P, Vista-50PUL, Partitioned Security System with Scheduling, Quick Start, Aug. 1995, ADEMCO Group, Author: unknown; pp. 1-28.
ADEMCO Group, Vista5140XM Commercial Fire and Burglary Alarm System Installation Instructions, Jun. 1993, ADEMCO Group, Author: unknown, pp. 1-74.
ADEMCO Group, Vista-AT Security System User's Manual, Sep. 1998, ADEMCO Group, Author: unknown; pp. 1-56.
ADEMCO Group, V-Link Downloading Software User's Guide, Jun. 1994, ADEMCO Group, Author: unknown; available at http://www.guardianalarms.net, pp. 1-126.
ADEMCO Group, V-Plex Security Technology, 1997, ADEMCO Group, Author: unknown, available at http://web.archive.org/web/19990421110527/www.ademco.com/ademco on Mar. 5, 2009, pp. 1-6.
ADEMCO Group, Wireless Transmitters/Receivers: 5700 Wireless Transmitters, 1997, ADEMCO Group, Author: unknown, available at http://web.archive.org/web/19990127120423/www.ademco.com/ademco on Mar. 5, 2009, pp. 1-2.
ADEMCO Group, Wireless Transmitters/Receivers: 5800 Wireless Transmitters, 1997, ADEMCO Group, Author: unknown, available at http://web.archive.org/web/19990218181254/www.ademco/com/ademco on Mar. 5, 2009, pp. 1-2.
ADEMCO Group, Wirelss User Interface Devices, 1997, ADEMCO Group, Author: unknown, available at http://web.archive.org/web/19990421190353/www.ademco.com/ademco on Mar. 5, 2009, pp. 1-4.
ADEMCO Group,Vista Series Partitioned Security Systems Model 4140XMPT Installation Instructions, Feb. 1992, ADEMCO Group, Author: unknown, pp. 1-60.
AES—7700 Central Station, Installation & Operation Manual, Document 40-0551u, AES Corporation, Author: unknown, Nov. 2003, pp. 1-40.
AES—IntelliGuard 7470, AES IntelliNet, Author: unknown, Nov. 2003, pp. 1-15.
AES 7000 Smart Central Station InstaCentral Station Installation & Operation Manual, Document No. 40-551, AES IntelliNet, Author: unknown; Nov. 20, 1996, pp. 1-48.
AES 7067 IntelliTap-II Digital Dialer Interface: A Supplemental Alarm Supporting Device, AES IntelliNet, Author: unknown, Aug. 5, 2004, pp. 1-4.
AES 7099 Central Station Installation & Operation Manual, Document No. 40-0050, AES IntelliNet, Author: unknown; 1998, pp. 1-20.
AES 7450 RF Subscriber Unit Installation Manual, AES IntelliNet, Author: unknown, 1998, pp. 1-8.
AES 7750-F RF SMART Subscriber Unit Version 2, Including 7750-F-4x4 and 7750-F-8, Installation & Operation Manual, AES IntelliNet, Author: unknown, Apr. 2001 (Updated Nov. 2003), pp. 1-60.
AES 7750-F RF SMART Subscriber Unit Version 2, Installation & Operation Manual, AES IntelliNet, Author: unknown, Aug. 2000, pp. 1-30.
AES Central Alarm Monitoring, Author: unknown, available at http://web.archive.org/web/19990225163745/www.aes-intellinet.com/ae, on Mar. 5, 2009, pp. 1-3.
AES IntelliNet 7450 Addendum, AES Corporation, Author: unknown, Jul. 9, 2002, pp. 1-2.
AES IntelliNet Dealer's List by State, Author: unknown, available at http://web.archive.org/web/200102162324026/www.aes-intellinet.com/list on Mar. 5, 2009, pp. 1-13.
AES IntelliNet Model 7003 Central Station, Installation & Operation Manual, AES IntelliNet, Author: unknown, Jan. 9, 2001, available at http://www.guardianalarms.net, pp. 1-25.
AES IntelliNet Model 7050, 7750, Subscriber Unit, Version 1.62, Installation & Operation Manual, AES IntelliNet, Author: unknown, Dec. 1996, available at www.guardianalarms.net, pp. 1-110.
U.S. Appl. No. 12/477,329 Non-Final Office Action dated Aug. 19, 2010.
U.S. Appl. No. 12/477,329 Non-Final Office Action dated Dec. 28, 2009.
U.S. Appl. No. 12/356,358 Final Office Action dated Sep. 15, 2010.
U.S. Appl. No. 12/356,358 Non-Final Office Action dated Jan. 21, 2010.
U.S. Appl. No. 10/792,608 Non-Final Office Action dated Jan. 22, 2010.
U.S. Appl. No. 10/792,608 Final Office Action dated Sep. 2, 2009.
U.S. Appl. No. 10/792,608 Non-Final Office Action dated Feb. 3, 2009.
U.S. Appl. No. 10/792,608 Final Office Action dated Aug. 19, 2008.
U.S. Appl. No. 12/792,608 Restriction Requirement dated Dec. 21, 2007.
U.S. Appl. No. 10/792,608 Non-Final Office Action dated Mar. 21, 2007.
U.S. Appl. No. 12/816,266 Non-Final Office Action dated Oct. 12, 2010.
U.S. Appl. No. 11/814,632 Final Office Action dated Dec. 7, 2010.
U.S. Appl. No. 11/814,632 Non-Final Office Action dated Jul. 13, 2010.
U.S. Appl. No. 11/125,009 Non-Final Office Action dated Dec. 9, 2010.
U.S. Appl. No. 11/125,009 Non-Final Office Action dated Mar. 1, 2010.
U.S. Appl. No. 11/125,009 Non-Final Office Action dated Apr. 6, 2009.
U.S. Appl. No. 11/125,009 Non-Final Office Action dated Oct. 1, 2008.
U.S. Appl. No. 11/125,009 Notice of Allowance dated Sep. 21, 2009.
U.S. Appl. No. 12/169,536 Non-Final Office Action dated Oct. 20, 2010.
U.S. Appl. No. 12/689,220 Non-Final Office Action dated Dec. 15, 2010.
U.S. Appl. No. 11/300,902 Non-Final Office Action dated Aug. 6, 2010.
U.S. Appl. No. 11/300,902 Non-Final Office Action dated Nov. 17, 2009.
U.S. Appl. No. 11/300,902 Non-Final Office Action dated Oct. 7, 2008.
U.S. Appl. No. 11/300,902 Final Office Action dated Jun. 4, 2008.
U.S. Appl. No. 11/300,902 Non-Final Office Action dated Oct. 11, 2007.
U.S. Appl. No. 11/300,902 Advisory Action dated Aug. 11, 2008.
U.S. Appl. No. 12/482,892 Non-Final Office Action dated Dec. 13, 2010.
Reexamination Control No. 90-008011 Non-Final Office Action dated Nov. 19, 2007.
Reexamination Control No. 90-008011 Final Office Action dated Aug. 13, 2008.
Reexamination Conrtol No. 90-010301 Non-Final Office Action dated Dec. 2, 2009.
Reexamination Control No. 90-010505 Non-Final Office Action dated Mar. 3, 2010.
Reexamination Control No. 90-010507 Non-Final Office Action dated Mar. 3, 2010.
Reexamination Control No. 90-010508 Non-Final Office Action dated Mar. 3, 2010.
Reexamination Control No. 90-010509 Non-Final Office Action dated Mar. 3, 2010.
Reexamination Control No. 90-010505 Final Office Action dated Aug. 2, 2010.
Reexamination Control No. 90-010507 Final Office Action dated Aug. 2, 2010.
Reexamination Control No. 90-010508 Final Office Action dated Aug. 2, 2010.
Reexamination Control No. 90-010509 Final Office Action dated Aug. 2, 2010.

(56) References Cited

OTHER PUBLICATIONS

Reexamination Control No. 90-010510 Final Office Action dated Aug. 20, 2010.
Reexamination Control No. 90-010511 Final Office Action dated Aug. 20, 2010.
Reexamination Control No. 90-010512 Final Office Action dated Aug. 20, 2010.
Reexamination Control No. 90-010301 Final Office Action dated Nov. 5, 2010.
Reexamination Control No. 90-010510 Final Office Action dated Nov. 5, 2010.
Reexamination Control No. 90-010511 Final Office Action dated Nov. 5, 2010.
Reexamination Control No. 90-010512 Final Office Action dated Nov. 5, 2010.
Reexamination Control No. 90-010510 Non-Final Office Action dated Dec. 2, 2009.
Reexamination Control No. 90-010511 Non-Final Office Action dated Dec. 2, 2009.
Reexamination Control No. 90-010512 Non-Final Office Action dated Dec. 2, 2009.
Reexamination Control No. 90-010301 Notice of Intent to Issue Reexam Certificate dated Dec. 13, 2010.
Nunavut et al., Web Based Remote Security System (WRSS) Model Development, IEEE, Apr. 7-9, 2000, pp. 379-382.
X10, "CK11A ActiveHome, Home Automation System, Owner's Manual," Oct. 23, 1997, pp. 1-56.
X10.com: The Supersite for Home Automation, "What's in the Kit," available at http://web.archive.org/web/19991111133453/www.com/products/x, on Mar. 2, 2009, pp. 1-2.
X10.com: The Supersite for Home Automation, "Wireless Remote Control System (RC5000)," available at http://web.archive.org/web/1999111453227/www.x10.com/products/x1 on Mar. 2, 2009, pp. 1.
X10: The Supersite for Home Automation, "Transceiver Module," available at http://web.archive.org/web/20000229141517/www.x10.com/products/x on Mar. 2, 2009, pp. 1.
Xecom Incorporated, "EX900S Smart Spread Spectrum Transceiver," Nov. 2003 (13 pages).
Young, "USAP: A Unifying Dynamic Distributed Mulitchannel TDMA Slot Assignment Protocol," Rockwell International Communication Systems Division, IEEE (1996).
Yu, "Target Identification Processor for Wireless Sensor Network," Dissertation, Los Angeles: University of California, 1999, pp. 1-110.
Zander et al., "The SOFTNET Project: A Retrospect," 1988 IEEE, pp. 343-345.
Zich et al., "Distribution, Networks, and Networking: Options for Dissemination", Workshop on Electronic Texts Session III, http://palimpsets.stanford.edu/byorg/lc/etextw/sess3.html, pp. 1-10, Accessed Jul. 17, 2007.
Kahn et al., Advances in Packet Radio Technology, Proceedings of the IEEE, vol. 66, No. 11, pp. 1468-1496 (Nov. 1978).
Agre et al., "Development Platform for Self-Organizing Wireless Sensor Networks," Rockwell Science Center and UCLA, Date:Apr. 1999, pp. 257-268.
Kahn, "The Organization of Computer Resources into a Packet Radio Network," IEEE, Jan. 1977, vol. Com-25 No. 1, pp. 169-178.
Rosen, "Exterior Gateway Protocol (EGP)," Bolt Beranek and Newman Inc., Oct. 1982, pp. 1-48.
ADEMCO Group, Control/Communicator 5110XM Installation Instructions, Apr. 1996, Ademco Group, Author: unknown, pp. 1-76.
ADEMCO Group, Vista-128FB Commercial Fire and Burglary Partitioned Security System Quick Start Guide, Oct. 1998, ADEMCO Group, Author: unknown, pp. 1-68.
Brain, "How Motes Work: A Typical Mote," available at http://computer.howstuffworks.com/mote4.htm, on Feb. 25, 2010, pp. 1-2.
MacGregor et al., "Multiple Control Stations in Packet Radio Networks", Bolt, Beranek and Newman, Inc., Cambridge, MA, IEEE 1982, pp. 10.3-1-10.3-5, 1982.
Mak et al., "Design Considerations for Implementation of Large Scale Automatic Meter Reading Systems," IEEE Transactions on Power Delivery, vol. 10, No. 1, Jan. 1995, pp. 97-103.
Malkin, "RFC 2453, RIP Version 2 (Nov. 1998)," available at http://tools.ietf.org/html/rfc2453, Jun. 24, 2009, pp. 1-40.
Maltz et al., "Experiences Designing and Building a Multi-Hop Wireless Ad Hoc Network Testbed", School of Computer Science, Carnegie Mellon University, pp. 1-22, Mar. 5, 1999.
Maltz, "On-Demand Routing in Multi-Hop Wireless Mobile Ad Hoc Networks," Thesis, May 2001, pp. 1-192.
Markie et al., "LonWorks and PC/104: A winning combination," PC/104 Embedded Solutions, Summer 1998, pp. 1-8.
Martel et al., "Home Automation Report: A Modular Minimum Complexity, High-Resolution and Low CostField Device Implementation for Home Automation and Healthcare," MIT; Publisher: unknown; Mar. 31, 1998; pp. 1-29.
McQuillan et al., "The ARPA Network Design Decisions," Computer Networks, vol. 1, No. 5, Aug. 1977 pp. 243-289.
McQuillan et al., "The New Routing Algorithm for the ARPANET," IEEE Transactions on Communications, vol. COM-28, No. 5, May 1980, pp. 711-719.
Mills, "Exterior Gateway Protocol Formal Specification" (Apr. 1984), RFC 904, available at http://tools.ietf.org/html/rfc904, Jun. 24, 2009, pp. 1-32.
Moorman, "Packet Radio Used in a Cost-Effective Automated Weather Meso-Net," available at http://www.wrh.noaa.gov/wrh/96TAs/TA963 1/ta96-31.html, Dec. 3, 1996 (5 pages).
Moy, "RFC 2328, OSPF Version 2 (Apr. 1998)," available at http://tools.ietf.org/html/rfc2328, Jun. 24, 2009, pp. 1-245.
Mozer et al., "The Neural Network House: An Overview," in L. Niklasson & Boden (eds.), Current trends in connectionism (pp. 371-380); Hillsdale: Erlbaun, 1995; pp. 1-9.
Murthy et al., "An Efficient Routing Protocol for Wireless Networks, Mobile Networks and Applications 1," (1996), pp. 183-197.
Negus et al., "HomeRF™ and SWAP: Wireless Networking for the Connected Home," ACM SIGMOBILE Mobile Computing and Communications Review, vol. 2, Issue 4, Oct. 1998, available at http://portal.acm.org/citation.cfm?id=1321400.1321401 on Mar. 29, 2009, pp. 1-2.
NEXTGEN Searches, "IPCO v. The Wireless Sensor Network Industry? Special Report on IPCO v. Oncor et al.," Corporate Manager's Edition, 2009, pp. 1-16.
Nilsen et al., "Storage Monitoring Systems for the Year 2000," Dept. of Energy, Office of Scientific and Technical Information, Report No. SAND—97-8532C, available at http://www.osti.gov/bridge/product.biblio.jsp?query_id=3&page=0&osti_id=303988 (1997).
Ondo, "PLRS/JTIDS Hybrid," Filled Artillery Journal, Jan.-Feb. 1981, pp. 20-25.
Oran (ed.), "OSI IS-IS Intra-Domain Routing Protocol," RFC 1142 (Feb. 1990), available at http://tools.ietf.org/html/rfc1142, Jun. 24, 2009, pp. 1-665.
Park et al., "SensorSim: A Simulation Framework for Sensor Networks," ACM, 2000, pp. 104-111.
Perkins et al., "Ad-Hoc On-Demand Distance Vector Routing "AODV"," http://moment.cs.ucsb.edu/AODV/aodv.html, Aug. 25, 2009, pp. 1-5.
Perkins et al., "Continuous, transparent network access for portable users, A Mobile Networking System Based on Internet Protocol," IEEE Personal Communications, First Quarter 1994, pp. 32-41.
Perkins et al., "Highly Dynamic Destination-Sequenced Distance-Vector Routing (DSDV) for Mobile Computers," SIGCOM Conference on Communications Architectures, Protocols ans Applications, London England UK (Aug. 1994); pp. 234-244.
Perkins et al., "Mobility Support in IPv6," Internet Draft (Sep. 22, 1994), available at http://www.monarch.cs.rice.edu/internet-draft/draft-perkins-ipv6-mobility-sup-oo.txt., Sep. 26, 2009, pp. 1-13.
Perkins et al., "RFC3561—Ad Hoc On-Demand Distance Vector (AODV) Routing (Jul. 2003)," available at http://tools.ietf.org/html?rfc3561, Aug. 25, 2009, pp. 1-38.
Pittway Corporation, "Company History," available at http://www.funginguniverse.com/company-histories/Pittway-Corporation Mar. 6, 2009, pp. 1-5.

(56) References Cited

OTHER PUBLICATIONS

Plaintiffs' Opening Markman Brief in Support of Their Proposed Claim Constructions, filed by the patent owner and its co-plaintiff in *SIPCO LLC et al.* v. *The Toro Co. et al.*, Case No. 2:08-cv-00505-TJS (E.D. Pa.) filed on Sep. 26, 2008.
Pleading—Defendant Digi International Inc.'s First Amended Answer and Defenses of *SIPCO, LLC* v. *CONTROL4 Corporation et al.*, Civil Action No. 6:10-cv-249, currently pending in the U.S. District Court for the Eastern District of Texas, Tyler Division, filed Nov. 22, 2010, pp. 1-27.
Pleading—Defendant Siemens Industry, Inc.'s First Amended Answer and Defenses of *SIPCO, LLC* v. *CONTROL4 Corporation et al.*, Civil Action No. 6:10-cv-249, currently pending in the U.S. District Court for the Eastern District of Texas, Tyler Division, filed Nov. 22, 2010, pp. 1-27.
Poor, Robert D., "Hyphos: A Self-Organizing, Wireless Network," Massachusetts Institute of Technology (Jun. 1997).
Postel (ed.), "Transmission Control Protocol, Version 4," RFC793, available at http://www.faqs.org/rfcs/rfc793.html, Sep. 1981, pp. 1-85.
Postel (Editor), "Internet Protocol, DARPA Internet Program Protocol Specification," RFC 791 (Sep. 1981), Information Sciences Institute, University of So. Cal., pp. 1-45.
Pottie et al., "Adaptive Wireless Arrays Interactive Recconaissance, Surveillance, and Target Acquisition in Small Unit Operations (AWAIRS); Lower Power Wireless Integrated Microsensors (LWIM)," Presented to Dr. E. Carapezza, Dr. D. Lao and Lt. Col. J. Hernandez, UCLA, Rockwell Science Center; Mar. 21, 1997, pp. 1-110.
Pottie et al., "Wireless Integrated Network Sensors," Communications of the ACM, vol. 43, No. 5, May 2000, pp. 51-58.
Pottie et al., "Wireless Integrated Network Sensors: Towards Low Cost and Robust Self-Organizing Security Networks;" EED, UCLA; Rockwell Science Center; SPIE vol. 3577, Nov. 1, 1998, pp. 86-95.
Pottie, "AWAIRS: Mini-Site Review, Project Status," UCLA: Rockwell Science Center, Feb. 23, 1998, pp. 1-58.
Pottie, "Hierarchical Information Processing in Distributed Sensor Networks," ISIT, Aug. 16-21, 1998, IEEE, 1998, pp. 163.
Pottie, "R&D Quarterly and Annual Status Report," SPAWAR (contractor), Apr. 31, 1999.
Pottie, "Wireless Sensor Networks," ITW 1998, Jun. 22-26, 1998, available at http://dantzig.ee.ucla.edu/oclab/Pottie.html, 2 pages.
Rabaey et al., "PicoRadio Support Ad Hoc Ultra-Low Power Wireless Networking," Computer, IEEE, Jul. 2000, pp. 42-48.
Radlherr, "Datentransfer Ohne Draht and Telefon," Funkschau, Nov. 1991, pp. 49-52.
Raji, "Control Networks and the Internet, Rev. 2.0," Echelon Corp., 1998, pp. 1-39.
Raji, "End-to-End Solutions with LonWorks® Control Technology: Any Point, Any Time, Any Where," Echelon Corp.;, 1998, pp. 1-30.
Raji, "Control Networks and the Internet," Echelon Corp., Rev. 2.0, available at http://www.echelon.com/solutions/opensystems/papers/Control_Internet.pdf (1998).
Rants and Ramblings, "Go Wireless . . . At a Payphone," May 10, 2003, http://www.morethanthis.net/blog/archives/2003/05/10/000301.html (2 pages).
Brownrigg et al., "Technical Services in the Age of Electronic Publishing," Library Resource & Technical Services, Jan./Mar. 1984, pp. 59-67.
Brownrigg et al., "User Provided Access to the Internet," available at http://web.simmons.edu/~chen/nit/NIT'92/033-bro.htm, Jun. 9, 2005, pp. 1-6.
Brownrigg, "Continuing Development of California State Radio Packet Project," Proceedings of the ASIS 1992 Mid-Year Meeting (Silver Spring, MD: American Society for Information Science, 1992), pp. 97-100.
Brunninga, "A Worldwide Packet Radio Network," Signal, vol. 42, No. 10, Jun. 1988, pp. 221-230.
Bult et al. Low Power Systems for Wireless Microsensors, UCLA Electrical Engineering Department, 1996 ISPLED, pp. 1-5.
Bult et al., "A Distributed, Wireless MEMS Technology for Condition Based Maintenance," EED, Defense Technical Information Center, UCLA, Electrical Engineering Department, Rockwell Science Center; Apr. 22-26, 1996.
Bult et al., "A Distributed, Wireless MEMS Technology for Condition Based Maintenance," Publisher: unknown; Nov. 1997, pp. 1-8.
Bult et al., "Low Power Systems for Wireless Microsensors," EED, UCLA; ILSPED; 1996, pp. 1-15.
Bult et al., "Low Power Systems for Wireless Microsensors," UCLA Electrical Engineering Department, Los Anegeles, CA and Rockwell Science Center, Thousand Oaks, CA; Aug. 14, 1996, pp. 25-29.
Bult et al., "Low Power Wireless Integrated Microsensors (LWIM)," EED, UCLA; ARPA—LPE PI Meeting, Apr. 27-28, 1995, pp. 1-30.
Bult et al., "Wireless Integrated Microsensors," EED, UCLA Electrical Engineering Department, Rockwell Science Center, TRF; Jun. 6, 1996, pp. 205-210.
CADDX-CADDI Controls, Inc., Ranger 9000E, User's Manual, downloaded from http://www.guardianalarms.net, May 17, 1996, pp. 1-9.
Carlisle, "Edison's NetComm Project," Proceedings of the 33rd Annual Rural Electric Power Conference, IEEE, Apr. 1989, pp. B5/1-B5/4.
Chen et al., "Route Optimization and Location Updates for Mobile Hosts," 1996 IEEE, Proceedings of the 16th ICDCS, pp. 319-326.
Cisco Systems, Inc., Enhanced Interior Gateway Routing Protocol, Cisco Systems, Inc., Updated Sep. 9, 2005, pp. 1-44.
Cisco Systems, RFC1812—Requirements for IP Version 4 Routers, Fred Baker ed. (Jun. 1995), available at http://www.faqs.org/rfcs/rfc1812.html, Sep. 14, 2009, pp. 1-129.
Clement, "SCADA System Using Packet Radios Helps to Lower Cincinnati's Telemetry Costs," WATER/ Engineering & Management, Aug. 1996, pp. 18-20.
Cleveland, "Performance and Design Considerations for Mobile Mesh Networks," Milcom '96 Conference Proceedings, vol. 1 of 3, Oct. 22-24, 1996, pp. 245-249.
Clever Solutions—Metricom offers wireless data networks—includes related articles on Metricom's technology and the SONeTech company—Company Profile, available at http://findarticles.com/p/articles/mi_m0REL/is_n 11_v93/ai_147 70465/?tag=content;col1, on Nov. 22, 1993 (3 pages).
Coactive Networks, Inc., A New Solution for Offering Multive Telemetry Services to the Home, Coactive, 1999, pp. 1-8.
Coactive Networks, Inc., Coactive Connector® 1000 Series, Coactive, 2000, pp. 1-4.
Coactive Networks, Inc., Corporate Backgrounder, Coactive, 2001, pp. 1-6.
Coactive Networks, Inc., Corporate Fact Sheet, Coactive, 2001, pp. 2.
Coactive Networks, Inc., Router-LE: Remote Access to LonWorks Over Ethernet, Coactive, 1998, pp. 1-4.
Coactive Networks, Inc., Router-LL: Connect LonWorks Networks Across Internet Protocol, Coactive, 1998, pp. 1-4.
Cohen et al., "IP Addressing and Routing in a Local Wireless Network," 1992 IEEE, 1992, pp. 626-632.
Corbell et al., "Technical Implementation in Support of the IAEA's Remote Monitoring Field Trial At the Oak Ridge Y-12 Plant," Dept. of Energy, Office of Scientific and Technical Information, Report No. SAND—096-1934C, available at http://www.osti.gov/bridge/product.biblio.jsp?qu ery_id=1&page=0&osti_id=270678 (1996).
Corbell et al., "Technical Results of Y-12/IAEA Field Trial of Remote Monitoring System," Dept. of Energy, Office of Scientific and Technical Information, Report No. SAND—97-1781C, available at http://www.osti.gov/bridge/product.biblio.jsp?query_id=0&page=0&osti_id=505711 (1997).
Corcoran et al., "Browser-Style Interfaces to a Home Automation Network," IEEE Transactions on Consumer Electronics, vol. 43, No. 4, Nov. 1997, pp. 1063-1069.
Corcoran et al., "CEBus Network Access via the World-Wide-Web," available at http://ieeexplore.ieee.org/xpl/freeabs_all.jsp?arnumber= 517285, on Mar. 29, 2009, Paper published on Consumer Electronics, 1996, Digest of Technical Papers, pp. 236-237.
Corcoran et al., "CEBus Network Access via the World-Wide-Web," IEEE, 1996.

(56) References Cited

OTHER PUBLICATIONS

Corson et al., "Architectural Considerations for Mobile Mesh Networking," Milcom '96 Conference Proceedings vol. 1 of 3, Oct. 22-24, 1996, pp. 225-229.

Corson et al., "Internet-Based Mobile Ad Hoc Networking," IEEE Internet Computing, Jul.-Aug. 1999, pp. 63-70.

Court's claim construction Order dated Feb. 10, 2009, in *SIPCO LLC et al.* v. *The Toro Co. et al.*, Case No. 2:08-cv-00505-TJS (E.D. Pa.).

Custom Solutions, Inc. Acessories, available at http://web.archive.org/web/19981206221844/www.csi3.com/hv_pv4.htm on Feb. 27, 2009, pp. 1-3.

Custom Solutions, Inc., HomAtion 2000 for HomeVision, Press Release, available at http://web.archive.org/web/19981207075734/www.csi3.com/HV_PR_0 on Feb. 27, 2009, pp. 1-2.

Custom Solutions, Inc., HomeVision 2.7, Date: unknown, pp. 1-42.

Custom Solutions, Inc., HomeVision 2.7e, Owner's Manual (1999); pp. 1-596.

Custom Solutions, Inc., HomeVision Description, available at http://web.archive.org/web/19981206004955/http://www.csi3.com/HV.htm on Mar. 2, 2009, pp. 1-14.

Custom Solutions, Inc., HomeVision-PC Description, available at http://web.archive.org/web/19981205094024/http://www.csi3.com/hv_pc.htm on Mar. 2, 2009, pp. 1-6.

Custom Solutions, Inc., HomeVision-PC Software, available at http://web.archive.org/web/19990224053817/http://www.csi3.com/hvp3pc.htm on Feb. 27, 2009, pp. 1-2.

Prophet, Graham, Living in a Wireless Wonderland, available at http://www.ednmag.com/infoaccess.asp, Jun. 5, 2010, pp. 79-94.

U.S. Appl. No. 12/816,266 Non-Final Office Action dated Jun. 15, 2011.

U.S. Appl. No. 12/169,536 Non-Final Office Action dated Jun. 8, 2011.

U.S. Appl. No. 12/169,536 Non-Final Office Action dated Nov. 21, 2011.

U.S. Appl. No. 12/689,220 Final Office Action dated Oct. 5, 2011.

U.S. Appl. No. 12/482,892 Non-Final Office Action dated Jun. 28, 2011.

U.S. Appl. No. 12/482,892 Non-Final Office Action dated Nov. 25, 2011.

International Search Report for International Application No. PCT/US1996/10325.

International Search Report for International Application No. PCT/US2000/31166.

Bigioi, "Transparent, Dynamically Configurable RF Network Suitable for Home Automation Applications," 1999.

Letter of Beatrice Thomas (ITRON) to Claude Challandes (SONTEX S.A.) dated Jul. 30, 1997 and attachment titled "ITRON Radio Technology."

"Homeserve Detail d'activites", GRIZZLI Systems, Nov. 10, 1999.

Letter of Alistair Munro (University of Bristol) to Jean-Jacques Ribot (Radian Association) dated Mar. 1, 1999 and attachment titled "Radio Application Network (RADIAN) Protocol Definition Proposal."

"HAI Omni: Features & Specifications," Home Automation, Inc. (archived web page), 1997.

"Home Telemetry Gateway Specifications Sheet: Connector 2000 Series," Coactive 1998.

"How Does the New Power Company Deliver on the Promise of Energy Reconstructing?" NewPower (press release), Author: unknown, May 31, 2001, pp. 1-6.

"IEEE Standards Board: Project Authorization Request (PAR) Form;" http://grouper.ieee.org/groups/802/11/PARs/par80211bapp.html, Mar. 24, 1998.

"Important Dealer Notification—Honeywell AlarmNet-M Network Alert," Source: unknown, Author: unknown, Apr. 2007, pp. 1.

"inCode Telecom Transforming Payphones into Wi-Fi Hot Spots," Jan. 14, 2003, http://www.pocketpcmag.com/news/incode.asp (2 pages).

"Industrial Communications," Author: unknown, available at http://web.archive.org/we b/19990222162354/www.metricom.com/industrial/ on May 10, 2010, pp. 1-3.

"Information Technology—Telecommunications and Information Exchange Between Systems—Local and Metropolitan Area Networks—Specific Requirements—Part 11: Wireless LAN Medium Access Control (MAC) and Physical Layer (PHY) Specifications," Author: unknown, IEEE, Std. 802.11-1997, 1997, pp. 1-445.

"Integrated Communication Services" of Industrial Communications; pp. 1-3; available at web.archive.org/web/19990222162354/www.metricom.com/industrial.

"International Search Report and Written Opinion for International Application No. PCT/US2006/002342," Search Authority European Patent Office, mailed May 31, 2006.

"IOConnect Architecture™," Coactive, 2001, pp. 1-4.

"JC/83RF System: Multiple Facility Management by Radio Network," Johnson Controls, Publication No. 2161, 1983, pp. 1-4.

"Keltron's Home Page with Frames, Index," available at http://web.archive.org/web/19990831161957/http://www.keltroncorp.com, on Mar. 24, 2009, pp. 1.

"Local and Metropolitan Area Networks: Wireless Medium Access Control (MAC) and Physical (PHY) Specifications, Annex A: Protocol Implementation Conformance Statement (PICS) Proforma," Author: unknown; IEEE, Nov. 1997, pp. 1-75.

"LonTalk Protocol, LonWorks™ Engineering Bulletin," Echelon Corp.; Author: unknown; Apr. 1993, pp. 1-27.

"LonWorks® Products, 1998, Version A," Echelon Corp.; Author: unknown; 1997, pp. 1-21.

"LonWorks® Router User's Guide," Echelon Corp., Author: unknown; 1995, pp. 1-136.

"Lon Works® SMX™ Transceiver," datasheet, Echelon Corp.; Author: unknown; 1997, pp. 1-18.

"M100 Series Motor Actuator," Author: unknown, Johnson Controls, Inc., Apr. 1993, pp. 1-20.

"M100C Series Actuator with Digital Control Signal Input and R81CAA-2 Interface Board," Installation Bulletin, Johnson Controls, 2000, pp. 1-12.

"Man-Portable Networked Sensor System (1997-)," Author: unknown, available at http://www.spawar.navy.mil/depts/d30/d37/d371/mpnss/mpnss.html on May 20, 2010, pp. 1-4.

"March of the Motes," Author: unknown, New Scientist, vol. 179, issue 2409, Aug. 23, 2003, pp. 1-8.

"Metasys Compatible Products," Author: unknown; Johnson Controls, Inc., 1997 (9 pages).

"Metasys Extended System Architecture, vol. II," Author: unknown, Publisher: unknown, Sep. 1999.

"Metasys N2 System Protocol Specification for Vendors," Author: unknown, Publisher: unknown, Jun. 1996.

"Modicon Interfacing," Author: unknown, Engineering Report, No. 90-022, Revised: Apr. 12, 1996, pp. 1-9.

"Moore Products—Hart Protocol Interfacing," Author: unknown, Engineering Report, No. 94-007, Revised: Mar. 1, 1996, pp. 1-3.

"MTC Teams with Coactive Networks to Deliver an Advanced Energy Communications and Management Solution," Coactive (press release), Author: unknown, Feb. 5, 2001, pp. 1-4.

"Net77 Central Station Manual Section 3," AES Intellinet, Dec. 1996.

"NewPower and Coactive Networks Announce Strategic Alliance to Deliver the Connected Home," Coactive (press release), Author: unknown, Mar. 14, 2001, pp. 1-4.

"NX-480 Wireless Motion Sensor, document No. 466-1479 Rev. D," Caddx Controls, May 1, 1998.

"Omni Installation Manual," Author: unknown; Home Automation, Inc., Oct. 1997, pp. 1-88.

"Omron Interfacing," Author: unknown, Engineering Report, No. 95-003, Revised: Apr. 17, 1996, pp. 1-4.

"Opto-22 Protocol," Author: unknown, Engineering Report, No. 93-010, Revised: May 31, 1996, pp. 1-8.

"Part 15.1: Wireless Medium Access Control (MAC) and Physical Layer (PHY) Specifications for Wireless Personal Area Networks (WPANS)," www.ieee802.org/15/Bluetooth/802-15-1_Clause_05.pdf, Jun. 14, 2002.

"Phoenix Contact Interfacing, Author: unknown," Engineering Report, No. 94-001, Revised: Jun. 20, 1996, pp. 1-7.

(56) References Cited

OTHER PUBLICATIONS

"Phonelin / HPNA / HomePNA Networks," http://www.homenethelp.com/web/howto/HomeNet-HPNA.asp (visited Jul. 29, 2003) (3 pages).
"PLC Direct (Koyo) Interfacing, Author: unknown," Engineering Report, No. 96-001, Revised: Apr. 10, 1996, pp. 1-8.
"Power/Perfect Energy Management Systems," Author: unknown, Johnson Controls, 1983, pp. 1-4.
"Selected Vendor Telecommunications Products," available at http://eetd.lbl.gov/ea/ems/reports/39015a.pdf (describing public uses in 1995), pp. 1-83.
"Smart Home Technology Leader Intelli Selects Coactive Networks Internet Gateways," Coactive (press release), Author: unknown, Sep. 11, 2000, pp. 1-4.
"Special Poll Feature," Author: unknown, Engineering Report, No. 93-008, Sep. 1993, pp. 1-5.
"Square D Interfacing," Author: unknown, Engineering Report, No. 88-010, Revised: Apr. 18, 1996, pp. 1-9.
"Technology Review, Metricom's Ricochet Packet Radio Network," Ham Radio Online, 1996, Author: unknown, pp. 1-3.
"Texas Instruments Interface," Author: unknown, Engineering Report, No. 91-021, Revised: Nov. 1994, pp. 1-3.
"The New Power Company Announces Revolutionary Energy-Saving Program the Gives Consumers Remote Control of the Their Thermostats via the Internet," NewPower (press release), Author: unknown, Apr. 24, 2001.
"The SNVT Master List and Programmer's Guide," Echelon Corp., Author: unknown, Mar. 1996, pp. 1-23.
To Starbucks and beyond: 802.11 wireless Internet access takes off, CommunicationsSolutions.com, vol. 4, Issue 1, Q1 2003, pp. 8-9.
"Toshiba Interfacing," Author: unknown, Engineering Report, No. 91-011, Revised: Jun. 19, 1996, pp. 1-4.
"TranstexT® Advanced Energy Management System," Brochure, Author: unknown, Integrated Communication Systems, Inc., 1990, pp. 1-8.
AES IntelliNet Model 7050-E & 7750-E, RF Subscriber Unit, Version 1.71, Installation & Operation Manual, AES IntelliNet, Author: unknown, Feb. 24, 1997, available at www.guardianalarms.net, pp. 1-54.
AES IntelliNet Model 7050-E Radio Subscriber Unit Installation Manual, AES IntelliNet, Author: unknown, Jul. 17, 2000, available at www.guardianalarms.net, pp. 1-4.
AES IntelliNet Model 7440 & 7440-XL RF Subscriber Unit, Addendum, AES IntelliNet, Author: unknown, Aug. 29, 2002.
AES IntelliNet Net 77 Version 1.48.30, Installation & Operation Manual, Document 40-0551u, AES Corporation, Author: unknown, Jun. 1999, pp. 1-30.
AES IntelliNet Net 77 Version 1.48.4, Installation & Operation Manual, Document 40-0551u, AES Corporation, Author: unknown, Nov. 2000, pp. 1-36.
AES IntelliNet Net 7K Version 1.48.4, Installation & Operation Manual, Document 400-551, AES Corporation, Nov. 2000, pp. 1-36.
AES IntelliNet Net7K Version 3, Installation & Operation Manual, Document 40-0551, AES Corporation, Jun. 1999, pp. 1-30.
AES IntelliNet Radio Communication Subscriber Unit 7050, Sep. 16, 1997, available at http://web.archive.org/web/19990203061203/www.aes-intellinet.com/sp on Mar. 5, 2009, pp. 1-2.
AES IntelliNet Theory of Operation, AES IntelliNet; Author: unknown, Dec. 1996, downloaded from http://www.guardianalarms.net, pp. 1-18.
AES IntelliNet Wireless Network Glossary of Terms, document 40-0551u, AES IntelliNet, Author: unknown, Dec. 1996, pp. 1-15.
AES IntelliNotes Universal Serial data Interface/USDI, Bulletin No. 55, AES Corporation, Author: unknown, Apr. 5, 2001, pp. 1-12.
AES IntelliTAP Model 7068, Version 1.08, Installation Guide, AES IntelliNet, Author: unknown, Jun. 15, 2000, pp. 1-11.
AES IntelliTRAK 7555-RT GPS Based Vehicle Tracking Unit, Version 2.0a, AES IntelliNet, Author: unknown, Feb. 20, 2001, pp. 1-16.
AES IntelliTRAK 7555-RT GPS Based Vehicle Tracking Unit, Version 2.12, AES IntelliNet, Author: unknown, Nov. 6, 2002, pp. 1-16.
AES Net7000, Installation & Operation Manual, AES Intellinet, Author: unknown, Nov. 24, 1996, pp. 1-76.
AES Net77 Wireless Network Management Software Installation & Operation ManuCentral Station Manual, Section 3, AES IntelliNet, Author: unknown, Dec. 1996, pp. 1-87.
AES UL/ULC System Configuration, AES Corporation, Author: unknown, May 1, 2003, pp. 1.
Agre et al., "Autoconfigurable Distributed Control Systems," ISADS, Apr. 27, 1995.
Airpath Wireless, Inc., "Hot Spot Hardware," Copyright 2003, http://www.airpath.com/programs/hardward/hardware.htm (vistited Jul. 29, 2003) (2 pages).
AlarmLink, Inc. A Brief History available at http://www.alarmlink.com/Default.aspx?tabid=28, on Mar. 23, 2009, pp. 1.
Alarm Link, Inc. Alarm Over IP Products, available at http://www.alarmlink.com/Default.aspx?tabid=38 on Mar. 24, 2009, pp. 1.
Alarm Link, Inc. Central Stations, availabe at http://www.alarmlink.com/Default.aspx?tabid=35, on Mar. 24, 2009.
AlarmLink, Inc. Home Page, avaliable at http://www.alarmlink.com/ on Mar. 24, 2009, pp. 1.
AlarmLink, Inc., "MeshWorks of Los Angeles," available at http://www.alarmlink.com/Default.aspx?tabid=39 on Mar. 24, 2009, pp. 1.
Alwan et al., "Adaptive Mobile Multimedia Networks," IEEE Personal Communications, Apr. 1996, pp. 34-51.
Amir et al., "An Evaluation of the Metricom Ricochet Wireless Network," CS 294-7 Class Project, Department of Electrical Engineering and Computer Science of the University of California at Berkeley, Publisher: unknown, May 7, 1996, pp. 1-20.
Amir, "The Ricochet System Architecture," available at http://www.lariat.org/Berkeley/node2.html, on May 1996, pp. 1-5.
Asada et al., "Low Power Wireless Communication and Signal Processing Circuits for Distributed Microsensors;" Proceedings of the International Circuits and Systems Symposium, ISCAS '97; UCLA, Rockwell Science Center; Jun. 1997, pp. 1-5.
Asada, "Wireless Integrated Network Sensors (WINS)," UCLA, SPIE vol. 3673, Mar. 1999, pp. 11-18.
Baba et al., "Wireless Medium Access Control Protocol for CAN," 4th Int'l CAN Conf., Berlin, Germany, available at http://www.can-cia.org/fileadmin/cia/files/icc/4/baba1.pdf (1997).
Baker et al. "The Architectual Organization of a Mobile Radio Network via a Distributed Algorithm," IEEE, Nov. 1981.
Ball et al., "Reliability of Packet Switching Broadcast Radio Networks," IEEE Transactions on Circuits and Systems, vol. CAS-23, No. 12, Dec. 1976, pp. 806-813.
Beech et al., "AX.25 Link Access Protocol for Amateur Packet Radio, Version 2.2," American Relay & Tucson Amateur Packet Radio Corporation, Jul. 1993, Revised Jul. 1998, pp. 1-143.
Bergstein, "US telco plans WiFi payphone," May 12, 2003, http://www.news.com.au/common/story_page/0,4057,6420676%5E15306,00.html (2 pages).
Bhatnagar et al., "Layer Net: A New Self-Organizing Network Protocol," Department of Electrical Engineering, SUNY, IEEE, 1990.
Black, "Lutron RF Technology, Reliable, First, Forward Thinking," Lutron Electronics Co. Inc., Aug. 2006, pp. 1-16.
Blaney, "HomeRF™ Working Group, 4th Liason Report," IEEE, 802.11-98/360, Nov. 1998, Slides 1-12.
Brain, "How Motes Work," available at http://computer.howstuffworks.com/mote.htm, on Feb. 25, 2010, pp. 1-2.
Brain, "How Motes Work: Ad hoc Networks," available at http://computer.howstuffw_orks.com/mote3.htm on Feb. 25, 2010, pp. 1-3.
Brain, "How Motes Work: The Basic Idea," available at http://computer.howstuff_works.com/mote1.htm, on Feb. 25, 2010, pp. 1-2.
Brain, "How Motes Work: Typical Applications," available at http://computer.howstuff_works.com/mote2.htm, on Feb. 25, 2010, pp. 1-2.
Brayer, "Implementation and Performance of Survivable Computer Communication with Autonomous Decentralized Control," IEEE Communications Magazine, Jul. 1983, pp. 34-41.
Brownrigg et al., "Development of a Packet-Switching Network for Library Automation," Proceedings of the National Online Meeting Apr. 12-14, 1983, pp. 67-74.

(56) References Cited

OTHER PUBLICATIONS

Brownrigg et al., "Distributions, Networks, and Networking: Options for Dissemination," Workshop on Electronic Texts, Session III, available at http://palimpsest.standford.edu/byorg/lc/etextw/sess3.html, Jul. 17, 2007, pp. 1-10.

Brownrigg et al., "Electrons, Electronic Publishing, and Electronic Display," Information Technology and Libraries (Sep. 1985), pp. 201-207.

Brownrigg et al., "Implementing Library Automation Plans in a University Computing Environment, Planning for Computing in Higher Education 5," EDUCOM Series in Computing and Telecommunications in Higher Education, 1980, pp. 215-225.

Brownrigg et al., "Online Catalogues: Through a Glass Darkly," Information Technology and Libraries, Mar. 1983, pp. 104-115.

Brownrigg et al., "Packet Radio for Library Automation," Information Technology and Libraries 3 (Sep. 1984), pp. 229-244.

Brownrigg et al., "Packet Switching and Library Automation: A Management Perspective," Proceedings of the 45th ASIS Annual Meeting Oct. 17-21, 1982, vol. 19, pp. 54-57.

Haartsen, "BLUETOOTH—The Universal Radio Interface for Ad Hoc, Wireless Connectivity;" Ericsson Review No. 3, 1998; pp. 110-117.

Hahn et al., "Packet Radio Network Routing Algorithms: A Survey," IEEE Communications Magazine, vol. 22, No. 11, Nov. 1984, pp. 41-47.

HAI Omni, Features & Specifications, Home Automation, Inc., available at http://web.archive.org/web/19970216055832/www.homeauto.com/omni on Feb. 17, 2009, pp. 1-6.

Hall, "Tactical Internet System Architecture for Task Force XXI," 1996 IEEE, pp. 219-230.

Hamilton et al., "Optimal Routing in Multihop Packet Radio Networks," 1990 IEEE, pp. 389-396.

Harrington, "More Visible Vehicles," ActionLINE, Jul. 2003 (4 pages).

Hedrick, "An Introduction to IGRP," Rutgers, The State University of New Jersey, Center for Computers and Information Services, Laboratory for Computer Science Research, Aug. 22, 1991 (Updated Aug. 10, 2005), pp. 1-21.

Hedrick, "Routing Information Protocol" (Jun. 1988), RFC 1058, available at Http://Tools.Ietf.Org/Html/Rfc1058, Jun. 24, 2009, pp. 1-34.

Hinden et al., "The DARPA Internet Gateway," RFC 823, Publisher: unknown, Sep. 1982, pp. 1-43.

Hogan, "Call of the Wi-Fi," Entrepeneur Magazine, Sep. 2003, pp. 39-42.

Holtsville et al., "Symbol Technologies, Telxon and Aironet Commit to Future Interoperability of Their Wireless Local Area Networks Based on the IEEE 802.11 Specification," Business Wire, Jun. 24, 1996, available at http://www.thefreelibrary.co m/_/print/PrintArticle.aspx?id=18414624, pp. 1-3.

Home Toys, Inc., "HTINews Review," available at http://www.hometoys.com/htinews/aug97/reviews/homevis/homevis1.htm on Mar. 2, 2009, pp. 1-26.

Honeywell, Inc., "Honeywell Home Control Version 2.0 Demonstratin," available at http://web.archive.org/web/19980630195929/www.hbc.honeywell.com/ on Mar. 5, 2009 (7 pages).

Hong et al., "U.S. Lighting Market Characterization, vol. II.: Energy Efficient Lighting Technology Options," Sep. 30, 2005, Reportprepared for Building Technologies Program, Office of Energy Efficiency and Renewable Energy, pp. 1-36.

Hotel Technology Next Generation, "A Guide for Understanding Wireless in Hospitality," an HTNG White Paper, Jun. 2006 (Jayne O'Neill, ed.), pp. 1-77.

Hruschka et al., "Packet Radio, Drahtlose Datenubertragung im Amateurfunk," Elektor, Jun. 1991, pp. 54-57 and 84.

Hsu et al., "Wireless Communications for Smart Dust," Berkeley: UCLA, Jan. 30, 1998, pp. 1-20.

Internet Protocol, Version 4 (IPv4), RFC791 (Sep. 1981).

Internet Protocol, Version 6 (IPv6) Specification, RFC 2460 (Dec. 1998).

Internet Protocol; DARPA Internet Program Protocol Specification, John Postel Editor; Information Sciences Institute, University of Southern California, California; Sep. 1981; pp. 1-45.

Iwata et al., "Scalable Routing Strategies for Ad Hoc Wireless Networks," IEEE Journal on Selected Areas in Communications, vol. 17, No. 8, Aug. 1999, pp. 1369-1379.

Jacobsen, "The Building Blocks of a Smart Sensor for Distributed Control Networks," IEEE Technical Applications Conference Northcon, Nov. 4-6, 1998, pp. 285-290.

JDS Technologies, "Stargate Interactive Automation System," 1998, pp. 1-2.

JDS Technologies, "Stargate, Operation Manual," Mar. 2000, pp. 1-114.

JDS Technologies, "Support: Protocol Specifications," available at http://jdstechnologies.com/protocol.htm, on Feb. 16, 2009, pp. 1-32.

JDS Technologies, "TimeCommander, TimeCommander Plus, User Guide," Jun. 1998, pp. 1-95.

JDS Technologies, "Web Xpander, Installation and Operation Manual," Feb. 2004, pp. 1-34.

Jimenez-Cedeno et al., "Centralized Packet Radio Network: A Communication Approach Suited for Data Collection in a Real-Time Flash Flood Prediction System," ACM-SAC 1993, pp. 709-713.

Johnson Controls, Inc., LonWorks® Digital Controller, 1998, pp. 1-12.

Johnson et al., "Dynamic Source Routing in Ad Hoc Wireless Networks", Computer Science Department, Carnegie Mellon University, A Chapter in Mobile Computing, vol. 353, pp. 1-18, 1996.

Johnson et al., "Dynamic Source Routing in Ad Hoc Wireless Networks," reprinted in Mobile Computing; Tomasz Imielinski and Hank Korth eds., 1996; Kluwer Academic Publishers, pp. 153-181.

Johnson et al., "Protocols for Adaptive Wireless and Mobile Networking," IEEE Personal Communications, 3(1), Feb. 1996, pp. 1-18.

Johnson et al., "Route Optimization in Mobile IP," Internet Draft (Nov. 28, 1994), available at http://www.monarch.cs.rice.edu/internet-drafts/draft-ietf-mobileip-optim-00.txt., Sep. 26, 2009, pp. 1-29.

Johnson, "Mobile Host Internetworking Using IP Loose Source Routing," Carnegie Mellon University CMU-CS-93-128, DARPA Order No. 7330, Feb. 1993, pp. 1-18.

Johnson, "Routing in Ad Hoc Networks of Mobile Hosts," 1995 IEEE, pp. 158-163.

Johnson, "Scalable and Robust Internetwork Routing for Mobile Hosts," 1994 IEEE, pp. 1-11.

Jubin et al., "The DARPA Packet Radio Network Protocols," Proceedings of the IEEE, vol. 75, No. 1, Jan. 1987, pp. 21-32.

Jubin, "Current Packet Radio Network Protocols," Proc. of the IEEE Infocom (Mar. 26-28, 1985), pp. 86-92.

Kaashoek et al., "FLIP: An Internetwork Protocol for Supporting Distributed Systems," ACM Transactions on Computer Systems, vol. 11, No. 1, Feb. 1993, pp. 73-106.

Kaiser et al., "Low Power Wireless Integrated Microsensors (LWIM)," UCLA; Rockwell Science Center; LWIM Kickoff Meeting, Aug. 8, 1995, Presented to Dr. Ken Gabriel (ARPA), Dr. Elissa Sobolewski (ARPA), and Dr. Joseph Kielman (FBI), 62 pages.

Karn et al., "Packet Radio in the Amateur Service," IEEE Journal on Selected Areas in Communications, vol. SAC-3, No. 3, May 1985, pp. 431-439.

Katz et al., "The Bay Area Research Wireless Access Network (BARWAN)" (Jun. 1996) (presentation paper), http://daedalus.cs.berkeley.edu/talks/retreat.6.97/BARWAN.597.ppt, pp. 1-66.

Katz et al., "Towards a Wireless Overlay Internetworking Architecture", DARPA ITO Sponsored Research, 1997 Project Summary, University of California, Berkeley, pp. 1-8, Including a Slide Show Presentation of 56 Pages at http://daedalus.cs.berkeley.edu/talks/retreat.6.96/overview.pdf.

Kemp, "Home Automation Application Guide," Applications for Home Automation in Any Home, vol. 1, 2000, pp. 1-106.

Kleinrock et al., "Hierarchical Routing for Large Networks, Performance Evaluation, and Optimization," Computer Networks 1 (1977), pp. 155-174.

(56) References Cited

OTHER PUBLICATIONS

Kohno et al., "An Adaptive Sensor Network System for Complex Environments in Intelligent Autonomous Systems (Kakazu et al., eds.)," IOS Press, 1998, pp. 21-28.

Kooser et al., "Testing 1-2-3," Entrepreneur Magazine, Sep. 2003, pp. 27-30.

Lacoss, "Distributed Sensor Networks, Final Report," Lincoln Laboratory at Massachusetts Institute of Technology, Sep. 30, 1986, pp. 1-225.

Lauer et al., "Survivable Protocols for Large Scale Packet Radio Networks," IEEE Global Telecommunications Conference, Nov. 26-29, 1984, vol. 1 of 3, pp. 468-471.

Lauer, "Packet-Radio Routing, Routing in Communications Networks," Ch. 11 (1995) pp. 351-396.

Lee et al., "Distributed Measurement and Control Based on the IEEE 1451 Smart Transducer Interface Standards," Proceedings of the 16th IEEE Instrumentation and Measurement Technology Conference, vol. 1, May 24-26, 1999, IEEE, pp. 608-613.

Leiner et al., "Goals and Challenges of the DARPA GloMo Program;" IEEE Personal Communications; Dec. 1996, vol. 3, No. 6; pp. 34-45.

Leviton Manufacturing Co., Inc., "The DECORA® Collection of Designer Devices," 2006, pp. 1-85.

Lewis et al., "Packet-Switching Applique for Tactical VHF Radios," 1987 IEEE Military Communications Conference, Oct. 19-22, 1987, Conference Record vol. 2 of 3, pp. 449-455.

Lin et al., "CMOS Front End Components for Micropower RF Wireless Systems;" EED, UCLA Electrical Engineering Department; 1998, pp. 1-5.

Linear Corporation, "Supervised Digital Security Transmitter t-90, Installation Instructions," 2006, pp. 1-2.

Linear Corporation, "Supervised Digital Security Transmitters TX-91, TX-92, TX-94, Operation Instructions," 1993, pp. 1.

Linear Corporation, "Supervised Wireless Receiver and Zone Expander SRX-64A, Installation Instructions," 2003, pp. 1-2.

Local and Metropolitan Area Networks: Wireless Medium Access Control (MAC) and Physical (PHY) Specifications, Author: unknown; IEEE, Nov. 1997, pp. 1-98.

Clare, "AWAIRS Progress Review: Planned Milestones," UCLA Rockwell Science Center, Nov. 20, 1998.

Lougheed et al., "A Border Gateway Protocol 3 (BGP-3)," RFC 1267, (Oct. 1991), available at http://tools.ietf.org/html/rfc1267, Jun. 24, 2009, pp. 1-36.

Lutron Electronics Co. Inc., Homeowner's Guide for the RadioRA® Quick Start Package, 2004, pp. 1-8.

Lutron Electronics Co. Inc., How to Retrofit RadioRA® Wall-Mounted Master Control into an existing home, Application #41, 2004, pp. 1-2.

Lutron Electronics Co. Inc., IR/RS232 Interface for Bang & Olufsen® Remote Control and RadioRA®, Application Note #119, 2004, pp. 1-3.

Lutron Electronics Co. Inc., Level Capture with a RadioRA® Master Control, Application Note #73, 2003, pp. 1-3.

Lutron Electronics Co. Inc., Modem Installation for HomeWorks®, Application Note #9, 1998, pp. 1-4.

Lutron Electronics Co. Inc., RadioRA® RA-IR-KIT Installation Instructions, Application Note #61, 2000, pp. 1-4.

Lutron Electronics Co. Inc., RadioRA® RF Signal Repeater, 1998, pp. 1-2.

Lutron Electronics Co. Inc., RadioRA® Single-Location Switch, Controls for Permanently Installed Lighting Loads, 1998, pp. 1-2.

Lutron Electronics Co. Inc., RadioRA® Table Lamp Controls, Dimming and Switching Controls for Table and Floor Lamps, 1999, pp. 1-2.

Lutron Electronics Co. Inc., Using a Photocell with the RadioRA® System, Application Note #45, 1998, pp. 1-4.

Lutron Electronics Co. Inc., Using an Astronomic Timeclock with the RadioRA® System, Application Note #42, 1998, pp. 1-2.

Lutron Electronics Co. Inc., Using the RadioRA® System to Activate Scenes 5-16 on a GRAFIK Eye® Control Unit, Application Note #48, 1998, pp. 1-4.

Lutron Electronics Co. Inc., Using the RadioRA® Telephone Interface, Application Note #46, 1998, pp. 1-2.

Lynch et al., "Application of Data Compression Techniques to a Large Bibliographic Database," Proceeding of the Seventh International Conference on Very Large Databases, Cannes, France, Sep. 9-11, 1981 (Washington, DC: IEEE Computer Society Press, 1981), pp. 435-447.

Lynch et al., "Beyond the Integrated Library System Concept: Bibliographic Networking at the University of California," Proceedings of the Second National Conference on Integrated Online Library Systems Proceedings, Sep. 1984, pp. 243-252.

Lynch et al., "Conservation, Preservation and Digitization, Energies for Transition," Proceedings of the Fourth National Conference of the Association of College and Research Libraries, Baltimore, MD, Apr. 9-12, 1986 (Chicago, IL: Association of College and Research Libraries, 1986), pp. 225-228.

Lynch et al., "Document Delivery and Packet Facsimile," Proceedings of the 48th ASIS Annual Meeting, vol. 22, Oct. 20-24, 1985, pp. 11-14.

Lynch et al., "Electronic Publishing, Electronic Imaging, and Document Delivery, Electronic Imaging '86," (Boston, MA: Institute for Graphic Communication, Inc., 1986), pp. 662-667.

Lynch et al., "Library Applications of Electronic Imaging Technology," Information Technology and Libraries, Jun. 1986, pp. 100-105.

Lynch et al., "Packet Radio Networks: Architectures, Protocols, Technologies and Applications," Pergamon Press, 1ed., 1987, pp. 1-275.

Lynch et al., "Public Access Bibliographic Databases in a Multicampus University Environment, Databases in the Humanities and Social Sciences—4," Proceedings of the International Conference on Databases in the Humanities and Social Sciences, Jul. 1987, Learned Information, Inc., 1989, pp. 411-419.

Lynch et al., "The Telecommunications Landscape: 1986," Library Journal, Oct. 1, 1986, pp. 40-46.

"1997 Project Summary, Held Untethered Nodes, University of California at Los Angeles," available at http://web.archive.org/web/199812052324758/http://www.darpa.mil/leaving.asp?url=http://www.janet.ucla.edu/glomo, Jul. 25, 2008, pp. 1-5.

"1997 Project Summary, Mobile Versatile Radios (MoVeR), University of California at Los Angeles," available at http://web.archive.org/web/19990222140122/http://www.darpa.mil/leaving.asp?url=http://www.janet.ucla.edu/, Jul. 25, 2008, pp. 1-4.

"1997 Project Summary, Towards a Wireless Overlay Internetworking Architecture, University of California at Berkeley," available at http://web.archive.org/web/19990202065939/http://www.darpa.mil/leaving.asp?url=http://daedalus.cs.berkeley.edu, Jul. 25, 2008, pp. 1-8.

"3Com Invests in Coactive Networks," Coactive (press release), Author: unknown, Dec. 14, 1999, pp. 1-4.

"5808 Photoelectric Smoke/Heat Detector with Built0in Wireless Transmitter Installation Instructions," Ademco, 1998.

"ABB Kent-Taylor Interfacing," Author: unknown, Engineering Report, No. 93-011, Jun. 18, 1996, pp. 1-9.

"AES Central Station Installation & Operation Manual, Document No. 40-0551e," AES Intellinet, Nov. 1996.

"Allen-Bradley Interfacing," Author: unknown, Engineering Report, No. 90-023, Jul. 21, 1999, pp. 1-11.

AN/TSQ-129 Position Location Reporting System (PLRS), Author: unknown, available at http://www.fas.org/man/dod-101/sys/land/plrs.htm on Feb. 22, 2010, pp. 1-3.

"Barrington Interface," Author: unknown, Engineering Report, No. 90-013, Revised: Oct. 1994, pp. 1.

Bell Canada launches public wireless Internet hotspot pilot, Dec. 10, 2002, http://www.bell.ca/3n/about/press/release/2002/pr_20021210.asp (3 pages).

"Bristol Babcock Interfacing," Author: unknown, Engineering Report, No. 95-001, Revised: Apr. 17, 1996, pp. 1-4.

"Caddx Installation Instructions Package, document No. 466-1486," Caddx Controls, Aug. 1998.

(56) References Cited

OTHER PUBLICATIONS

"Caddx Installation Instructions Package, document No. 466-1786," CADDX Installation Controls, Inc., Caddx Controls; Author: unknown; Aug. 1998, pp. 1-58.
"Caddx Installation Instructions Package," document No. 466-1786, CADDX Installation Controls, Inc., Caddx Controls; Author: unknown; Jul. 15, 1999, pp. 1-116.
"CADDX NetworX NX-8 Control/Communicator Installation Manual," Caddx Controls, 1996.
"Case Study: Genentech Uses Coactive's Technology to Centralize Monitor and Control Functions in a Mixed Legacy and New Equipment Environment," Coactive, Author: unknown, 1998, pp. 1-4.
"Case Study: Ingham Regional Medical Center Uses Coactive Technology to Monitor and Control Critical Power Generations in a Multi-Campus Environment," Coactive, 1998, pp. 1-4.
"Central Station Manual Section 1 System Overview, document No. 40-0551," AES Intellinet, Dec. 1996.
"Circon Systems Partners with Coactive Networks to Deliver Circon WebControl™," Coactive (press release), Author: unknown; Feb. 7, 2000, pp. 1-4.
"Circon Technology Connects Building Management Systems to Internet Using Coactive Routers," Coactive (press release), May 20, 1997.
"Cisco's John Chambers Discusses the Internet Consumer Revolution at CES Using Demo Based on Echelon's LonWorks Technology," Home Toys (press release), Jan. 8, 1999.
Coactive Bridges Gap between Control Systems and Corporate Data Networks with New Off-the-Shelf Router Family, Coactive (press release), Jun. 8, 1998.
"Coactive Enhances Residential Gateway to Enable Multiple Home Networks," Coactive (press release), Author: unknown; Jan. 6, 2000, pp. 1-4.
"Coactive Joins 3Com to Demonstrate Convergence of Control and Enterprise Networks at Retail Systems '98," Coactive (press release), Author: unknown, Jun. 16, 1998, pp. 1-4.
"Coactive Launches First Architecture to Support the Convergence Between Contol and IP Networks," Coactive (press release), Author: unknown, May 20, 1998, pp. 1-4.
"Coactive Leads Standardization Effort for Lon/Talk Routers," Coactive (press release), Author: unknown, May 20, 1997. pp. 3.
"Coactive Networks and Diverse Networks Team to Deliver End-to-End Infrastructure for Enabling the Digital Home," Coactive (press release), Author: unknown, Aug. 28, 2000, pp. 1-4.
"Coactive Networks and Innovex Technologies Deliver Internet Access to Home Security, Lighting and Climate Control," Coactive (press release), Author: unknown, Feb. 29, 2000, pp. 1-4.
"Coactive Networks and Silicon Energy Partner to Delever an End-to-End Solution for Internet-Based Energy Monitoring and Analysis," Coactive (press release), Author: unknown, Sep. 19, 2000, pp. 1-4.
"Coactive Networks and Vicinium Systems team to Deliver a Complete Television-Based Interface to Digital Homes and Neighborhoods," Coactive (press release), Author: unknown, Jun. 19, 2000, pp. 1-4.
"Coactive Networks Announces First Shipments of Internet Gateway to Home Control Systems," Coactive (press release), Author: unknown, May 3, 1999, pp. 1-4.
"Coactive Networks Announces Formation of Technical Advisory Board," Coactive (press release), Author: unknown, Oct. 5, 1998, pp. 1-4.
"Coactive Networks Announces System Provider Partner Program," Coactive (press release), Author: unknown, Jan. 25, 1999, pp. 1-4.
"Coactive Networks Expands Support for Management and HMI Applications," Coactive (press release), Author: unknown, Nov. 2, 1998, pp. 1-4.
"Coactive Networks Names Gus Ezcurra Vice President of Sales," Coactive (press release), Author: unknown, Jul. 20, 1998, pp. 2.
"Coactive Networks Names Janice Roberts, 3Com Senior VP, to Board of Directors," Coactive (press release), Author: unknown, Jun. 2, 1998, pp. 2.

"Coactive Networks Powers Innovative Energy Management Solution," Coactive (press release), Author: unknown, Jan. 5, 2001, pp. 1-4.
"Coactive Networks President Named to LonMark Board of Directors," Coactive (press release), Jun. 14, 1998.
"Coactive Networks Shatters Price Barriers with New IP Gateway to Home Control Systems," Coactive (press release), Author: unknown, Oct. 26, 1998, pp. 1-4.
"Coactive Networks to Supply Internet-Based Home Gateways for up to 400,000 customers; First Phase of Deliveries Valued at US$2 Million," Coactive (press release), Author: unknown, Oct. 25, 1999.
"Coactive Networks Unveils the First Full-Service Residential Gateway," Coactive (press release), Author: unknown, May 3, 2000, pp. 1-4.
"Coactive Receives $2 Million in Funding," Coactive (press release), Oct. 15, 1997.
"Coactive Receives First Round of Venture Funding Investors Embrace Control Network Connectivity Technology," Coactive (press release), Author: unknown, Dec. 1, 1997, pp. 2.
"DSC-3500 Meeting the Control and Conservation Challenge," Johnson Controls, 1984, pp. 1-6.
"DTE Energy Technologies Selects Coactive Networks Internet Gateways to Roll Out New Class of E-Services to Businesses," Coactive (press release), Author: unknown, May 3, 2000, pp. 1-4.
"DTE Energy Technologies Selects Coactive Networks to Power Distributed Generation Solutions Worldwide," Coactive (press release), Author: unknown, Aug. 1, 2001, pp. 1-4.
"Echelon Corporation Demonstrates Internet Connectivity in Digital Home Applications at 1999 International Consumer Electronics Show," Home Toys (press release), Dec. 15, 1998.
"Eight Leading Controls Companies Join Coactive Partner Program," Coactive (press release), Author: unknown, Aug. 21, 2000, pp. 1-4.
"Enhanced Position Location Reporting System (EPLRS)," Author: unknown, available at http://www.globalsecurity.org/military/systems/ground/eplrs.htm on Feb. 22, 2010, pp. 1-3.
"ESTeem Engineering Report, Johnson Controls Interface No. 91-102," Author: unknown, Publisher: unknown, Nov. 1994, pp. 1-14.
"ESTeem Model 96F," Author: unknown, ESTeem Radios; Sep. 6, 1996, pp. 1-2.
"Foxboro Interfacing," Author: unknown, Engineering Report, No. 91-023, Revised: Jun. 19, 1996, pp. 1-5.
"GE Fanuc Interfacing," Author: unknown, Engineering Report, No. 91-010, Revised: Apr. 11, 1996, pp. 1-8.
"General PLC/RTU Interfacing," Author: unknown, Engineering Report, No. 92-010, Revised: Jun. 18, 1996, pp. 1-5.
Rehkter et al., "A Border Gateway Protocol 4 (BGP-4)," RFC 1771, (Mar. 1995), available at http://tools.ietf.org/html.rfc1771, Jun. 24, 2009, pp. 1-58.
Reuters, "Verizon Launches Wi-Fi Hot Spots," May 18, 2003, http://www.wired.com/news/wireless/0,1382,58830,00.html (2 pages).
Ritter et al., The Architecture of Metricom's Microcellular Data Network™ (MCDN) and Details of its Implementation as the Second and Third Generation Ricochet™ Wide-Area Mobile Data Service, IEEE, 2001, pp. 143-152.
Ross et al., "PNC/DOE Remote Monitoring Project at Japan's Joyo Facility," Office of Scientific and Technical Information, Report No. SAND—96-1937C, available at http://www.osti.gov/bridge/product.bib lio.jsp?query_id=0&pa ge=0&osti_id=270680 (1996).
Saffo, Paul, "Sensors: The Next Wave of Infotech Innovation," Institute for the Future (1997).
Salkintzisa et al., "Design and implementation of a low-cost wireless network for remote control and monitoring applications," Elservier, Microprocessors and Microsystems, 1997, pp. 79-88.
Saltzer et al., "Source Routing for Campus-wide Internet Transport (Sep. 15, 1980)," available at http://groups.csail.mit.edu/ana/publications/pubPDFs/Sourcerouting.html, Sep. 21, 2009, pp. 1-14.
Schneider et al., "International Remote Monitoring Project Argentina Nuclear Power Station Spent Fuel Transfer Remote Monitoring System," Dept. of Energy, Office of Scientific and Technical Information,

(56) References Cited

OTHER PUBLICATIONS

Report No. SAND—97-1784C, available at http://www.osti.gov/bridge/product.bibli o.jsp?query_id=1&page=0&osti_id=505674 (1997).
Schulman et al., "SINCGARS Internet Controller-Heart of the Digitized Battlefield," Proceedings of the 1996 Tactical Communications Conference, Apr. 30-May 2, 1996, pp. 417-421.
Shacham et al., "A Packet Radio Network for Library Automation," 1987 IEEE Military Communications Conference, vol. 2, at 21.3.1 (Oct. 1987); pp. 456-462.
Shacham et al., "Dynamic Routing for Real-Time Data Transport in Packet Radio Networks," IEEE Proceedings of INFOCOM '82, pp. 152-159.
Shacham et al., "Future Directions in Packet Radio Architectures and Protocols," Proceedings of the IEEE, vol. 75, No. 1, Jan. 1987, pp. 83-99.
Shacham et al., "Future Directions in Packet Radio Technology," Proceedings of IEEE Infocom 85, Mar. 26-28, 1985, pp, 93-98.
Shacham et al., "Packet Radio Networking," Telecommunications vol. 20, No. 9, Sep. 1986, pp. 42,43,46,48,64 and 82.
Shoch, "Inter-Network Naming, Addressing and Routing, Internet Experiment Note # 19, Notebook section 2.3.3.5," Xerox Palo Alto Research Center, Jan. 29, 1978, Publisher: unknown, pp. 1-9.
Sohrabi et al., Protocols for Self-Organization of a Wireless Sensor Network, IEEE Personal Communications, Oct. 2000, pp. 16-27.
Stern, "Verizon to Offer Wireless Web Link Via Pay Phones," May 10, 2003, http://www.washingtonpopst.com/ac2/wp-dyn?pagename=article&node=&contentID=A367 . . . (3 pages).
Subramanian et al., An Architectural for Building Self-Configurable Systems, IEEE, 2000, pp. 63-73.
Sunshine, "Addressing Problems in Multi-Network Systems," (Apr. 1981), available at ftp://ftp.isi.edu/in-notes/ien/ien178.txt, Sep. 14, 2009, pp. 1-26.
Sunshine, "Addressing Problems in Multi-Network Systems," Proceedings INFOCOM '82, 1982 IEEE, pp. 12-19.
Sunshine, "Network Interconnection and Gateways," IEEE Journal on Selected Areas in Communications, vol. 8, No. 1, Jan. 1990, pp. 4-11.
Sunshine, "Source Routing in Computer Networks," Information Sciences Department of the Rand Corporation (1977), Publisher: unknown, pp. 29-33.
Sutherland, Ed, "Payphones: The Next Hotspot Wave?," Jan. 28 2003, http://www.isp-planet.com/fixed_wireless/news/2003/bellcanada_030128.html (3 pages).
Tanenbaum, "Computer Networks," 4th Int'l CAN Conf., Berlin, Germany, 1997.
Thodorides, "Wireless Integrated Network Sensors," Power Point Presentation, Publisher: unknown, Apr. 15, 2003, pp. 1-19.
Thomas, "Extending CAN Networks by Incorporating Remote Bridging," ESTeem Radios, Nov. 1994.
Thomas, "Extending CAN Networks by Incorporating Remote Bridging," 4th Int'l CAN Conf., Berlin, Germany, available at http://www.cancia.org/fileadmin/cia/files/icc/4/thom as.pdf (1997).
Tobagi et al, "Packet Radio and Satellite Networks," IEEE Communications Magazine, vol. 22, No. 11, Nov. 1984, pp. 24-40.
Toh, "A Novel Distributed Routing Protocol to Support Ad-Hoc Mobile Computing," Conference Proceedings of the 1996 IEEE Fifteenth Annual International Phoenix Conference on Computers and Communications, Mar. 27-29, 1996, pp. 480-486.
Totolo, Home RF, A New Protocol on the Horizon, Feb. 1999, available at www.hometoys.com/htinews/feb99/articles/totolo/totolo.htm on Mar. 2, 2009.
Transmission Control Protocol; "DARPA Internet Program Protocol Specification," John Postel Editor; Information Sciences Institute, University of Southern California, California; Sep. 1981; pp. 1-85.
Varadhan et al., "SDRP Route Construction," Internet Draft, available at draft-ietf-sdr-route-construction-01.{ps,txt}, Feb. 27, 2005, pp. 1-12.
Vardhan, "Wireless Integrated Network Sensors (WINS): Distributed In Situ Sensing for Mission and Flight Systems," 2000 IEEE Aerospace Conference Proceedings, (2000).
Verizon, "Verizon Broadband Anytime," Copyright 2003, https://www33.verizon.com/wifi/login/loacations/locations-remote.jsp (2 pages).
Wang et al., "Energy-Scalable Protocols for Battery Operated MicroSensor Networks," Department of Electrical Engineering Massachusetts Institute of Technology, 1999.
Warrock, "School Give Report on Radio-Based FMS," Energy User News, Nov. 7, 1983, pp. 1.
Weiser, "Some Computer Science Issues in Ubiquitous Computing," Communications of the ACM, Jul. 1993.
Weiser, "The Computer for the 21st Century," Scientific American, Sep. 1991.
Westcott et al., "A Distributed Routing Design for a Broadcast Environment," 1982 IEEE Military Communications Conference on Progress in Spread Spectrum Communications, vol. 3, Oct. 17-20, 1982, pp. 10.4.1-10.4.5.
Westcott et al., "Hierarchical Routing for Very Large Networks," IEEE Military Communications Conference, Oct. 21-24, 1984, Conference Record vol. 2, pp. 214-218.
Westcott, "Issues in Distributed Routing for Mobile Packet Radio Networks," Proceedings of Computer Networks Compcon '82, Sep. 20-23, 1982, pp. 233-238.
Wey, Jyhi-Kong et al., "Clone Terminator: An Authentication Service for Advanced Mobile Phone System", 1995 IEEE 45th Vehicular Technology Conference, Chicago, IL, pp. 175-179 + Cover Page, Jun. 25-28, 1995.
Wikipedia, "Ad Hoc On-Demand Distance Vector Routing," available at http://en.wikipedia.org/wiki/Ad_Hoc_On-Demand_Distance_Vector_Routing on Aug. 25, 2009, pp. 1-3.
Wikipedia, "Border Gateway Protocol," available at http://en.wikipedia.org/wiki/Border_Gateway_Protocol, Jun. 24, 2009, pp. 1-13.
Wikipedia, "Distance-Vector Routing Protocol," available at http://en.wikipedia.org/wiki/Distance-Vector_Routing_Protocol, Jun. 24, 2009, pp. 1-4.
Wikipedia, "Enhanced Interior Gateway Routing Protocol," available at http://en.wikipedia.org/wiki/EIGRP, Jun. 24, 2009, pp. 1-7.
Wikipedia, "Interior Gateway Routing Protocol," available at http://en.wikipedia.org/wiki/Interior_Gateway_Routing_Protocol, Jun. 24, 2009, pp. 1-2.
Wikipedia, "IS-IS," available at http://en.wikipedia.org/wiki/IS-IS, Jun. 24, 2009, pp. 1-3.
Wikipedia, "L. R. Ford, Jr.," available at http://en.wikipedia.org/wiki/L._R._Ford,_Jr, Jun. 24, 2009, pp. 1.
Wikipedia, "Richard E. Bellman," available at http://en.wikipedia.org/wiki/Richard_Bellman, Jun. 24, 2009, pp. 1-3.
Wikipedia, "Routing Information Protocol," available at http://en.wikipedia.org/wiki/Routing_Information_Protocol, Jun. 24, 2009, pp. 1-4.
Will et al., "Wireless Networking for Control and Automation of Off-road Equipment," ASAE, Jul. 18-21, 1999, pp. 1-10.
Wilson, Lexicon 700t Touchscreen Remote, Jan. 1, 1999, available at http://avrev.com/home-theater-remotes-system-control/remotes-system on Mar. 2, 2009, pp. 1-3.
Wu, Jie, "Distributed System Design", Department of Computer Science and Engineering, Florida Atlantic University, CRC Press, pp. 177-180, 204 + Cover Pages, 1999.

\* cited by examiner

36

| 001 | 002 | 003 | 004 | 005 | 006 | 007 | 008 | 009 | 010 |
|---|---|---|---|---|---|---|---|---|---|
| 011 | 012 | 013 | ●14 | 015 | 016 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

Fig. 2a

| 001 | 002 | 003 | 004 | ¥05 | 006 | 007 | 008 | 009 | 010 |

| 011 | 012 | 013 | ●14 | 015 | 016 | 017 | 018 | 019 | 020 |

| 021 | 022 | 023 | 024 | 025 | ●26 | 027 | 028 | 029 | 030 |

| 031 | 032 | 033 | 034 | 035 | 036 | 037 | 038 | 039 | 040 |

| 041 | 042 | 043 | 044 | 045 | 046 | 047 | 048 | 049 | 050 |

| 051 | 052 | 053 | 054 | 055 | 056 | 057 | 058 | 059 | 060 |

There is only one Internet server in range of client 5.

5 will issue an "I am alive" packet seeking a route to the Internet.

Internet server 14 will respond and add user client 5 to its routing table as its left son.

The updated routing table of Internet server 14 is: 14(05).

The route from user client 5 to the Internet is: 05>14.

Fig. 2b

| 001 | 002 | 003 | 004 | ¥05 | ¥06 | 007 | 008 | 009 | 010 |
| 011 | 012 | 013 | ●14 | 015 | 016 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

36

There is only one user client in range of client 6.

6 will issue an "I am alive" packet seeking a client repeater route to the Internet.

5 will respond and add 6 to its routing table as its left son.

The updated routing table of Internet server 14 is:
14(05(06)).

The route from user client 6 to the Internet is: 06>05>14.

| 001 | 002 | 003 | 004 | ¥05 | ¥06 | ¥07 | 008 | 009 | 010 |
| --- | --- | --- | --- | --- | --- | --- | --- | --- | --- |
| 011 | 012 | 013 | ●14 | 015 | 016 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

There is only one user client in range of client 7.

7 will issue an "I am alive" packet seeking a client repeater route to the Internet.

6 will respond and add 7 to its routing table as its left son.

The updated routing table of Internet server 14 is:
14(05(06(07))).

The route from user client 7 to the Internet is: 07>06>05>14.

Fig. 2d

| 001 | 002 | 003 | 004 | ¥05 | ¥06 | ¥07 | 008 | 009 | 010 |
|-----|-----|-----|-----|-----|-----|-----|-----|-----|-----|
| 011 | 012 | 013 | ●14 | 015 | ¥16 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

36

There is only one Internet server in range of client 16.

16 will issue an "I am alive" packet seeking a route to the Internet.

Internet server 26 will respond and add user client 16 to its routing table as its left son.

The updated routing table of Internet server 26 is: 26(16).

The route from user client 16 to the Internet is: 16>26.

Fig. 2e

Server 14 = 14(05(06))
Server 26 = 26(16(07))

Client 05 = 05(06); >14
Client 06 = 06; >05>14
Client 07 = 07; >16>26
Client 16 = 16(07); >26

In a universe of 6 nodes, of which 2 are servers, the average hop distance from a client to an Internet server is 1.5.

| ¥01 | ¥02 | ¥03 | ¥04 | ¥05 | ¥06 | ¥07 | ¥08 | ¥09 | ¥10 |
|---|---|---|---|---|---|---|---|---|---|
| ¥11 | ¥12 | ¥13 | ●14 | ¥15 | ¥16 | ¥17 | ¥18 | ¥19 | ¥20 |
| ¥21 | ¥22 | ¥23 | ¥24 | ¥25 | ●26 | ¥27 | ¥28 | ¥29 | ¥30 |
| ¥31 | ¥32 | ¥33 | ¥34 | ¥35 | ¥36 | ¥37 | ¥38 | ¥39 | ¥40 |
| ¥41 | ¥42 | ¥43 | ¥44 | ¥45 | ¥46 | ¥47 | ¥48 | ¥49 | ¥50 |
| ¥51 | ¥52 | ¥53 | ¥54 | ¥55 | ¥56 | ¥57 | ¥58 | ¥59 | ¥60 |

Fig. 2g

Server 14 =
14(24(34),23(32(41(51),42(52)),33(43)),13(22(31)),05(06),
04,03(02(11),12(01,21)))

Server 26 =
26(37(48(59(60),49(50),58),38(39(40)),28(29(30)),47(57)),
36(46(56)),35(44(53,54),45(55)),27(18(19(20))),25,
17(08(09(10))),07,16,15)

Client 01 = 01; >12>03>14
Client 02 = 02(11); >03>14
Client 03 = 03(02(11),12(01,21)); >14
Client 04 = 04; >14
Client 05 = 05(06); >14
Client 06 = 06; >05>14
Client 07 = 07; >17>26
Client 08 = 08(09(10)); >17>26
Client 09 = 09(10); >08>17>26
Client 10 = 10; >09>08>17>26
Client 11 = 11; >02>03>14
Client 12 = 12(01,21); >03>14
Client 13 = 13(22(31)); >14
Client 15 = 15; >26
Client 16 = 16; >26
Client 17 = 17(08(09(10)),07); >26
Client 18 = 18(19(20)); >27>26
Client 19 = 19(20); >18>27>26
Client 20 = 20; >19>18>27>26
Client 21 = 21; >12>03>14
Client 22 = 22(31); >13>14
Client 23 = 23(32(41(51),42(52)),33(43)); >14
Client 24 = 24(34); >14
Client 25 = 25; >26
Client 27 = 27(18(19(20))); >26
Client 28 = 28(29(30));>37>26
Client 29 = 29(30);>28>37>26
Client 30 = 30;>29>28>37>26
Client 31 = 31;>22>13>14

Fig. 2h'

Client 32 = 32(41(51),42(52)); >23>14
Client 33 = 33(43);>23>14
Client 34 = 34;>24>14
Client 35 = 35(44(53,54),45(55));>26
Client 36 = 36(46(56));>26
Client 37 = 37(48(59(60),49(50),58),38(39(40)),
28(29(30)),47(57));>26
Client 38 = 38(39(40));>37>26
Client 39 = 39(40);>38>37>26
Client 40 = 40;>39>38>37>26
Client 41 = 41(51);>32>23>14
Client 42 = 42(52);>32>23>14
Client 43 = 43;>33>23>14
Client 44 = 44(53,54);>35>26
Client 45 = 45(55);>35>26
Client 46 = 46(56);>36>26
Client 47 = 47(57);>37>26
Client 48 = 48(59(60),49(50),58);>37>26
Client 49 = 49(50);>48>37>26
Client 50 = 50;>49>48>37>26
Client 51 = 51;>41>32>23>14
Client 52 = 52;>42>32>23>14
Client 53 = 53;>44>35>26
Client 54 = 54;>44>35>26
Client 55 = 55;>45>35>26
Client 56 = 56;>46>36>26
Client 57 = 57;>47>37>26
Client 58 = 58;>48>37>26
Client 59 = 59(60);>48>37>26
Client 60 = 60;>59>48>37>26

In a universe of 60 nodes, of which 2 are servers, the average hop distance from a client to an Internet server is 2.36206897.

Fig. 2h"

Traversing user client universe . . ..

User client, 9, has 5 user client neighbors.

User client, 9, will probe each for the shortest route to the Internet.
9's current route to the Internet is: nonexistant.

9 is now probing 10.
User client, 9, has no Internet server.
9's current route to the Internet is: nonexistant.

9 is now probing 20.
User client, 9, has no Internet server.
9's current route to the Internet is: nonexistant.

9 is now probing 19.
User client, 9, has no Internet server.
9's current route to the Internet is: nonexistant.

9 is now probing 18.
User client, 9, has no Internet server.
9's current route to the Internet is: nonexistant.

9 is now probing 8.
User client 8 will add 9 to its routing table as its left son.

The updated routing table of Internet server 14 is:
14(05(06(07(08(09)))),04,03).

The route from user client 9 to the Internet is:
09>08>07>06>05>14.

Fig. 2i

Traversing user client universe . . ..

User client, 29, has 8 user client neighbors.

User client, 29, will probe each for the shortest route to the Internet.
29's current route to the Internet is: nonexistant.

29 is now probing 19.
User client 19 will add 29 to its routing table as its left son.

The updated routing table of Internet server 14 is:
14(24,23,13,05(06(07(08(18(28),09(19(29),10(20))))),
04,03(12(22,21))).

The route from user client 29 to the Internet is:
29>19>09>08>07>06>05>14.

Fig. 2j

Traversing user client universe . . ..

User client, 7, has 5 user client neighbors.

User client, 7, will probe each for the shortest route to the Internet.
7's current route to the Internet is: 07>06>05>14.

7 is now probing 8.
7's current route to the Internet is: 07>06>05>14.

7 is now probing 18.
7's current route to the Internet is: 07>06>05>14.

7 is now probing 17.
User client, 7, has probed its neighbor, user client, 17, and found a shorter path to the Internet.

The old routing table of Internet server, 14, is:
14(24(34(44(54))),23(33(43(53))),13,05(06(07(08(18(28(38(48(58)))),
09(19(29(39(49(59)))),10(20(30(40(50(60)))))))))),04,03(02,12(01,
22(32(42(52))),21(31(41(51))))).

The updated routing table of Internet server, 26, is:
26(37(47(57)),36(46(56)),35(45(55)),27,25,17(07(08(18(28(38
(48(58)))),09(19(29(39(49(59)))),10(20(30(40(50(60)))))))))),16,15).

The route from user client, 7, to the Internet is: 07>17>26.
7's current route to the Internet is: 07>17>26.

7 is now probing 16.
7's current route to the Internet is: 07>17>26.

7 is now probing 6.
7's final route is 07>17>26.

Fig. 2k

Traversing user client universe . . ..

User client, 8, has 5 user client neighbors.

User client, 8, will probe each for the shortest route to the Internet.
8's current route to the Internet is: 08>07>17>26.

8 is now probing 9.
8's current route to the Internet is: 08>07>17>26.

8 is now probing 19.
8's current route to the Internet is: 08>07>17>26.

8 is now probing 18.
8's current route to the Internet is: 08>07>17>26.

8 is now probing 17.
User client, 8, has probed its neighbor, user client, 17, and found a shorter path to the Internet.

The old routing table of Internet server, 26, is:
26(37(47(57)),36(46(56)),35(45(55)),27,25,17(07(08(18(28(38(48(58)))),09(19(29(39(49(59)))),10(20(30(40(50(60)))))))),16,15).

The updated routing table of Internet server, 26, is:
26(37(47(57)),36(46(56)),35(45(55)),27,25,17(08(18(28(38(48(58)))),09(19(29(39(49(59)))),10(20(30(40(50(60))))))),07),16,15).

The route from user client, 8, to the Internet is: 08>17>26.
8's current route to the Internet is: 08>17>26.

8 is now probing 7.
8's final route is 08>17>26.

Fig. 2I

Traversing user client universe . . ..

User client, 18, has 8 user client neighbors.

User client, 18, will probe each for the shortest route to the Internet.
18's current route to the Internet is: 18>08>17>26.

18 is now probing 8.
18's current route to the Internet is: 18>08>17>26.

18 is now probing 9.
18's current route to the Internet is: 18>08>17>26.

18 is now probing 19.
18's current route to the Internet is: 18>08>17>26.

18 is now probing 29.
18's current route to the Internet is: 18>08>17>26.

18 is now probing 28.
18's current route to the Internet is: 18>08>17>26.

18 is now probing 27.
User client, 18, has probed its neighbor, user client, 27, and found a shorter path to the Internet.
The old routing table of Internet server, 26, is:
26(37(47(57)),36(46(56)),35(45(55)),27,25,17(08(18(28(38(48(58)))),09(19(29(39(49(59)))),10(20(30(40(50(60)))))),07),16,15).

The updated routing table of Internet server, 26, is:
26(37(47(57)),36(46(56)),35(45(55)),27(18(28(38(48(58))))),25,17(08(09(19(29(39(49(59)))),10(20(30(40(50(60)))))),07),16,15).

The route from user client, 18, to the Internet is: 18>27>26.
18's current route to the Internet is: 18>27>26.

18 is now probing . . ..

18's final route is 18>27>26.

Fig. 2m

User client, 29, has 8 user client neighbors.

User client, 29, will probe each for the shortest route to the Internet.
29's current route to the Internet is: 29>19>18>27>26.

29 is now probing 19.
29's current route to the Internet is: 29>19>18>27>26.

29 is now probing 20.
29's current route to the Internet is: 29>19>18>27>26.

29 is now probing 30.
29's current route to the Internet is: 29>19>18>27>26.

29 is now probing 40.
29's current route to the Internet is: 29>19>18>27>26.

29 is now probing 39.
29's current route to the Internet is: 29>19>18>27>26.

29 is now probing 38.
29's current route to the Internet is: 29>19>18>27>26.

29 is now probing 28.
User client, 29, has probed its neighbor, user client, 28, and found a shorter path to the Internet.
The old routing table of Internet server, 26, is:
26(37(28(38(48(58))),47(57)),36(46(56)),35(45(55)),27(18(19(20
(30(40(50(60)))),29(39(49(59))))),25,17(08(09(10)),07),16,15).

The updated routing table of Internet server, 26, is:
26(37(28(29(39(49(59))),38(48(58))),47(57)),36(46(56)),35(45(55)),
27(18(19(20(30(40(50(60))))))),25,17(08(09(10)),07),16,15).

The route from user client, 29, to the Internet is: 29>28>37>26.
29's current route to the Internet is: 29>28>37>26.

29 is now probing 18.
29's final route is 29>28>37>26.

Fig. 2n

Traversing user client universe . . ..

User client, 44, has 8 user client neighbors.

User client, 44, will probe each for the shortest route to the Internet.
44's current route to the Internet is: 44>34>24>14.

44 is now probing 34.
44's current route to the Internet is: 44>34>24>14.

44 is now probing 35.
User client, 44, has probed its neighbor, user client, 35, and found a shorter path to the Internet.
The old routing table of Internet server, 14, is:
14(24(34(44(54))),23(32(41(51),42(52)),33(43(53))),13(22(31)),
05(06),04,03(02,12(01(11),21))).

The updated routing table of Internet server, 14, is:
14(24(34),23(32(41(51),42(52)),33(43(53))),13(22(31)),05(06),04,
03(02,12(01(11),21))).

The updated routing table of Internet server, 26, is:
26(37(38(39(40(50(60)),49(59)),48(58)),28(29(30)),47(57)),36(46
(56)),35(44(54),45(55)),27(18(19(20))),25,17(08(09(10))),07),16,15).

The route from user client, 44, to the Internet is: 44>35>26.
44's current route to the Internet is: 44>28>37>26.

44 is now probing . . .
.
.
.
44's final route is 44>35>26.

Fig. 2o

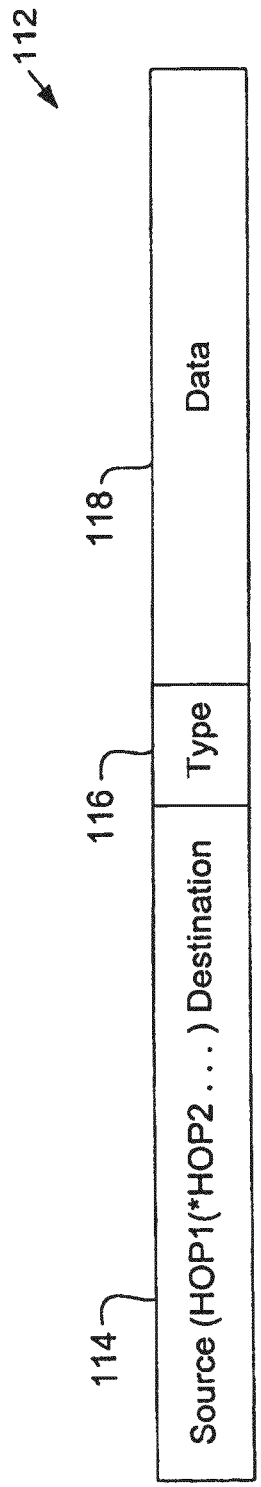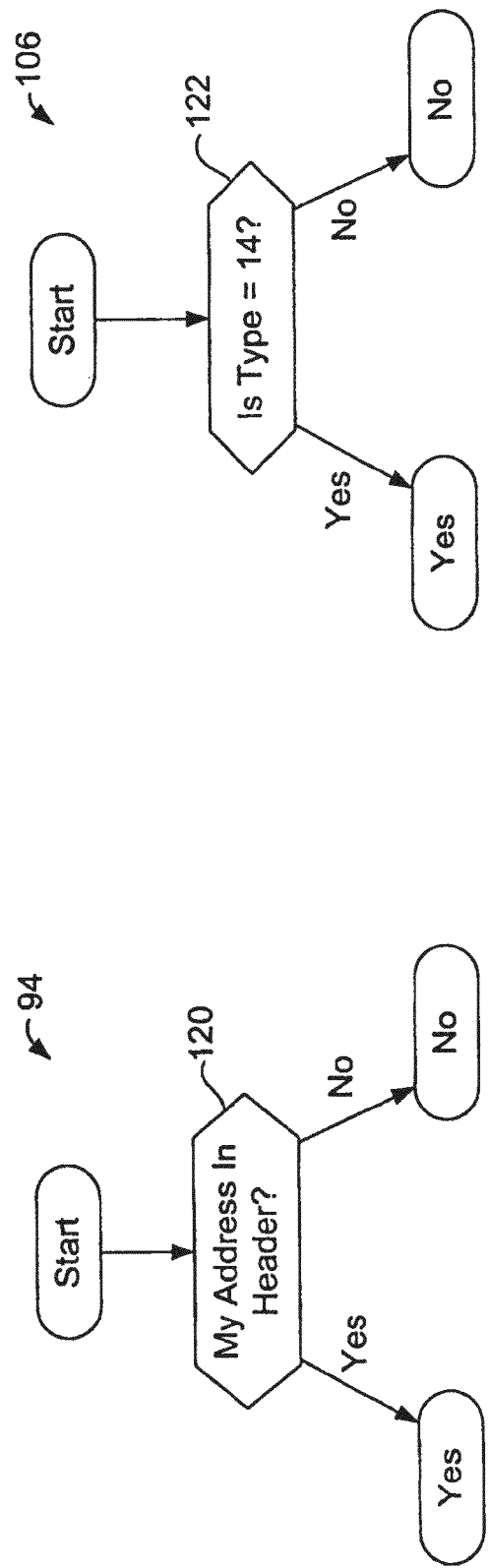

X(3(9,Z(8,5,Q(P))),B)   ← 222

| Element | Node Name | Time Stamp | Memory Location Of Node |
|---|---|---|---|
| 1 | 3 | 1AFG | 12FG3 |
| 2 | P | E013 | 9AA22 |
| 3 | X | 99F6 | . |
| 4 | 5 | B999 | . |
| 5 | 8 | B999 | . |
| 6 | Q | . | . |
| 7 | 9 | . | . |
| 8 | B | . | . |
| 9 | Z | . | . |
| . | . | . | . |
| . | . | . | . |
| . | . | . | . |

224 → Element
226 → Node Name
228 → Time Stamp
230 → Memory Location Of Node

| Code Received | Server Response | Client Response |
|---|---|---|
| 01 | 02 + One-Way Seed | Drop |
| 02 | Drop | 05 + One-Way Response |
| 03 | Drop | 04 + Seed Or Null |
| 04 | Drop | 05 + One-Way Seed |
| 05 | If 02 And Authentic Then 06 Else Drop | If 04 And Authentic Then 06 Else Drop |
| 06 | Drop | If 05 Then 07 Else Drop |
| 07 | 08 | Drop |
| 08 | Drop | Update Tree Or Repeat Data |
| 09 | Drop | 10 |
| 10 | Drop | Update Tree Or Repeat Data |
| 11 | Drop | Send 11 To LEFTSON With Address of Departer Plus 01 to Reconnect |
| 12 | Reserved | Reserved |
| 13 | Delete Sender | Drops |
| 14 | Send To Network Transmit Buffer | Send To Computer Transmit Buffer |
| 86 | Reserved | Reserved |

X(3(Z(Q(P))))    Fig. 21c ived by 
WIRELESS NETWORK SYSTEM AND METHOD FOR PROVIDING SAME

CROSS-REFERENCE TO RELATED APPLICATIONS

This application is a continuation application claiming priority under 35 U.S.C. §120 to U.S. application Ser. No. 12/482,892, filed Jun. 11, 2009, which is a continuation application claiming priority under 35 U.S.C. §120 to U.S. application Ser. No. 11/300,902, filed Dec. 15, 2005, now U.S. Pat. No. 8,000,314, which is a continuation application claiming priority under 35 U.S.C. §120 to U.S. application Ser. No. 10/386,159, filed Mar. 10, 2003, now U.S. Pat. No. 7,054,271, which is a continuation application claiming priority under 35 U.S.C. §120 to U.S. application Ser. No. 09/492,933, filed Jan. 27, 2000, which is a continuation application claiming priority under 35 U.S.C. §120 to U.S. application Ser. No. 08/760,895, filed Dec. 6, 1996, now U.S. Pat. No. 6,044,062 all of which are hereby incorporated by reference in their entirety as if fully set forth below.

TECHNICAL FIELD

This invention relates generally to digital computer networks, and more particularly to wireless digital networks for the transmission of digital data packets.

BACKGROUND ART

There are many kinds of networks that can be used to couple computers together for data communication. For example, a simple local area network (LAN), such as Novell® network or Appleshare® network can be used to couple together the personal computer in an office. Often, one or more network "servers" or "hosts" will influence data flow within the network and access to certain network functions such as a central file repository, printer functions, Internet gateways, etc. Other local area networks operate on a peer-to-peer basis without the use of servers.

A wide area network (WAN) is sometimes referred to as a "networks of networks." The Internet is a WAN that has, of late, become extremely popular. The origins of the Internet date back several decades to a government-sponsored military/business/research WAN that was designed to remain operational even in the event of a catastrophic loss of a large portion of the network. To accomplish this goal, robust protocols and systems were developed, which allowed a geographically distributed collection of computer systems to be connected by means of a network that would remain operational even if a large portion of the network were destroyed.

While the use of Internet has been prevalent for many years now, its use has been limited by the arcane and often difficult commands required to access the various resources of the network. To address this problem, a protocol known as the "World Wide Web" or "WWW" was developed to provide an easier and more user-friendly interface to the Internet. With the World Wide Web, an entity having a domain name creates a "web page" or simply "page" which can provide information and, to ever greater extent, some interactivity with the web page.

The Internet is based upon a transmission protocol known as "Transmission Control Protocol/Internet Protocol" (or "TCP/IP" for short), which sends packets of data between a host machine, e.g. a server computer on the Internet, and a client machine, e.g. a user's personal computer connected to the Internet. The WWW is an Internet interface protocol which is supported by the same TCP/IP transmission protocol. Intranets are private networks based on the Internet standards, and have become quite common for managing information and communication within an organization. Intranets, since they subscribe to Internet standards, can use the same web browser and web server software as used on the Internet. Internets are, in many cases, supplementing or replacing traditional local area network protocols.

Most, if not all, of the data communication links between the various machines of most networks area hard-wired. That is, client machines are typically coupled to a server and to other client machines by wires (such as twisted-pair wires), coaxial cables, fiber optic cables and the like. In some instances, some of the communication links can be wir3eless communication links such as microwave links, radio frequency (r.f.) links, etc., but this tends to be rare with most LANs.

The majority of so-called wireless networks are radio modems for data communication, although there are some IR networks available that work over very short distances, such as within a single large room. However networks spanning larger areas will predominately use radio modems. GRE America, Inc of Belmont, Calif. sells a number of spread-spectrum modems that can be used for the transmission of digitally encoded information. A number of wireless network services such as Ricochet® network services (Ricochet is a subsidiary of Metrocom, Inc of Los Gatos, Calif.) combine a radio modem with a portable personal computer to allow the personal computer to connect to the Internet. The Ricochet system operates by providing a large number of r.f. data transceivers within a given geographic area, that is often attached to telephone poles, and that are coupled to centralized server that serves as a gateway to the Internet.

The assumption made by the Ricochet system designers is that a given radio modem coupled to portable computer will be in radio contact with one, and only one transceiver of the network. A data "packet" sent by portable computer via the radio modem will be received by the transceiver and broadcast through the Ricochet network until it reaches a Wide Area Processor or WAP, where it is transmitted by twisted pair over the internet to a Ricochet server connected to the Internet. Packets destined for a particular personal computer are received by the server of the Ricochet system, and are transmitted from each of the transceivers with the expectation that the radio modem of the destination portable computer will receive the data packets from one of those transceivers.

It should be noted that wireless communication systems such as Ricochet system exhibit a number of drawbacks. For one, if the radio modem of the personal computer is not within transmission range of one of the transceivers of the Ricochet network, a connection cannot be made to the network. Furthermore, the Ricochet network can create a great deal of "packet duplication" or "pollution" as copies of a particular data packet are multiply repeated, rather than routed. This packet duplication can also occur if a radio modem of a particular personal computer is radio transmission range of two or more transceivers can each receive the data packets, and each proliferates copies of the data packet across the Ricochet network. While duplicate packets are ultimately discarded, such duplicate packets increase data congestion in the network and increases the work that must be performed by the server. In addition, since data packets are transmitted from all the transceivers of the Ricochet network, there may be packet duplication at the personal computer if it is in contact with more than one transceiver of the Ricochet network, and the bandwidth available from each transceiver is reduced since each transceiver is transceiving each client-destined data packet on the network. Also, since the data is transmitted to the Internet over twisted pair, there is a 28.8K baud bottleneck in the system, resulting in average system performance of even less than 28.8K baud. It is therefore apparent that prior art wireless networks of the Ricochet network type lack robustness (i.e. the ability to maintain communication with the network under adverse conditions) and exhibit a number of inefficiencies such as data packet proliferation.

Cellular telephone system operates using a number of transceivers, where each transceiver occupies a "cell." As a mobile telephone moves from one cell to another, an elaborate and expensive land-based system causes the mobile telephone to "handed-off" from the cell that it was previously in to the cell that is entering. As noted, the equipment and system used for the hand-off is expensive and, further, such hand-off sometimes fail, dropping the telephone connection. Furthermore, individual radios at a given cell can handle only one call at the time, which is inadequate for many computer network systems.

Amateur radio ("Ham") operators have developed a peer-to-peer digital repeater system referred to as the AX.25 protocol. With this protocol, each peer repeats all data packets that it receives, resulting in rapid packet proliferation. In fact, with this protocol, so many packet collisions occur among the peers that the packets may never reach the intended peer.

Lastly there is abundant reporting in the literature, but it cannot be substantiated, that the U.S. Military has a wireless communication system which allows digital information to be transmitted in a more robust and efficient manner. More specifically, it is suspected that the U.S. Military has a system in which digital data can follow multiple paths to a server that may include one or more clients of the network. However, source code listings, or source code machine-readable form of these U.S. Military systems remains secret and unavailable to the public. Some of the literature pertaining to this U.S. Military technology is summarized below.

"Packet Radios Provide Link for Distributed Survivable Command Control Communications in Post-Attack Scenarious", M. Frankel, Microwave Systems News 13:6 (June, 1983) pp 80-108, discusses the SURAN (Survivable Radio Network) project and its relation to overall command and control communications (C.sup.3) development.

"Congestion Control Using Pacing in a Packet Radio Network", N. Goweer and J. Jubin, Proceedings of Milcom 82, (New York: IEEE Press, 1985), pp. 23.1-23.6, describes a technique for pacing flow control used in the DARPA packet radio project.

"Current Packet Radio Network Protocols", J. Jubin, Proceedings of Infocom 85 (New York: IEEE Press, 1985), pp 86-92, is a systematic view of the various protocols currently used in the DARPA packet radio network. The article includes a discussion of packing, route calculation, maintenance of route and connectivity tables, acknowledgement schemes, and other mechanisms. The article also provides a discussion on how the various protocols interrelate and reinforce each other.

"The Organization of Computer Resources into a Packet Radio Network", R. Kahn, IEEE Transactions on Communications COM-25.1 (January 1997), pp 169-178, is a prospectus for the second generation of the DARPA radio project. This lead to the development of the DARPA Bay Area Packet Radio experimental work in the mid to late 1970's.

"Advances in Packet Radio Technology", R. Kahn, S. Gronemeyer, J. Burchfiel, R. Kunzelman, Proceedings of the IEEE 66z:11 (November 1978), pp 1468-1496 is a survey of packet radio technology in the second generation of the DARPA packet radio project.

"Survivable Protocols for Large Scale Packet Radio Networks", G. Lauer, J. Wescott, J. Jubin, J. Tornow, IEEE Global Telecommunications Conference, 1984, held in Atlanta, Ga., November 1984 (New York: IEEE Press, 1984) p. 468-471, describes the SURAN network with an emphasis on network organizations and management protocols.

"Multiple Control Stations in Packet Radio Networks," W. MacgGegor, J. Wescott, M. Beeler, Proceedings of Milcom 82 (New York: IEEE Press, 1982) pp. 10.3-5, is a transitional paper that describes design considerations involved in converting the DARPA packet radio network from single to multistation operation while eliminating the additional step to a fully hierarchical design. It focuses on the self-organizing techniques that are necessary in the multistation environment.

"Future Directions in Packet Radio Technology", N Shacham, J. Tumow, Proceedings of IEEE Infocom 85 (New York: IEEE Press, 1985), pp. 93-98, discuss new research areas in packet radio, with some references to SURAN developments.

"Issues in Distributed Routing for Mobile Packet Radio Networks", J. Westcott, IEEE Global Telecommunications Conference, 1982 (new York: IEEE Press 1982, pp 233-238, studies the issues involved in the DARPA packet radio network, prior to availability of signal strength sensing from the radio receivers as a hardware capability on which to build. The paper describes issues that must be considered in evaluating the usability of an RF link and gives details of the alternate route mechanism used in the DARPA system to smooth temporary RF propagation problems that appear in a mobile node environment.

"A Distributed Routing Design for a Broadcast Environment", J. Westcott, J. Jubin, Proceedings of Milcom 82 (New York IEEE Press, 1982), pp 10.4-1-10.4.5, is a detailed study of the problems involved in connectivity and routing table management in stationless packet radio, including a discussion of algorithms—proposed for the DARPA packet radio network.

There is, therefore, a great deal of literature describing packet radio systems. The prior art does not disclose, however, a packet-based wireless computer network that is both robust and efficient, wherein each client of the network can be efficiently and effectively in communication with a multiplicity of other clients and servers of the network, greatly multiplying the number of link choices available and, if conditions change, or if a better link to a server becomes known to a client, where the link for a client can be updated and improved.

The present invention includes a wireless network system which is particularly well adapted for connections to a wide area network such as an Intranet or the Internet. The wireless network system includes one or more servers which are coupled to the wide area network, and two or more clients capable of communicating with the server or with each other via radio modems. The communication in the wireless network system preferably takes the form of digital data packets, which are not too dissimilar from the TCP/IP data packets used over the Internet. However, the data packets of the present invention also include data routing information concerning the path or "Link" from the source of the packet to the destination of the packet within the wireless network. The data packets include a code indicating the type of packet being sent.

In operation, a client of the wireless network system of the present invention has either a direct or an indirect path to a server of the wireless network system. When in direct communication with the server, the client is said to be "1 hop" from the server. If the client cannot reliably communicate directly with the server, the client will communicate with a "neighbor" client which has its own path ("link") to the server. Therefore, a client can communicate with the server along a link that includes one or more other clients. If a client communicates with the server through one other client, it is said to be "2hops" from the server, if the client communicates to the server through a series of two other clients, it is said to be "3hops" from the server, etc. The process of the present invention preferably includes an optimization process which minimizes the number of hops from the clients to the servers, on the theory that the fewer he number of hops, the better the performance of the network. Alternatively, the optimization process can also factor in traffic and transmission reliability of various links to determine the optimal path to the server.

A wireless network system in accordance with the present invention includes at least one server having controller and a server radio modem, and a plurality of clients each including a client controller and a client radio modem. The server controller implements a server process that includes the controlling the server radio modem for the receipt and transmission of data packets from clients of the network. The client controller implements a client process including the transmission and receipt of data packets from the server and from other clients. Preferably, the client process of each of the clients initiates, selects, and maintains a radio transmission path ("link") to the server. As noted previously, this radio transmission path to the server is either a direct path to the server (1 hop) or an indirect path to the server (multi-hop) through one or more clients. Preferably, the client process of a particular client also constantly searches for improved paths to the server.

A method for providing wireless network communication in accordance with the present invention includes providing a server implementing a server process, and providing a server implementing a server process, and providing a plurality of clients, each client implementing a client process. The server process includes receiving data packets via server radio modem, sending data packets via the server radio modem, performing a "gateway" function to another network, and performing housekeeping functions. The client process includes the sending and receiving of data packets via a client radio modem, maintaining a send/receive data buffer in digital memory, and selecting links to the server. Again, the client process preferably chooses a "best" link to the server that is either a direct path or an indirect path through one or more other clients.

The server of the present invention provides a gateway between two networks, where at least one of the networks is a wireless network. The gateway function of the server makes any necessary translations in digital packets being sent from one network to the other network. The server includes a radio modem capable of communicating with a first, wireless network of the present invention, a network interface capable of communicating with the second network (which may or may not be wireless and, in fact, is preferably a wired TCP/IP protocol network), and a digital controller coupled to the radio modem and to the network interface. The digital controller passes data packets received from the first network that are destined for the second network to the second network, and passes data packets received from the second network that are destined for the first network to the first network, after performing any necessary translations to the data packets. The digital controller further maintains a map of the links of the first network and provides a map to the first network clients on request. By maintaining a map of the first network links, the server is able to properly address packets received from either the first network of the second network to the appropriate client of the first network, and allows the client of the network to maintain and upgrade their data communication paths to the server.

A network client for a wireless communication network of the present invention includes a radio modem capable of communicating with at least one server and at least one additional client, and a digital controller coupled to the radio modem to control the sending and receiving of data packets. The digital controller is further operative to determine an optimal path to at least one server of wireless network. The optimal path can be either a direct path to the server or an indirect path to the server through at least one additional client.

The method, apparatus, and system of the present invention therefore provide a wireless network that is both robust and efficient. Since each client of the network can potentially be in communication with a multiplicity of other clients and servers of the network, there are a great number of link choices available. If conditions change, or if a better link becomes known to a client, the link can be updated and improved.

These and other advantages of the present invention will become apparent upon reading the following detailed description and studying the various figures and drawings.

BRIEF DESCRIPTION OF THE DRAWINGS

FIGS. 2a-2g, 2h'-2h'', and 2i-2o are used to describe a prototype of the wireless network system of FIG. 1, illustrating both the path connection and path optimization process of the present invention;

FIG. 5a illustrates a data packet processed by the process illustrated in FIG. 5;

FIG. 5b is a flow diagram illustrating the process "Am I on Route?" of FIG. 5;

FIG. 5c is a flow diagram illustrating the process "Data?" of FIG. 5;

FIG. 19 is used to illustrate the "Process Per Type Code" of FIG. 18;

FIGS. 21a-21d illustrate the process of FIG. 20.

BETS MODES FOR CARRYING OUT THE INVENTION

Figure 1:
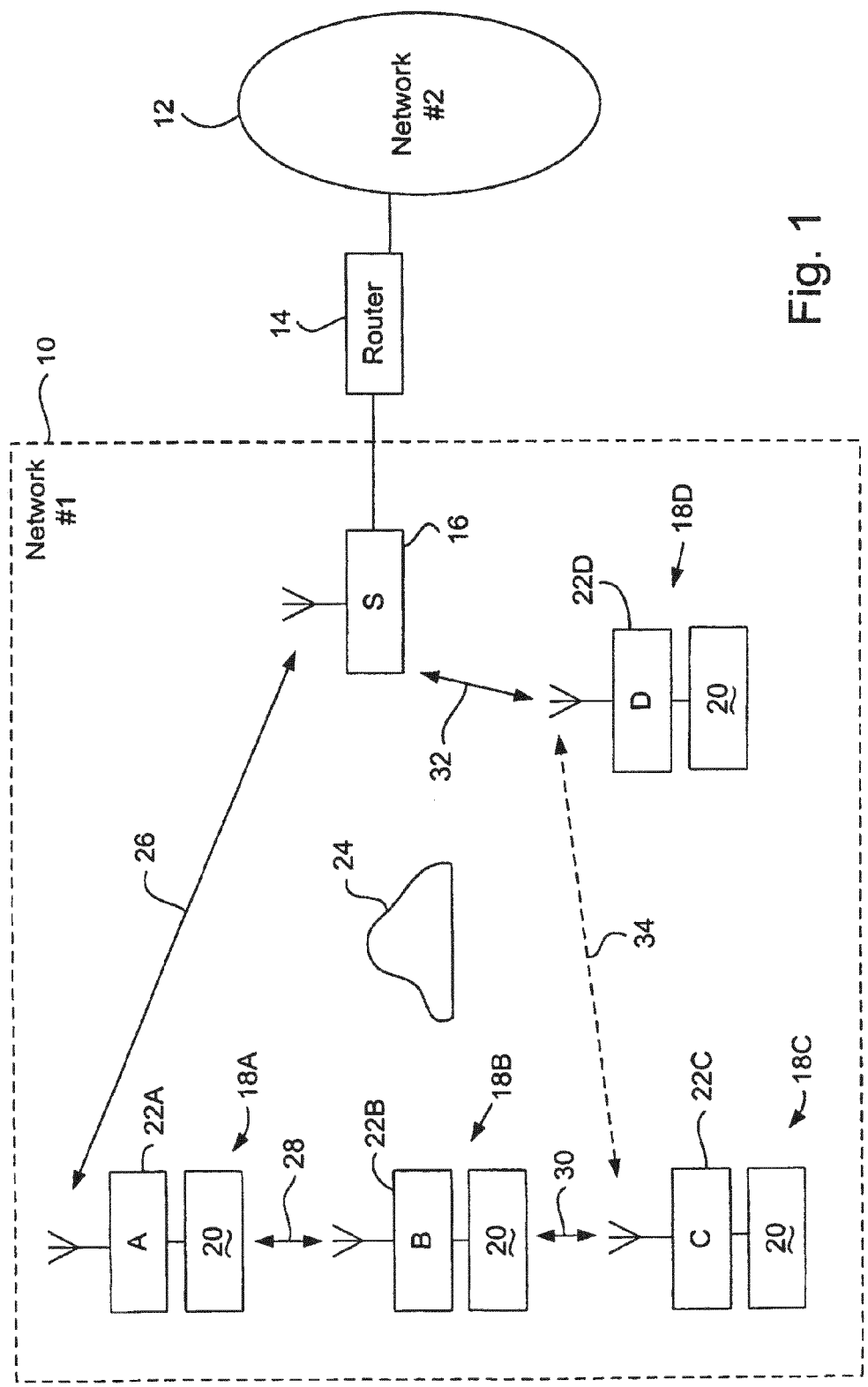
FIG. 1 is a pictorial representation of a wireless network system in accordance with the present invention.

FIG. 1 illustrates a wireless network system 10, in accordance with the present invention. The wireless network system 10, which will also be referred to herein as a "first network", is preferably in communication with a second network 12 via a digital communication bridge or router 14. The construction and operation of networks, such as second network 12, and bridges or routers, such as router 14, are well-known to those skilled in the art. In the present invention, it is preferred that the second network operates on the aforementioned TCP/IP protocols, i.e. the second network is the Internet or is a private Intranet. At times, herein, the second network will be referred to as simply the Internet, it being that other forms of a second network are also operable with the systems, apparatus, and process of the present invention. Again, the construction and operation of the Internet and Intranets are well-know to those skilled in the art. Likewise, routers, bridges, and other network devices such as hubs, gateways and Ethernet interfaces are well-known to those skilled in the art, and are available from a variety of sources including Cisco Systems, 3-Com, Farillion, Asante, etc. In general, as a "network interface" will refer to any such device that allows a server of the wireless network system of the present invention to communicate, directly and indirectly, with the second network.

The wireless network system 10 of the present invention includes one or more servers 16, the single example of which is herein labeled S. It should be noted that the server 16, serves as a gateway in that it performs a translation service between the first network and the second network. For example, the data packets on the first network include links and data types that are only applicable to the first network. Therefore, such links and data types are removed from the data packets before they are transmitted to the second network which, as noted previously, preferably operates on a TCP/IP protocol. Conversely, data packets received from the second network are modified to include the links and data types before they are transmitted to the first network. Therefore, the data packets on the first or wireless network can be essentially "packages" or "envelopes" for TCP/IP data packets when they are destined for the Internet or received from the Internet. However, as will be discussed in greater detail subsequently, the data packets of the first network can be of types other than "data" types for TCP/IP formatted data. It should be noted that while only a single server S is shown in this example that, in most cases, multiple servers, each with their own gateway to the internet, will be used in the first network.

The wireless network system 10 further includes a number of clients 18, each including a client machine 20 and a radio modem 22. The client machine 20 can be any form of digital processor, including a personal computer (PC), a computer workstation, a personal digital assistant (PDA), etc. In the present invention, the client machine is preferably a personal computer (PC) made to the Microsoft Windows/Intel microprocessor ("Wintel") standard, or the Apple Macintosh standard. Wintel and Macintosh compatible computers are commercially available from a variety of vendors. Likewise, computer workstations and PDAs are available from a number of vendors. Radio modems, such as the radio modem 22, are further available from a number of vendors. The present invention has been implemented using radio modems produced by GRE America, Inc. which operate on a spread spectrum technology, and which provide good receiver sensitivity and repeater capabilities. These GRE America, Inc. radio modems are commercially available under the Gina trademark and operate in the 2.4 gigahertz or 90 megahertz bands with support for the packetized data transmission. The Gina band radio modems further include error detection and correction, can operate in asynchronous and synchronous modes, and can support data speed from 300 to 64 kbps. Furthermore, the Gina radio modems can operate in a point-to-point or point-to-multipoint mode.

A server process, to be discussed in greater detail subsequently, is implemented on the server 16, and a client process, also to be discussed in detail subsequently, operates on each of the clients 18. In the present invention, the client process operates, at least in part, on the client machine 20. However, in alternative embodiment of the present invention, the client process can operate on the controller of the radio modem 22 of the client 18.

In wireless network system 10 illustrated in FIG. 1, the client 18A is in "direct" radio communication with the server 16 as indicated by the radio communication link 26. This will be referred to herein as "direct" or "1hop" or "line-of-sight" connection with server 16. The client 18B, however, does not have a direct path or "link" to the server 16 due to an obstacle 24, such as a hill, large building, etc. Therefore, the client 18 communicates via a radio link 28 with client 22A which relays the data packets from client 18B to server 16. A client 18C has a direct line-of-sight to server 16, but is out of transmission range to the server 16. therefore, the client 18C transmits its data packets by a radio link 30 to client 18B, from where is relayed to client 18A via link 28, for eventual relay to the server S via radio link 26.

As noted in FIG. 1, 18D is in direct communication with server 16 via radio communication link 32. If client 18C detects the transmissions of client 18D, it will note that client 18D has less "hops" to server 16 than does client 18B, and will switch its link from client 18B to client 18D. This process is a part of the "stabilization" or "optimization" process of the network 10.

It will therefore be appreciated that the wireless network system 10 of the present invention is constantly attempting to optimize itself for the "best" data transmission. In embodiment described herein, this optimization looks solely to the number of hops between the client and the server for the sake of simplicity. However, other factors can also affect the quality of the data transmission. For example, the traffic, of data packets through a particular client modem may be large, such that is better to route the data from neighboring clients through other clients, even though there may be more hops involved with the alternative routing. Also, some radio links may be less robust or may be slower than other links, such that optimization may result in a routing of data around the less robust or slower links, even though it may increase the number of hops to the server 16. Therefore, although the present preferred embodiment looks at only one single factor in its optimization process, it will be appreciated by those skilled in the art that multiple factors can be used to stabilize or optimize the wireless network system 10 of the present invention.

It should also be noted that the wireless network system 10 of the present invention is quite robust in that it will survive the loss of one or more clients in the system. For example, if the client 18A is lost due, for example, to a power or system failure, the data packets of client 18C can be routed through the client 18D, and the data packets for the client 18B can be routed through clients 18C. Therefore, the wireless network system 10 is highly robust and highly survivable under a number of adverse conditions.

In addition, the present invention permits mobile communication within the wireless network system 10. For example, if the client 18D is a portable computer and is moved around within the wireless network system 10, it will opportunistically change its data communication path as better links become available. For example, if the client 18D is moved close to the client 18B, it may use the client 18B as its link to server 16. Also, any routing through the client 18D from other clients (such as 18C in this example) will be updated and optimized as the data path for the client 18D changes.

It should be noted that, in general, the network will work the best and will be the most suitable if the radio modems and their client/controllers are never turned off. It is therefore desirable to not have and on/off switch on the radio modem, so that the clients are always participating in the network traffic distribution. However, even if a radio modem is turned off, the remaining clients will re-route through other clients, as will be discussed subsequently.

Figures 1A, 1B:
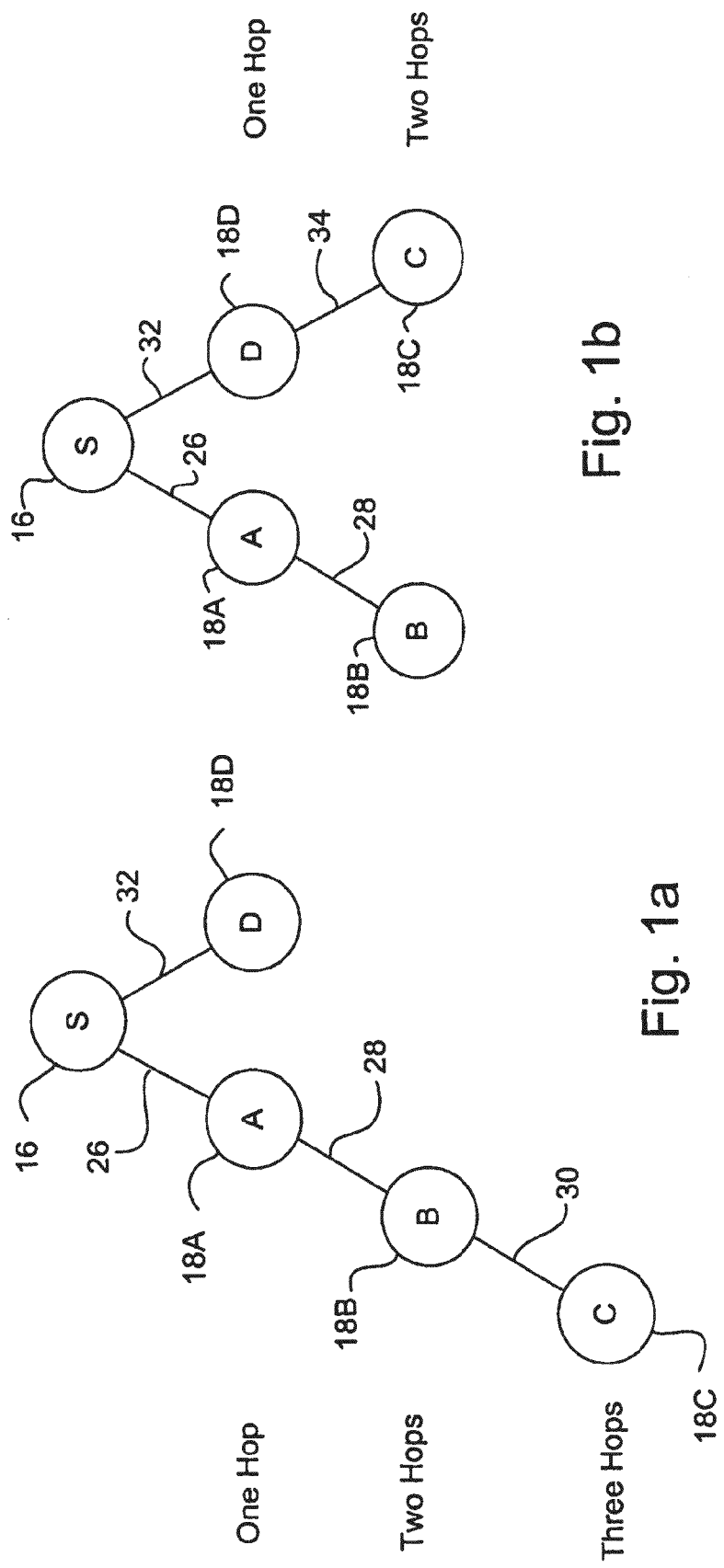
FIG. 1a illustrates a first tree structure of the data communication path or "links" of the wireless network system of FIG. 1.
FIG. 1b illustrates a second tree structure illustrating optimized or "stabilized" data communication paths for the wireless network system of FIG. 1.

In FIGS. 1a and 1b, two "tree" structures are shown illustrating the various links that were discussed, by way of example, with reference to FIG. 1. The tree structure is maintained in the server S, and is transmitted to any client that may request it.

In FIG. 1a, a tree indicates that client 18A is linked to a server 16 by a link 26, client 18B is linked by link 28 to a client 18A and by link 26 to a server, and client 18C is linked by line 30 to client 18B, by link 28 to client 18A and by line 26 to server 16. The client 18 D is in direct communication with the server 16 via radio link 32. Therefore, clients 18A and 18D are both "1hop" away from the server 16, client 18B is "2hops" away from server 16, and client 18C is "3hops" away from server 16.

In the scenario where client 18C realizes it has a better connection to server 16 through the client 18D, the link 30 to client 18B is no longer used, and a new radio link 34 to client 18D is established. This is illustrated in FIG. 1b. Now clients 18A and 18B remain 1 hop clients, client 18B remains a 2 hop client, but client 18C is upgraded from a 3 hop client to a 2 hop client. Therefore, the data transmission efficiency of the network has been "stabilized" or "optimized."

It should be noted that the term "link is used to convey both the connection to an adjacent client as well as the entire path from the client to a server. It will therefore be understood that when speaking of a link to an adjacent client, that this also implicitly includes all necessary links from that adjacent client to the server, i.e. a link is the entire path description from a given client to a given server.

FIGS. 2a-2o, an exemplary wireless point-to-multipoint network in accordance with the present invention is prototyped to facilitate a discussion of the theory and operation of the present invention. In FIG. 2a, a network 36 with 60 potential "nodes" 001 through 060 is illustrated. As used herein, a "node" can either be a client or a server. The nodes 014 and 016 have been arbitrarily selected as servers for the purpose of this example. The nodes 014 and 016 are marking servers with the large black dot replacing the leading "0" of those numerals. For the purpose of this example, it is assumed that a node can only communicate with an immediate adjacent node. Of course, in actual operation, nodes may be able to communicate with more distant nodes than its immediate neighbor nodes.

It should be noted, that in the notes incorporated of FIGS. 2b through 2k the leading "0"s have been deleted from client numbers e.g. client 005 is referred as client 5 in FIG. 2b. This notation is used for clients with respect to clients and servers and the notation should not be confused with any other uses of the reference numerals 1 through 60 in this document.

FIG. 2b, a first client is designated at node 005 (hereafter "client 005"). For the purposes of this example, the Yen or ".English Pound." symbol is positioned next to the client 005. As noted previously, for the purpose of this example, we will assume that any particular node is only in radio communication range of a node that is adjacent in a horizontal, vertical or diagonal direction, i.e. in an immediately adjacent "neighbor". In this instance, client 005 detects that there is a radio contact with node 014, which is a server (hereafter "server 014"). This server 014 and the client 005 will build a routing path or "link" between each other. This is accomplished by client 0005 transmitting a "I Am Alive" packet seeking a route to a server. The server 014, being within a radio transmission range, will respond and will add the client 005 to its routing table as its "left son." The meanings of the "routing table" and the "left son" will be described subsequently. The routing table of the server 014 is therefore 014(005), and the route from the client 005 to the server 014 is 005>014. Again, this notation will be discussed in greater detail subsequently.

The network 36 than has a second client 6 added as indicated by the ".English Pound." symbol next to node 006 in FIG. 2c. Second client 006 makes radio contact with client 005 and builds a routing path or a "link" to a server 014 through the client 005. Server 014 updates its routing table accordingly. This is accomplished by client 006 issuing an "I Am Alive" packet seeking a client repeater route to a server. Client 005 will respond and add client 006 to its routing table as its left son. The updated routing table of the server 014 is therefore 014(005)006)). The route from the user client node 006 to the server 014 is 006>005>014.

In FIG. 2d, a third client 007 is added to the network 36 as indicated by the ".English Pound." symbol next to node 007. Client 007 establishes contact with client 006 and finds a path through clients 006 and 005 to server 014. This is accomplished by client 007 issuing a "I Am Alive" packet seeking a client repeater route to server 014. Client 006 will respond and add client 007 to its routing table as its left son. The updated routing table of the server 014 is then: 014(005(006(007))). The route from client 007 to the server 014 is: 007>006>005>014.

In FIG. 2e, another client 016 has been added at node 016 as indicated by the ".English Pound." symbol. It should be noted that the client 016 can make radio contact with clients 005, 006, and 007. However, client 016 recognizes node 026 as being a server (hereafter "server 026") and then connects directly to server 026. This is accomplished by client 016 transmitting a "I Am Alive" packet seeking a route to a server. The server 026 will respond and will add client 016 to its routing table and its left son. The updated routing table of server 026 is then 026(016). The routing from client 016 to the server 026 is 016>026.

In FIG. 2f, a server routing table and a route for each client thus far in the example are illustrated. It should be noted that when client 016 came into existence, a shorter route was created for client 007 to a server, namely via client 016 to server 026. As noted in this figure, client 007 has made the adjustment to connect to server 026, thereby "stabilizing" or "optimizing" the network 26. Also, it should be noted that server 014 has deleted client 007 from its routing table, since client 007 is now using server 026 as its gateway to the Internet. This creates a universe of six nodes, of which two are servers and of which four are clients. The average "hop" distance from a client to a server is 1.5 hops. The remainder FIGS. 2g-2o further illustrate these concepts.

In FIG. 2g, the network 36 illustrates an extreme example where 58 clients are connected to the two servers 014 and 026. FIGS. 2h' and 2h" show a fully "stabilized" or "optimized" network where the path or "link" from any client any client to a server is as short as possible, i.e. where there is few "hops" as possible. It should be noted that the optimization occurs dynamically during operation and without complex algorithms and look-up tables. As will be discussed in greater detail subsequently, the optimization occurs when clients "hear" transmission from other clients that have a better (i.e. shorter) path to a server.

FIG. 2h' shows the network as seen from the point of view of servers 014 and 026 and from the point of views of clients 001-client 031. In FIG. 2h", the network as seen from the point of view of clients 032-060, along with statistics for the overall network, are shown. In brief, in a universe of 60 nodes, of which two are servers and 58 are clients, the average hop distance from a client to a server is 2.36206897 hops.

In FIG. 2i, the process of adding a new client 009 to the server is illustrated. The first time the client 009 came "alive" (i.e. became operational) it took five tries before node 009 found a client neighbor with a path to the server. The reason that it may take many tries to find a connection path is that multiple neighbors of client 009 are responding to the client 009 "I Am Alive" message via CSMA/CD (Carrier Sent Multiple Access/Collision Detection) protocol. The likelihood that any particular neighbor of client 009 will respond first is, essentially, random. Once client 009 hear from a neighbor that it does not have a path to a server, client 009 tells that neighbor not to respond to the next "I Am Alive" announcement from client 009. In consequence, client 009 keeps trying to find a path to the server until it succeeds. However, that path may not be the shortest path. In this example, the client 009 finds a path to the Internet server, resulting in updating of the routing table for the Internet server 014, as 014(005(006(007(008(009)))),004,003). The route or "link" from client 009 to the server is: 009>008>009>006>005>014.

In FIG. 2j, a client 029 is finding a route to the server via one of its neighbors. It finds a route through 019, and is added to the routing table a client 019 as its left son. The routing table of server 014 is also updated, and the rout from user client 029 to the server is determined. However, this route is not an optimal route in that it includes a greater number of hops than necessary.

In FIG. 2k, the "stabilization" or "optimization" process is illustrated. It was previously noted that the client 029 has a non-optimal path to a server. In order to improve this path client 029 will receive "help" from its neighbors starting with client 007. Client 007 currently has a route to server 014. Client 007 starts randomly probing its neighbors looking to a short route to a server. Client 007 finds a shorter route to client 026. Client 007 informs server 014 to drop client 007 from server 014's routing table, and client 007 informs server 026 to add client 007 to its routing table. Since client 029 was "downstream" from client 007, client 029 dramatically becomes switched to a route to server 026.

In FIG. 2l, this process is repeated for client 008. Notably, client 008 shortens its route to server 026 by 1 hop. Client 009 cannot improve its route to server 026.

In FIG. 2m, client 018 shortens its route to server 027 to 2 hops. This is despite the fact that the route to client 007 and 008 are a relatively efficient 3 hop links.

In FIG. 2n, client 029 is optimizing its path. Client 029 eliminates 018 from its route by "leap frogging" past client 018 with the result of the shortest possible 3 hop route to server. Ultimately, therefore, client 029 route is improved from a 7 hop path to server 014 to the shortest possible 3 hop path to server 026. This result is dramatically accomplished with the efficiencies of clients 007, 008, and 018 also improving, and without the need for complex routing algorithms.

In FIG. 2o, another example of individual dramatic routing is illustrated for client 044. This client node shortens its rout from 3 to 2 hops by switching server destinations. Client 044 drops out of the server 014's routing table and gets added to server 026's routing table.

The advantage of prototyping the system in FIGS. 2a-2o is that further optimizations become apparent. For example, if a great deal of network traffic is going to a particular node, it may be desirable to place a "passive repeater" at that node. A passive repeater is not a client, per se, but, rather, is a transceiver that receives and rebroadcasts packets. The passive repeater therefore effectively extends the range the range of the transmitting clients, and reduces data bottlenecks in the system. A passive repeater is also used for clients with long links to a server in that it can shorten the link by effectively allowing to skip some intermediate links. The prototyping of the system is also useful in that it shows that placing servers near the center of the network reduces the average link length (i.e. reduces the average number of client hops) in the network.

Figure 3:
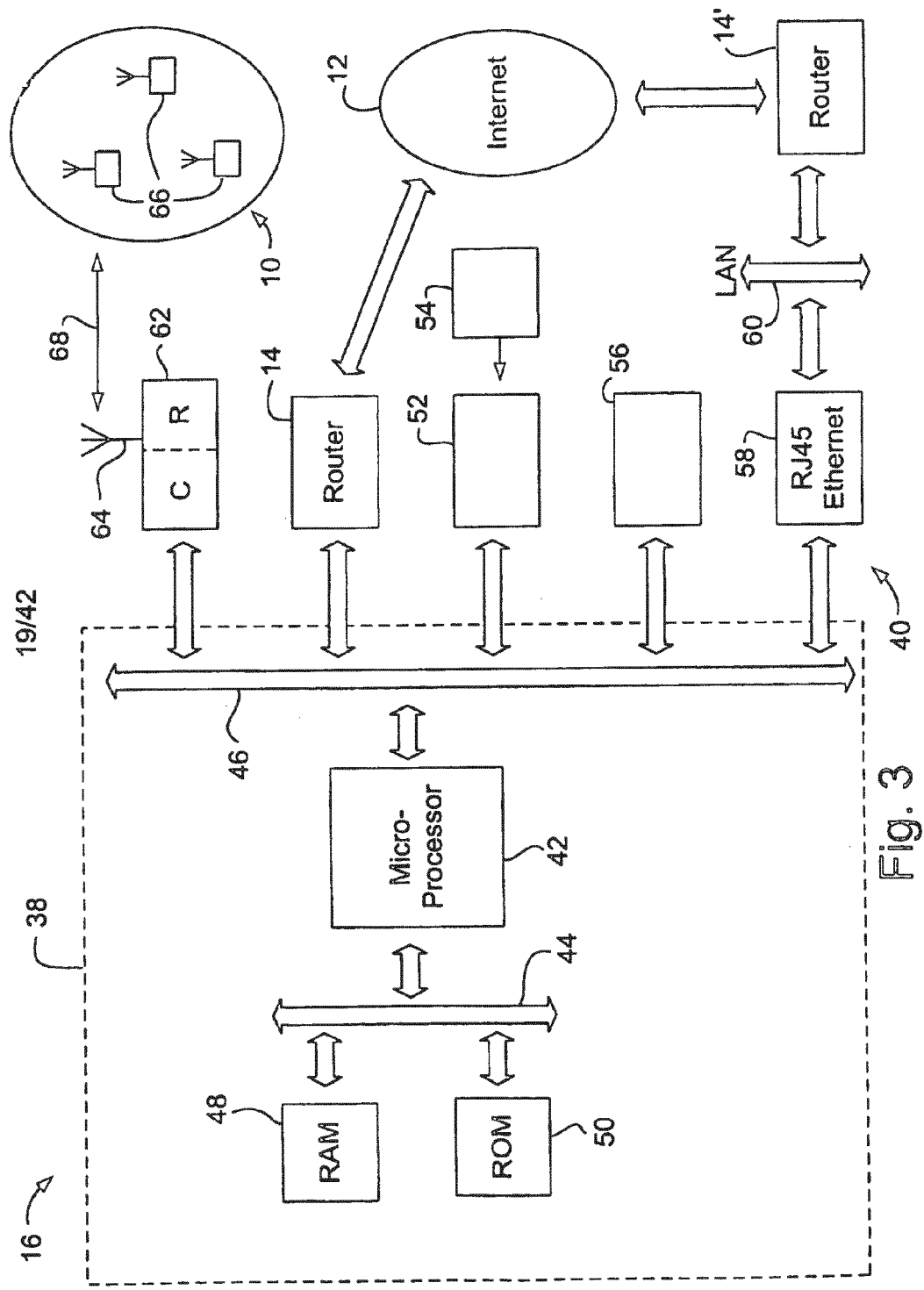
FIG. 3 is a block diagram of a server, router, the r first wireless network and the second network of FIG. 1.

In FIG. 3, a block diagram of the server 16 of FIG. 1 is illustrated. In this instance, the server 16 includes a computer system 38 and a number of peripherals coupled to the computer system. The computer system 38 can be a personal computer system, a computer workstation or a custom data processor capable of implementing the processes of the present invention.

By way of example, the computer system 38 includes a microprocessor 42 that is coupled to a memory bus 44 and to an input/output (I/O) bus 46. Typically also coupled to the memory bus 44 are random access memory (RAM) 48 and read only memory (ROM) 50. The RAM 48 is usually volatile (i.e. its contents are lost when power is removed) and is used for temporarily or "scratch pad" memory. The ROM 50 is non-volatile (i.e. its contents are not lost when power is removed), and typically includes the start-up instructions for the computer system 38. A number of peripherals are typically coupled to the I/O bus 46. For example a removable media drive 52 for a removable media 54 (such as a floppy disk, a Zip® disk, or a C/D ROM) is typically coupled to the I/O bus 46, as is a fixed or hard disk 56. Furthermore, a router 14 or bridge can be used to couple the I/O bus 46 to the Internet 12 as previously described. In addition, an RJ45 Ethernet interface 58 can be used to couple the computer system 38 to a local area network 60 and from there to the Internet 12 by a router 14, or the like, Also, a radio modem 62 (including a control section C, a radio section R, and an antenna 64 coupled to the radio section R) can be coupled to the I/O bus 46. The radio modem 62 can communicate with the network 10 including a number of nodes 66 by a wireless transmission of "radio link 68". The assembly of the hardware of the server illustrate in FIG. 3 will be apparent to those skilled in the art.

Figure 4:
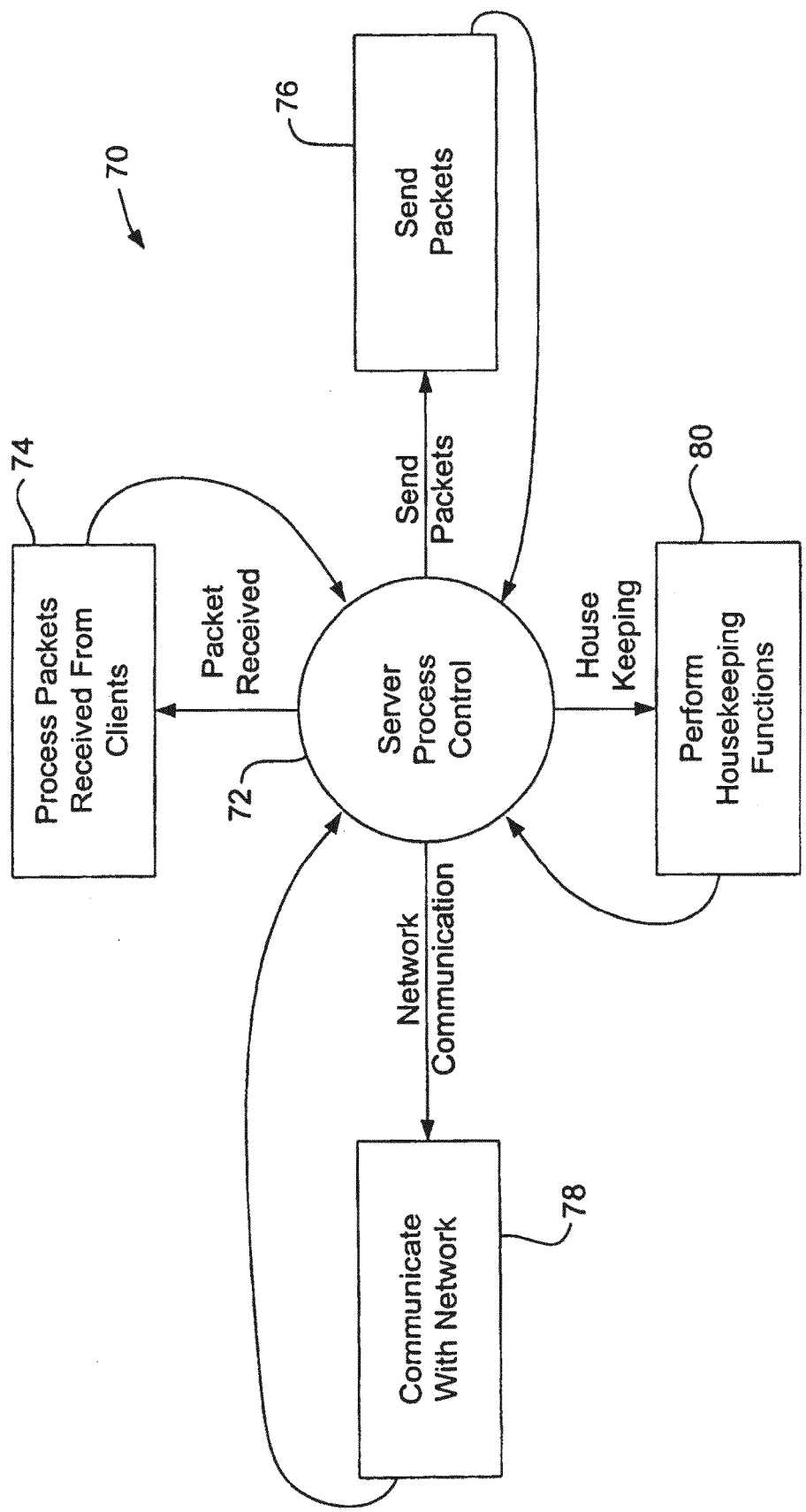
FIG. 4 is a flow diagram of a server process of the present invention operating on the server of FIG. 3.

In FIG. 4, a server process 70 of the present invention is implemented on the server 16. More particularly, the server process 70 can be implemented on computer system 38, within the control section of the radio modem 62, or partially in both of those places. In the present preferred embodiment, the majority of the server process 70 is implemented on the computer system 38. However it should be noted that the control section C of the radio modem 62 includes a microprocessor and memory and, with proper program instructions, can be made to implement the process 70 of FIG. 4, freeing the personal computer 38 for other tasks.

The server process 70 includes a server process control 72 and four subprocesses. More particularly, the subprocesses include a process 74 which processes received from clients, a process 76 which sends packets, a process 78 which communicates with the network, and a process 80 which performs housekeeping functions. Each of these processes will be discussed in greater detail subsequently.

Figure 5:
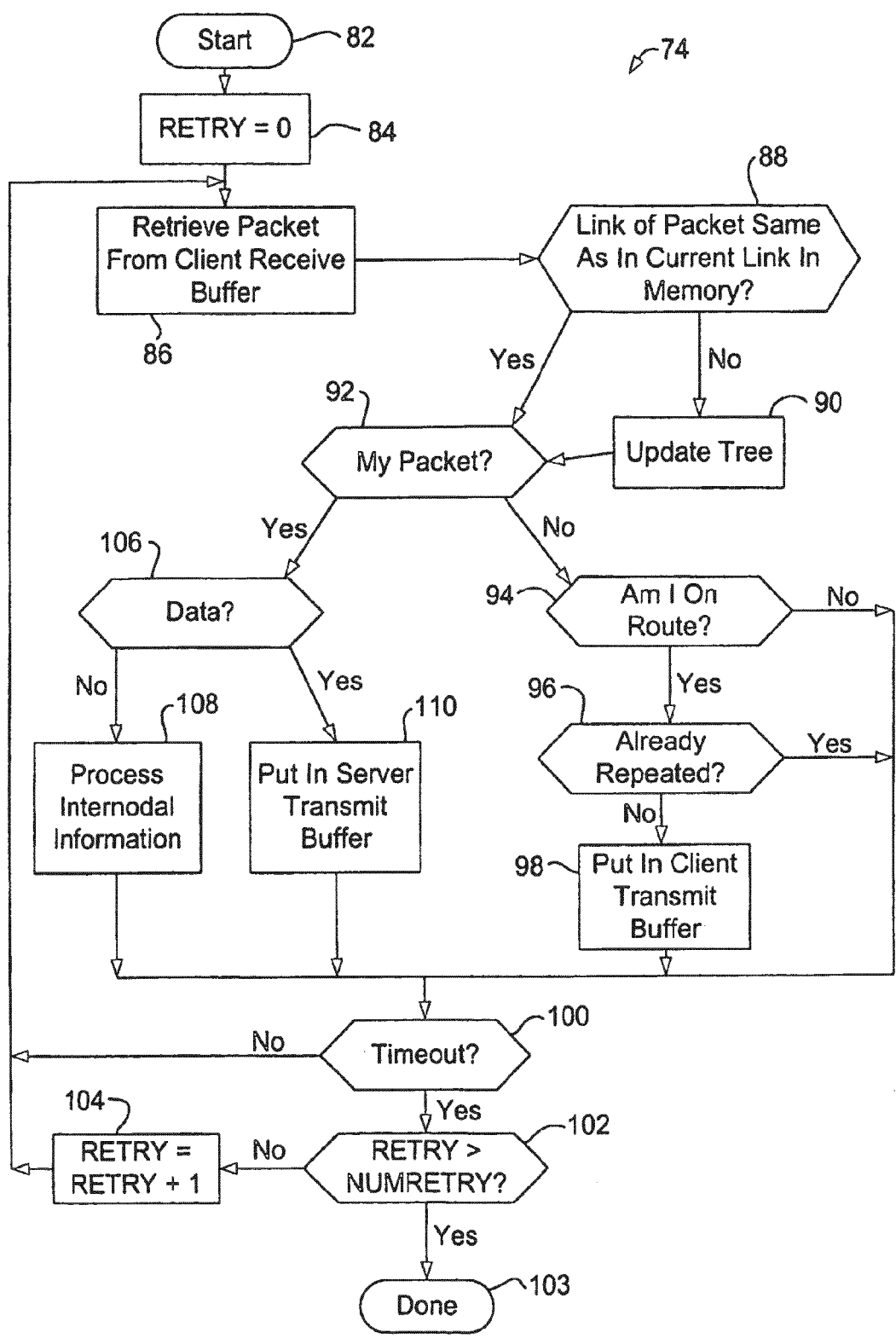
FIG. 5 is a flow diagram of the "Process Packets Received From Client" step of FIG. 4.

In FIG. 5, the process "Process Packets Received From Clients" 74 of FIG. 4 is illustrated in greater detail. The process 74 begins at 82, and at step 84, the variable RETRY is set to 0. Next, a step 86 retrieves a packet from the client receive buffer, and a decision step 88 determines whether the path or "link" of the packet is same as the currently stored link in memory. If not, a step 90 updates the tree. If so, or after the updating of the tree in step 90, a decision step 92 determines whether it is "My Packet?" In other words, step 92 determines whether the packet being received by the server was intended for that server. If not, a decision step 94 determines whether that server is on route. If that server is on the route, but is not its packet, a decision step 96 determines whether the packet has already been repeated. If, not the packet is placed in the client transmit buffer. If decision step 94 determines that the server is not on the route, or the packet has already been repeated, or upon the completion of step 98, a decision step 100 looks for time-out. The time-out is provided by the server process control 72 such that the computer hardware resources on which process 70 are implemented can be shared among the four processes. More particularly, in most instances, the computer hardware resources are shared among the subprocesses 74-78 in a "round-robin" fashion well-known to those skilled in the art. However, it should be noted that at times the strict round-robin scheduling is not adhered to, as will be discussed subsequently.

If step 100 determines that a time-out has occurred, the decision step 102 determines whether the retry number RETRY is greater than the allowed, namely NUMRETRY. In its preferred embodiment, the number of retries RETRY are set at, perhaps, 2 or 3 so that the server does not tie up its resources with endless retries of process. If RETRY is greater than the NUMRETRY, the process is as indicated at 103. Otherwise, a step 104 increments RETRY buy 1. In the absence of a time-out and in the absence of the number of retries being used up, process control returns to step 86.

If step 92 determines that the packet is for that server, a step 106 determines whether the packet is a data type. If not, a step 108 process "internodal information." If so, a step 110 places the data in a server transmit buffer. After the completion of steps 108 or 110, process control is returned to step 100 to determine if there is a time-out.

In FIG. 5a, a "data packet" 112 in accordance with the present invention is illustrated. As it will be appreciated by those skilled in the art, a data packet is an associated string of digital information that is transferred and processed as a unit. The data packet 112 of the present invention includes a header 114, a type 116 and data 118. The data 118 can be standard TCP/IP data. The header 114 includes the source address, the address of all hops along the way (i.e. the "link" of the data packet), and the destination address. Hops (i.e. clients and servers) that already have been traversed (i.e. have already forwarded the data packet) are indicated with an asterisk ("*") symbol. The type 116 is, in this implementation, a two digit code indicating the type of the data packet 112, as well as will be discussed in greater detail subsequently. The data section 118 of the data packet 112 includes the data associated with that packet. In the present invention, the data is in the range of 128-1024 bytes in length.

In FIGS. 5b and 5c, respectively, the decision steps 94 and 106, respectively are illustrated with respect to the data packet architecture of FIG. 5a. the decision step 94 ("Am I On Route?") of FIG. 5 is simply determined by process 120 "My Address In The Header?". If yes, the process of FIG. 5 branches to step 96, and if no, the process of FIG. 5 branches to step 100. In FIG. 5c, the decision step 106 "Data?" simplifies to a process 122 "Is the Type Equal to 14?". This is because, in the present invention, a type 14 has been arbitrarily chosen to indicate a data type. If yes, the process of FIG. 5 branches to step 100, and if no, the process of FIG. 5 branches to step 108.

Figure 6:
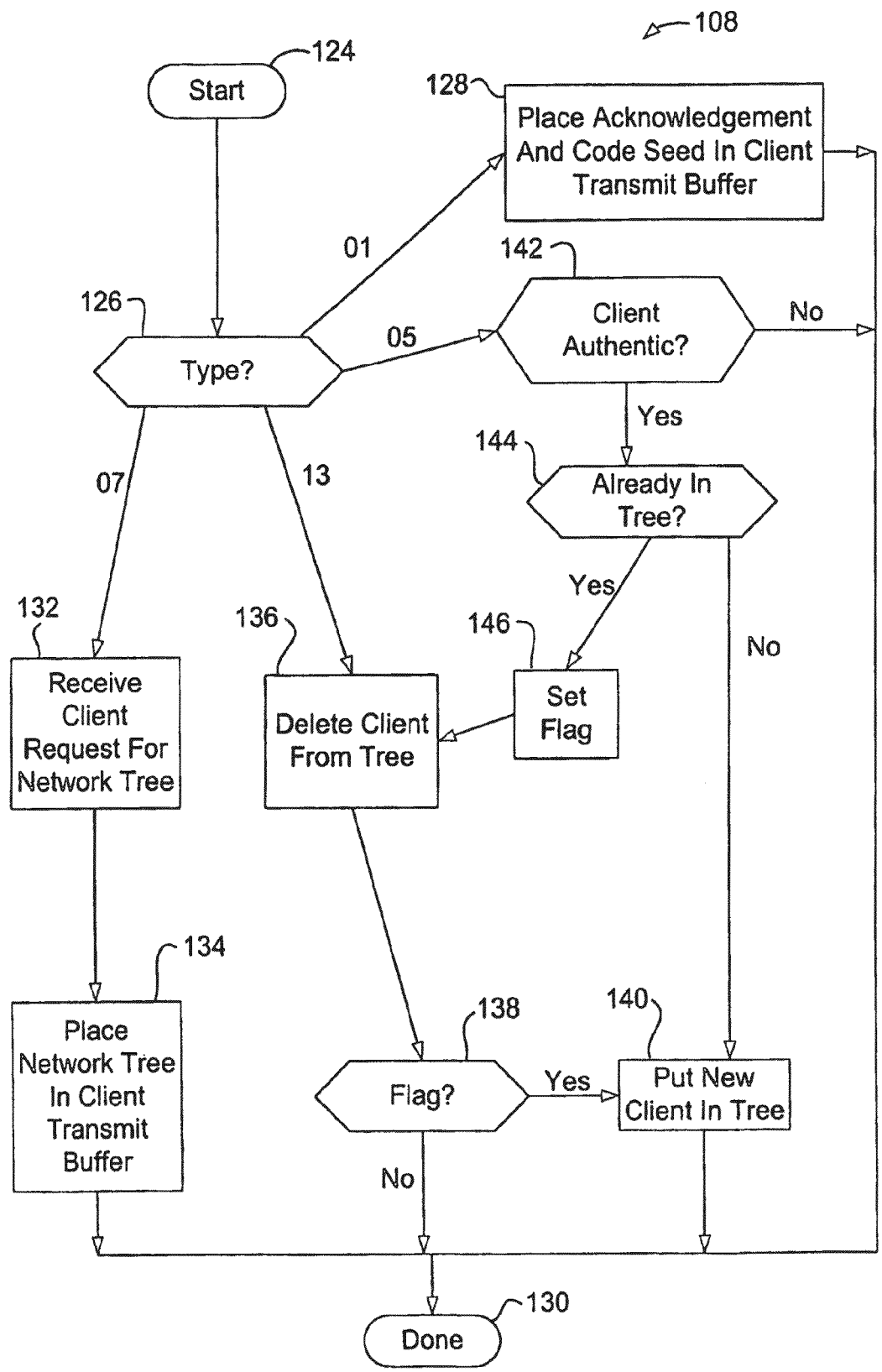
FIG. 6 is a flow diagram illustrating the "Process Intermodal Information" process of FIG. 5.

In FIG. 6, the step 108 "Process Internodal Information" of FIG. 5 is explained in greater detail. The process 108 begins at 124 and, in a multi-branch decision step 126, the type of the data packet is determined. If the type is a "01", a step 128 places an acknowledgement and a "code seed" in the client transmit buffer, and the process is completed at 130. Acknowledgements and "code seeds" will be discussed subsequently. If the type is a "07", a step 132 receives the client request for the network tree, and the process places the network tree in the client transmit buffer in a step 134. The process is then completed at 130. If, however, the type is "13", a step 136 deletes the client from the tree and a step 138 determines whether a flag has been set. If not, the process is completed at 130. If, the flag has been set as determined by step 138, a step 140 puts a new client in the tree and the process is then completed at 130.

If decision step 126 determines that the "type is "05" a step 142 determines whether the client is authentic. The authentication process, which will be discussed subsequently, keeps unauthorized clients from being added to the network. If the client is not authentic, the process is completed at 130 and the client is not allowed to connect to the server. If a step 142 determines that the client is authentic, a step 144 determines whether the client is already in the server tree. If yes, the flag is set in a step 146 and process control is turned over to step 136 to delete the client from the tree. Since the flag has been set, step 138 branches the process control to step 140 and the new client is placed in the tree, after which the process is completed at 130.

The addition and removal of nodes from trees are well known in those skilled in the art. For example, in the book, incorporated herein by reference, SNOBOL 4: Techniques and Applications, by Ralph E. Griswald, Department of Computer Science, University of Arizona, Prentiss-Hall, Inc.,® 1975, ISBN 0-13-853010-6, algorithms for placing and removing clients from trees are discussed.

Figure 6A:
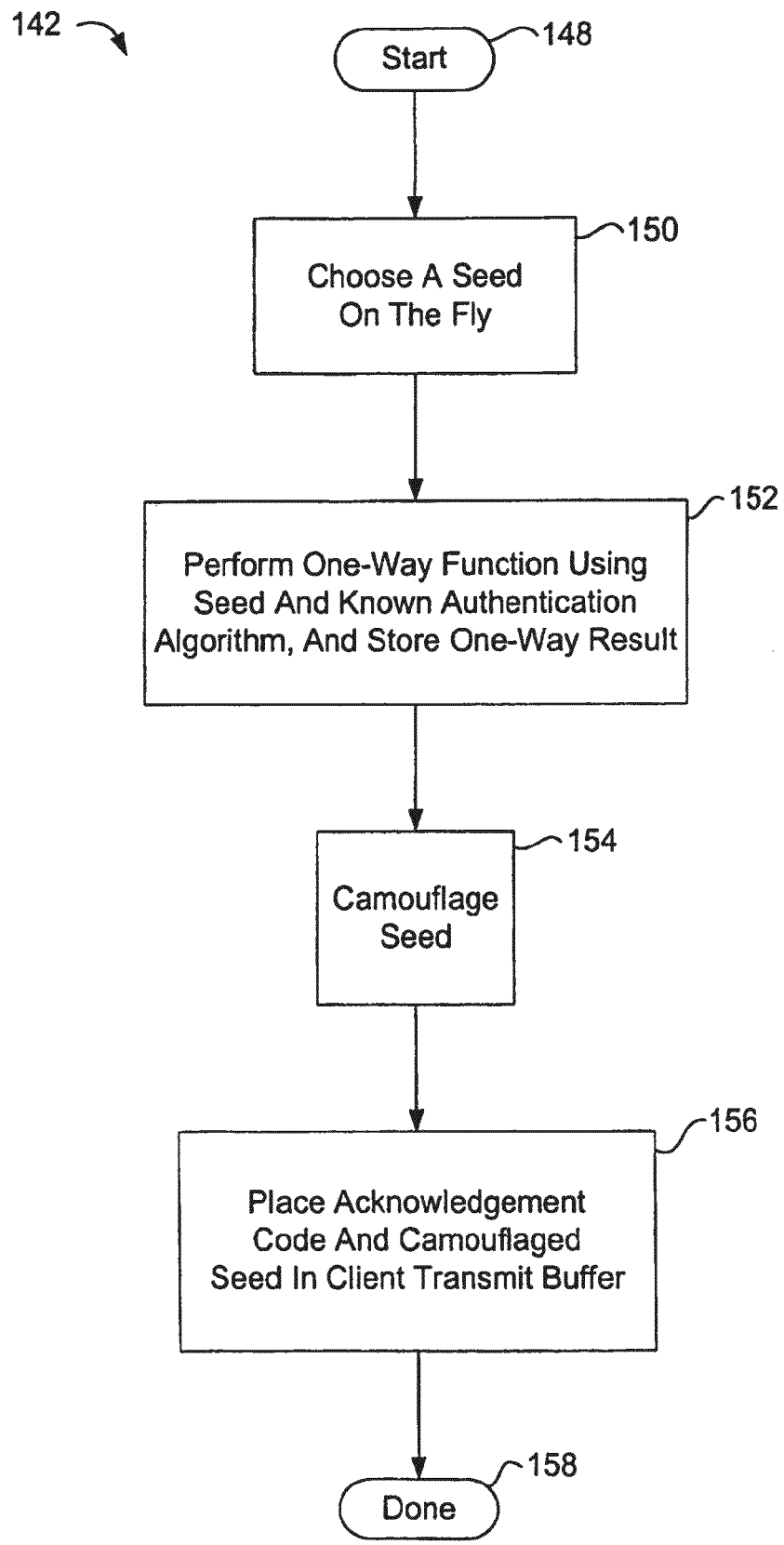
FIG. 6a is a flow diagram illustrating the process "Client Authentic?" of FIG. 6.

FIG. 6a illustrates the process 142 of FIG. 6 in greater detail. More particularly, the process 142 begins at 148 and, in a step 150, a "seed" is chosen on the fly. Next, in step 152, a "one way" function is performed using the seed and a known authentication algorithm, and a one-way result is stored. Next, found in step 154, the seed is "camouflaged" and in a step 156, places an acknowledgement code and camouflaged seed in the client transmit buffer. The process is then completed at 158.

The purpose of the process 142 is to prevent unauthorized "clients" from accessing the network. For example, hackers can be prevented from accessing the network unless they can crack the authentication process, which is nearly impossible.

Authentication techniques are well known to those skilled in the art. For example, the book, incorporated herein by reference, Algorithms in SNOBOL 4, by James F. Gimpel, Bell Telephone Laboratories, John Wiley & Sons, a Wiley Interscience Publication,® 1976 by Bell Telephone Labs, Inc., ISBN 0-471-30213-9, describes authentication techniques using one-way seeds. See, in particular pp 348-349 with back references. In brief, a "seed" is chosen "on the fly" such as by reading the system clock. The one-way function modifies the seed using an algorithm known to both the server and the clients. The one-way result, which in this instance is 4 bytes in length, is stored. The step 154 then "camouflages" the seed by dispersing the 4 bytes among perhaps 26 other bytes prior to transmitting the camouflaged seed. The receiving clients know which of the four bytes to use for their one-way function.

Figure 6B:
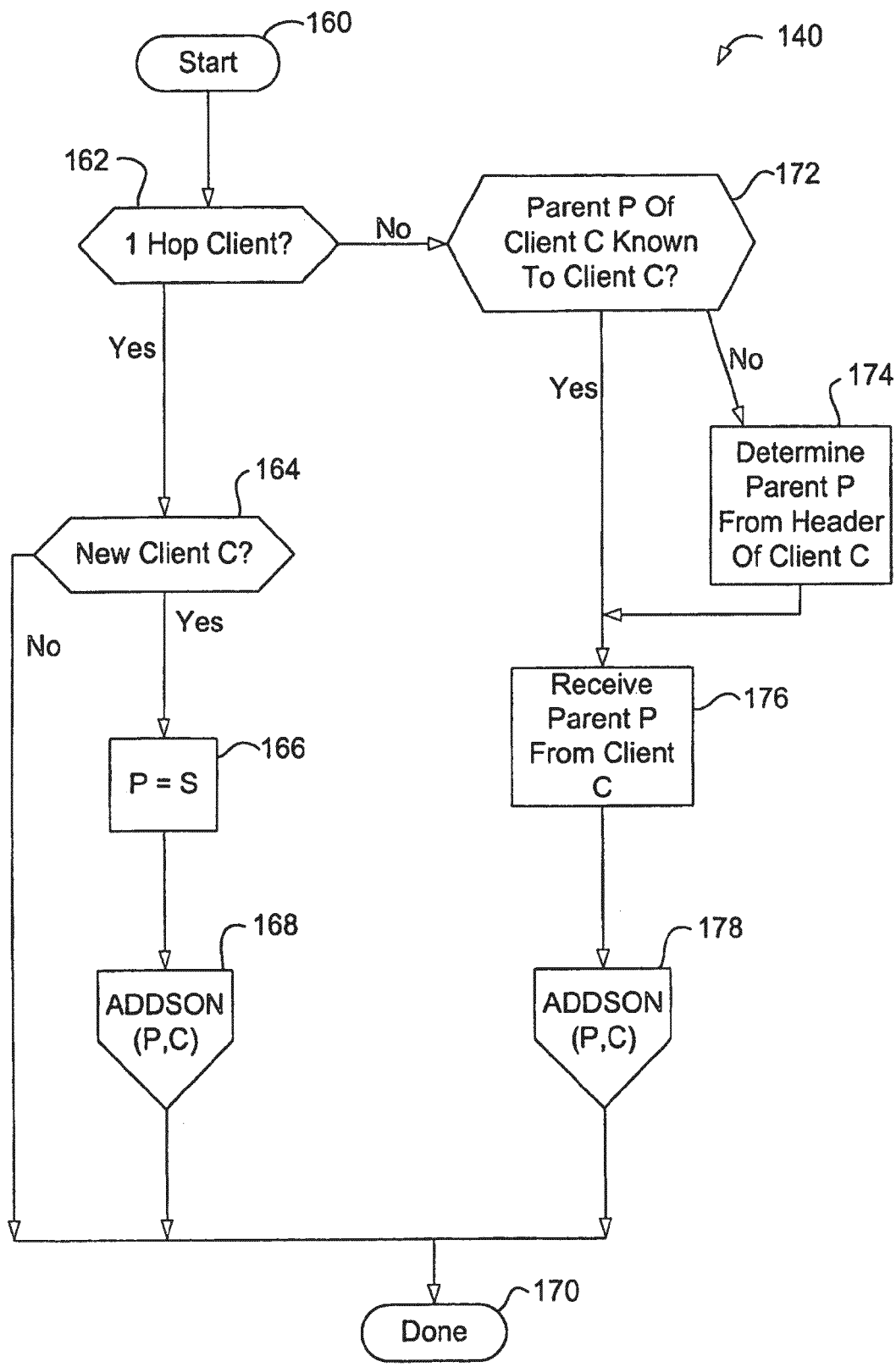
FIG. 6b is a flow diagram illustrating the process "Put New Client In Tree" of FIG. 6.

The process 140 "Place New Client In Tree" of FIG. 6 is illustrated in greater detail in FIG. 6b. The process 140 begins at 160 and in a step 162, it is determined whether this is a "1 hop" client. If so, a decision step 164 determines whether it is a new client C. If so, the variable P is set to S in step 166 and the function "ADDSON" with the variables (P, C) is evoked in step 168. S, of course is the server or root of the tree. If step 164 determines that is not a new client C, or after the completion of the ADDS ON function, the process ends at 170.

If step 162 determines that it is not a 1 hop client (i.e. C is a multi-hop client) a step 162 determines whether the parent P of client C is known to client C. If not, a step 174 determines the parent P from the header of client C. If the client C does know its parent, or after the completion of step 174, a step 176 receives parent P from client C. Next, in a step 178, the function ADDSON(P,C) is evoked, and the process is completed at 170.

Figure 7:
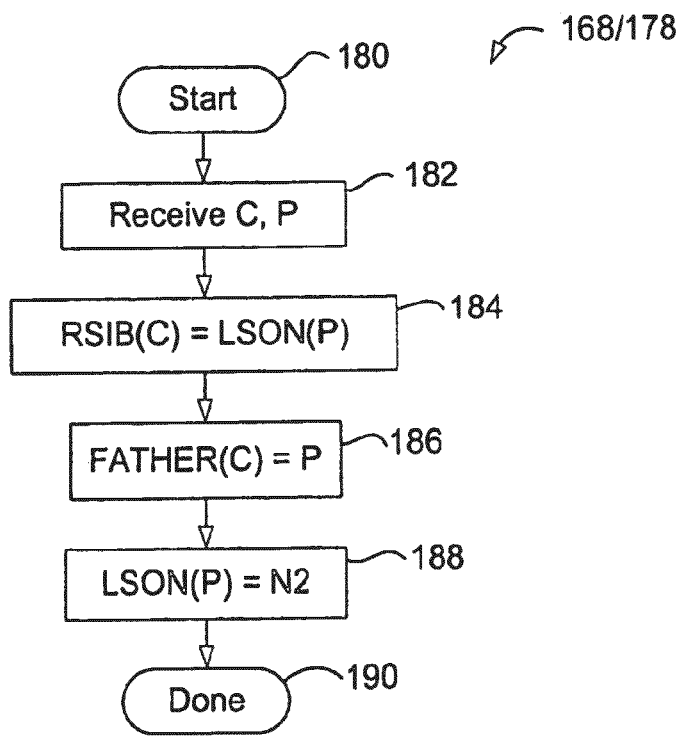
FIG. 7 is a flow diagram illustrating the function "ADDSON(P,C)" of FIG. 6b.

In FIG. 7, the ADDSON(P,C) function is explained in greater detail. More particularly, function steps 168-178 begin at 180 and, in a step 182, the variables C, P are received. In this notation, the sting RSIB ( ) refers to a string of right siblings, and the notation LSON( ) refers to a string of left sons. A step 184 sets RISB(C)=LSON(P). A step 186 sets a string FATHER(C)=P and a step 188 sets the string LSON (P)=N2 is an in-memory pointer that points to the memory location of nodes. The string FATHER provides a pointer from a child C to its father, which in this case is P. The process is then completed as indicated at 190.

Figure 7A:
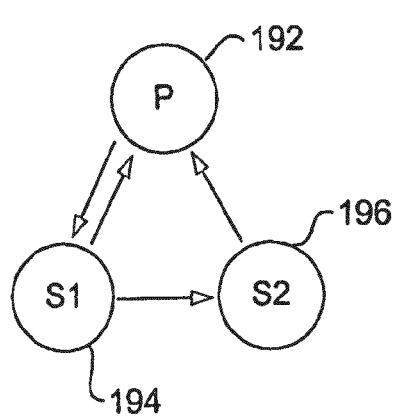
FIGS. 7a and 7b are used to illustrate the operation of the ADSON function of FIG. 7.
Figure 7B:
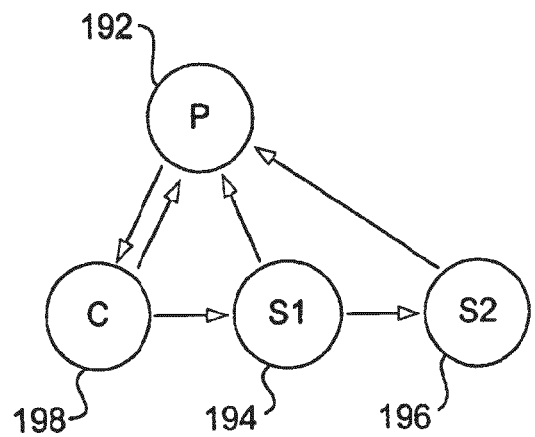

In FIGS. 7a and 7b, the ADDSON function is graphically illustrated. In FIG. 7a, a parent 192 has left a son 194 and a right sibling 196. The parent 192 and left son 194 have mutual pointers to each other, while the right sibling 196 has only a pointer to the parent 192. The left son 194 also has a pointer to the right sibling 196. When ADSON function is evoked with the argument (P, C) C is added as the left son 198 and the pointer in the parent 192 is updated to point to the left son 198. The left son 198 has pointers to the parent and to the new right sibling 194. The new right sibling 194 still has a point to the older right sibling 196, and both siblings 194 and 196 have pointers to the parent 192. It should be noted, under all circumstances, that the parent is only directly aware of the left son, in that it only has a pointer to the left son.

Figure 8:
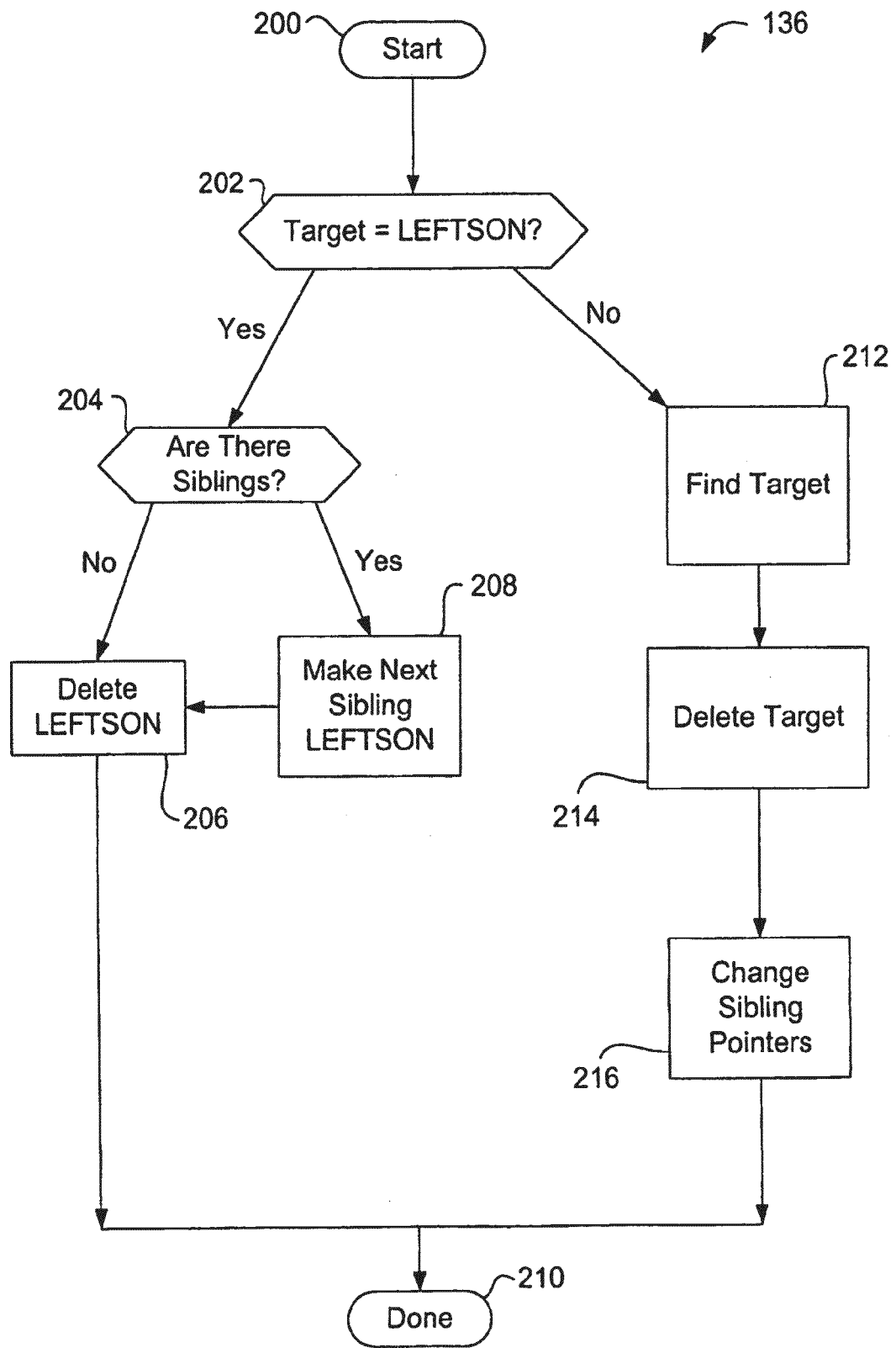
FIG. 8 is a flow diagram illustrating the "Delete Client From Tree" process of FIG. 6.

In FIG. 8, the process 136 "Delete Client From Tree" is illustrated in flow-diagram form. The process 136 begins at 200 and in a step 202, it is determined whether the target is equal to the left son. The "target" is, of course, the client to be deleted. If the target is the left son, a step 204 determines if there are other siblings. If not, the left son is deleted in a step 206. If there are other siblings, a step 208 makes the next sibling the left son, and then the left son is deleted by step 206. The process is then completed at 210. If step 202 determines that the left target is not equal to the left son, the target is found in a step 212, and is then deleted in a step 214. A step 216 then changes the sibling pointers, and the process is completed at 210.

Figure 8A:
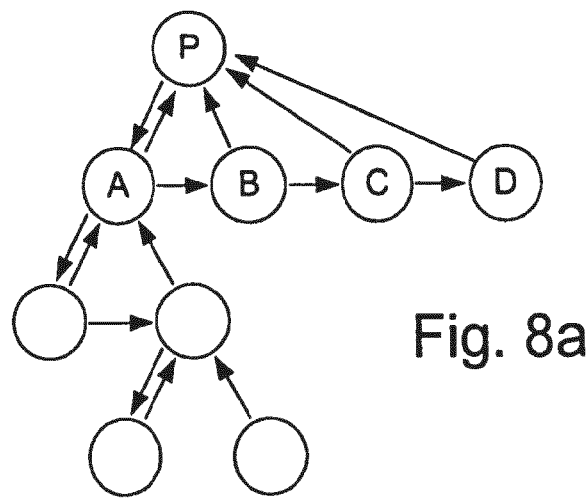
FIGS. 8a-8c illustrate the process of FIG. 8.
Figure 8B:
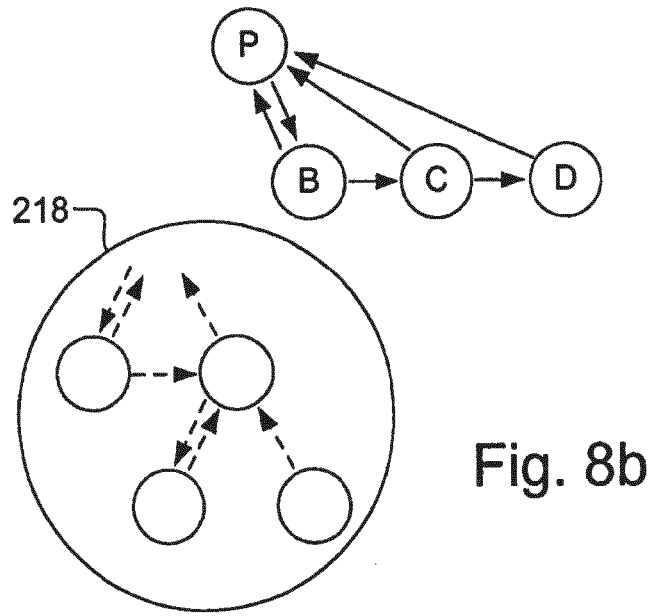
Figure 8C:
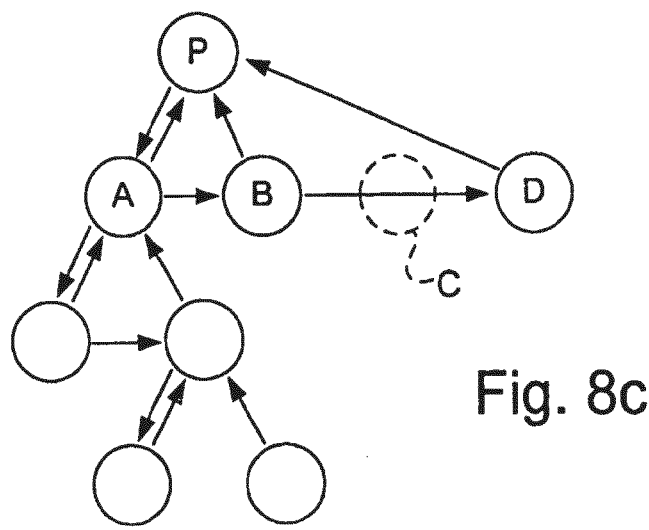

FIGS. 8a-8c are several scenarios used to illustrate the process of FIG. 8. Assume that there is a tree structure as illustrated in FIG. 8a. If a node "A" (i.e. a client A) of FIG. 8a "s=disappears" all nodes (clients) 218 that used client A as a path to the server P are dropped from the network as illustrated in FIG. 8b. With reference again to FIG. 8a, if the node C disappears, the sibling B will simply reset its pointer to point to sibling D without any loss of service to any of the nodes. The lost nodes 218 of FIG. 8b will need to re-establish themselves into the network as previously described.

Figures 9A, 9B, 9C:
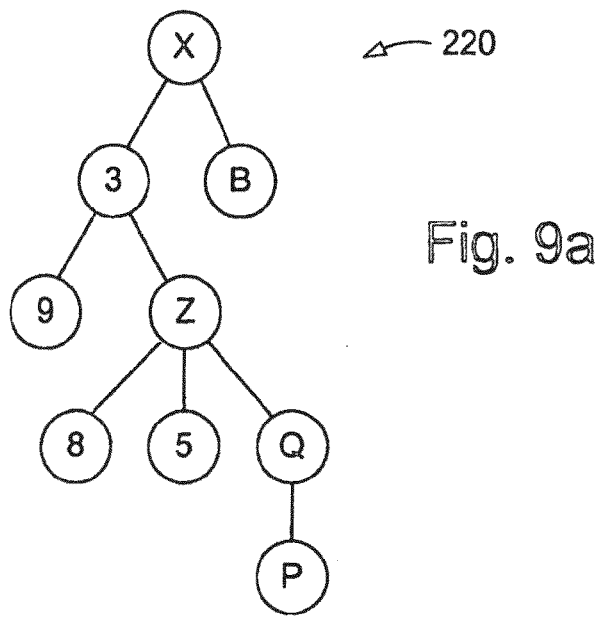
FIGS. 9a-9c illustrate the "Place Network Tree In Client Transmit Buffer" of FIG. 6.

FIG. 9a is a tree structure that will be used to illustrate the step 134 "Place Network Tree In Client Transmit Buffer" of FIG. 6. Since the tree structure 220 is a logical construct, it must be represented in a form suitable for digital transmission. This form is illustrated in FIG. 9b as a string 222. With reference to both FIGS. 9a and 9b, the string 222 represents the tree on a top-to-bottom, left-to-right basis. Therefore the string 222 indicates for the parent X that its left son is 3 with a right sibling B. For the parent 3, there is a left son 9 with a right sibling Z. For the parent Z, there is a left son 8, a right sibling 5, and another right sibling Q. For the parent Q, there is a left son R. Therefore, the tree structure 220 has been completely and compactly represented by the notation of the string 222.

The converting of the trees to strings and the reverse is well known to those skilled in the art. In short, a left parenthesis in the string indicates that a left son follows, and a comma in the string indicates that a right sibling follows. For example, the aforementioned book SNOBOL 4: Techniques and Applications describe the process for converting trees to "prefix form" as described above, and vice versa. The aforementioned book ALGORITHMS IN SNOBOL 4 likewise describes the process.

While the tee structure 9a is useful for representing and traversing a tree data structure, it is not well-adapted for rapid searching for particular nodes. For this purpose, the table of FIG. 9c is created to implement fast searching and other housekeeping functions. In this illustration, the table of FIG. 9c includes four columns. The first column is the sequential element or "node" number, a second column 226 is the node name, the third column 228 includes the time stamp of the creation of the node, and the fourth column includes the actual physical memory location of the node. In this way, a particular node can be searched by element number, node name, time stamp, or memory location without resorting to the time consuming recursive search algorithms otherwise typically used to search tree structures.

Figure 10:
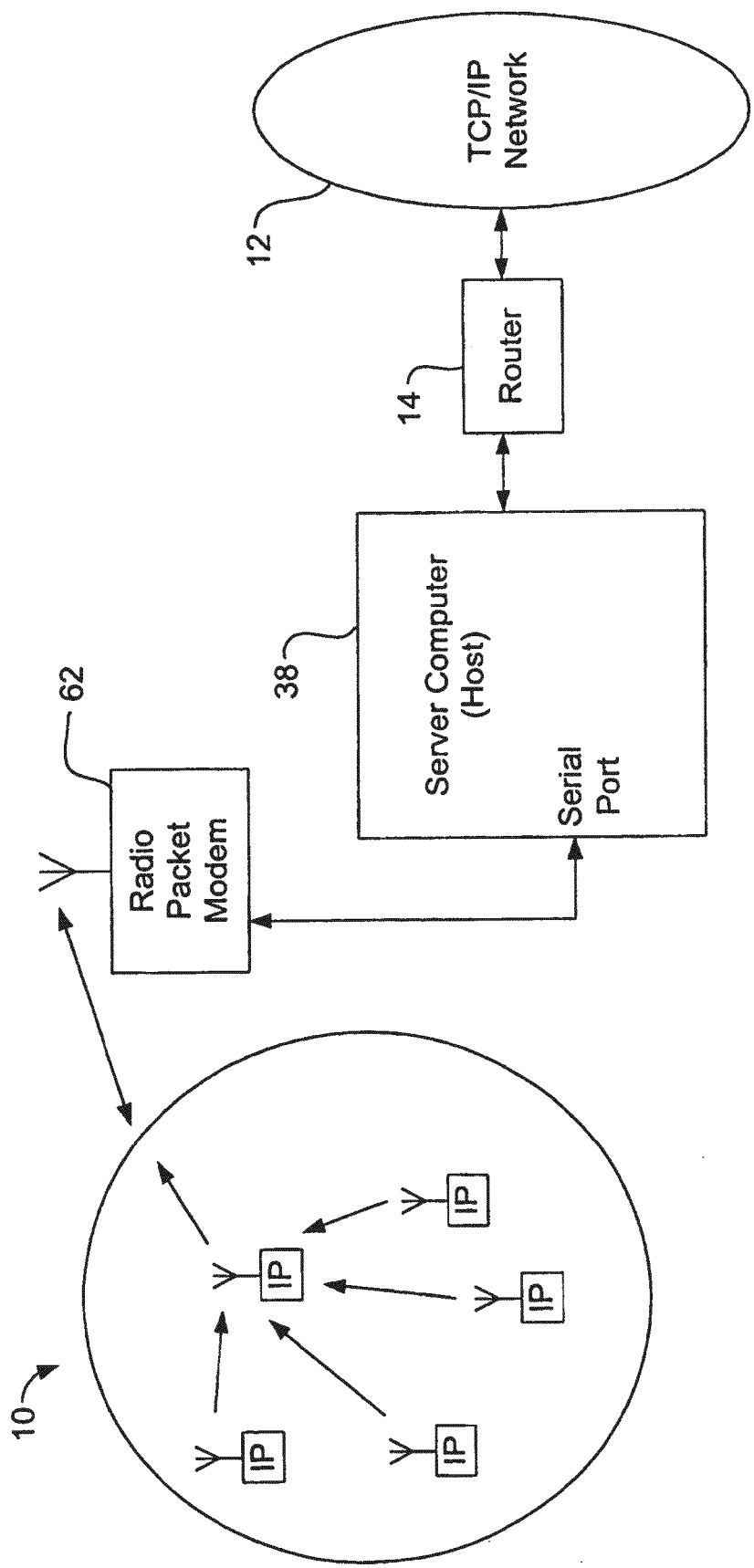
FIG. 10 is a pictorial representation of the "Communicate with Network" process of FIG. 4.

FIG. 10 is a pictorial representation of a portion of the server of FIG. 3 that has been simplified to explain steps 78 of FIG. 4 "Communicate With Network." The wireless network system 10 includes a number of clients and, perhaps, other servers, each of which has its own IP address. The radio modems of those clients and servers communicate with radio modem 62 of the server which provides digital data to the serial port of a server computer or host 38. A router, bridge or other device is used to connect the server to a network, such as TCP/IP network 12. Of course the radio packet modem 62 and the server computer 38 can be considered part of the wireless network system 10 as described previously. The combination of the server and the router or the like performs a "gateway" function, in that it provides translation services between the two networks 10 and 12.

Referring back to FIG. 4 the step 76 "Send Packets" simply involves sending the data packets stored in the client transmit buffer to the network 10 through the radio modem 62. Likewise, and in a straightforward matter, the step 78 "Communicate With Network" simply forwards the data stored in the network transmit buffer to the network through the router 14 or through another route, such as the Ethernet interface 58. The "Send Packets" and "Communicate With Network" processes will be easily understood by those skilled in the art. Again, the server process control 72 allocates system resources among the processes 74-80 on a round-robin basis.

Figure 11:
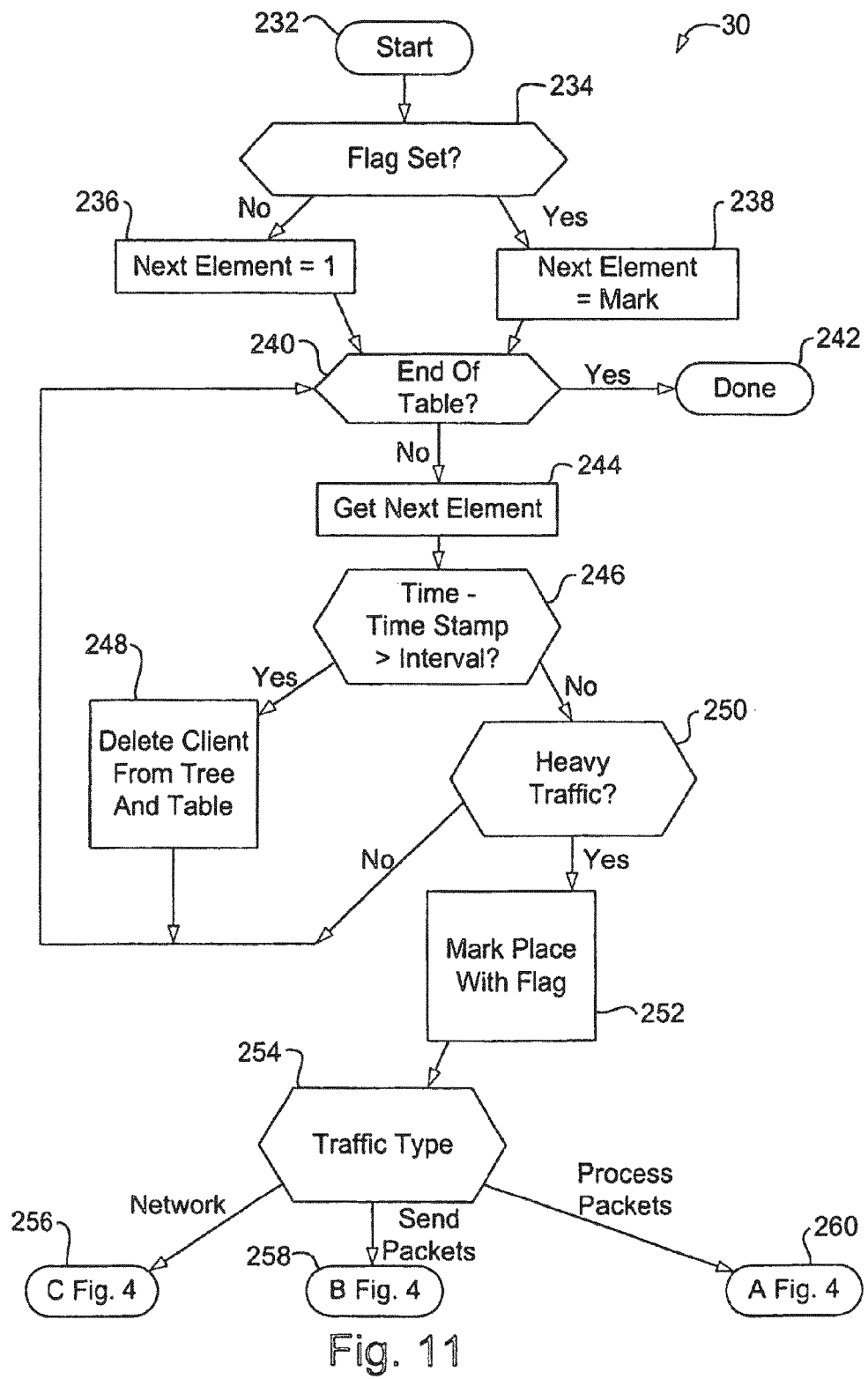
FIG. 11 is a flow diagram of the process "Communicate With Network" of FIG. 4.

In FIG. 11, the housekeeping process 80 of FIG. 4 is illustrated in greater detail. Since the housekeeping function 80 is of generally less importance than the other function of process 70, it is possible that housekeeping function will be interrupted with a branch to one of function s 74, 76 and 78 of FIG. 4.

More particularly, in FIG. 11, the housekeeping function 80 of FIG. 4 is illustrated in greater detail. The process 80 begins at 232 and, in a decision step 234, it is determined whether a flag is set. If not, at step 236, the next element is equal to 1, i.e. it is picking the first element on the list. If step 234 determines that a flag is set, the process 80 knows that the housekeeping has been interrupted in the middle of the list and therefore the next element is set equal to the stored mark point as indicated in step 238. Next, a step 240 determines whether if the end of the table has been reached. If so, the process is completed at 242. If the of the end table has not been reached, the element retrieved in a step 244, and then in a step 246, it is determined whether the current time minus the time stamp is greater than a predetermined interval. If it is, a step 248 deletes the client from the tree and from the table. This step 248 is performed to ensure that a client node that has dropped out the network 10 without informing the server is deleted from the server tree at some point in time. A suitable interval may be 15 minutes, or any interval set by a network manager. Process control then returns to step 240.

If step 246 determines that a node (i.e. a client) corresponding to the next element has cheeked-in within the time INTERVAL, a step 250 determines whether there is a heavy traffic on the server. If not, process control is returned to step 240. If there is a heavy traffic, a step 252 marks the place in the table corresponding to the current element (i.e. the marked point in the list is stored in memory) and then a step 254 determines the traffic type. Process control then branches to process 256 if it is heavy network traffic, 258 if it is heavy outgoing packet traffic, and process 2600 if it is heavy incoming packet traffic.

Figure 12:
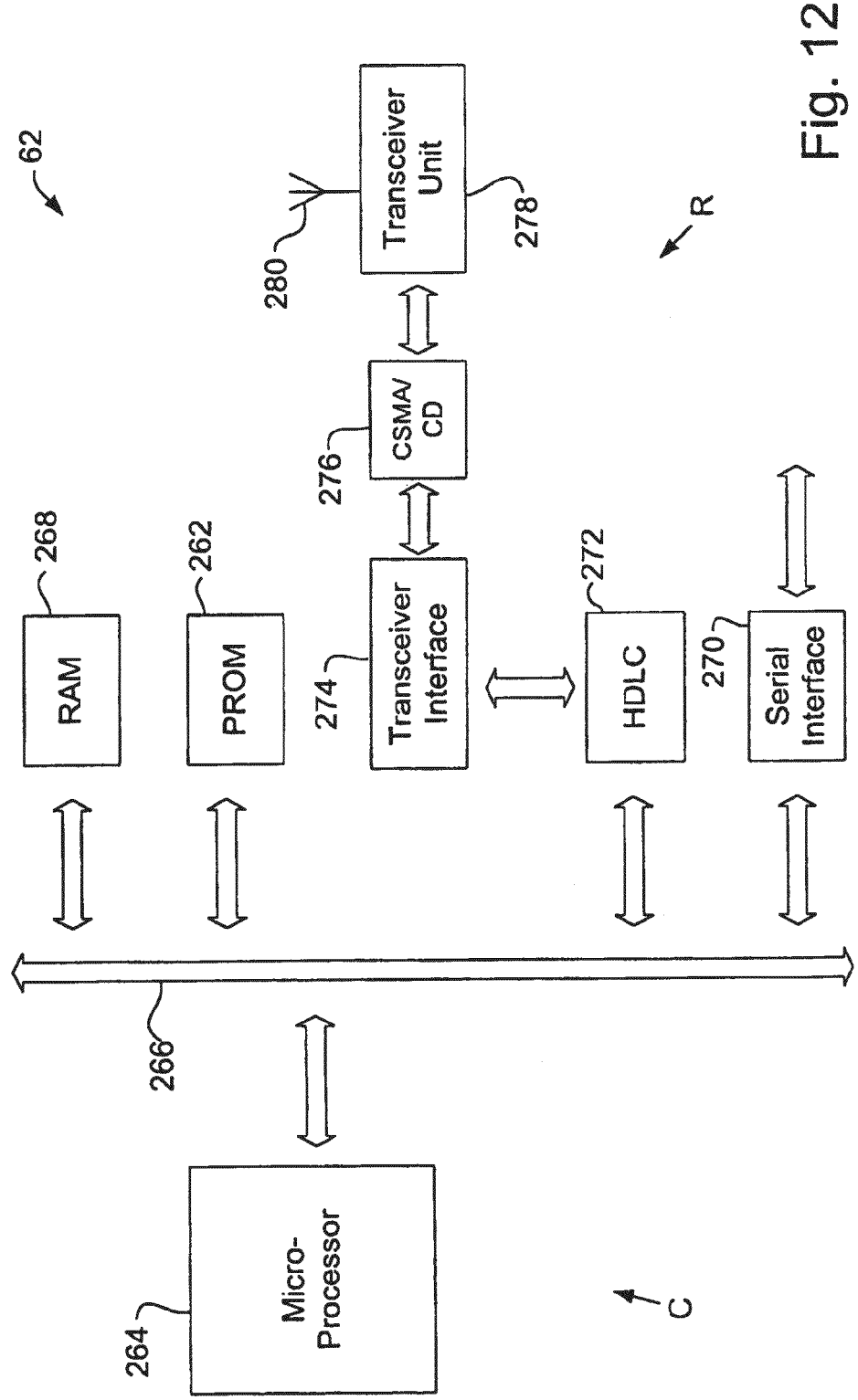
FIG. 12 is a block diagram of radio packet modem used in the present invention.

In FIG. 12, a radio modem 62 (which can be similar to all of the radio modems described herein) is illustrated in block diagram form. Again, the radio modem 62 is commercially available from GRE America, Inc. as the Gina spread spectrum radio modem, models 6000N-5 or 8000N-5. Spread spectrum technology gives good reliability and some transmission security in that a 127 bit cyclical code must be known by both the transmitting and receiving node. However, for true data security, encryption techniques, well known to those skilled in the art, should be used. Gina modems do include the option of 64 bit built-in encryption as an option.

It should be further noted that the Gina radio modem hardware can be modified to incorporate the server process (or the client process for the client radio modem) of the present invention by storing program steps implementing those processes into a ROM or programmable ROM (PROM) 262 of the radio modem 62.

The radio modem 62 includes a microprocessor 264 coupled to a bus 268. The microprocessor is an Intel 80C188 microprocessor in the present example. The PROM 262 (which currently stores 512 Kbytes of code) is coupled to the bus, as in RAM 268, a serial interface 270 and an HDLC converter 272. Coupled to the HDLC 272 interface is a transceiver interface 274, and coupled to the transceiver interface 274 is a CSMA/CD unit 276. A transceiver unit 278 with an antenna 280 is coupled to the CSMA/CD unit 276.

The devices 272 and 276 are used for error correction and noise cancellation, as will be appreciated by those skilled in the art. The CSMA/CD detects if two packets have "collided" producing indecipherable noise. If so, no acknowledgement of the packets is sent by radio modem 62 and the senders of the two packets will wait a short random period before resending their packets. Since the waiting period is random, there is little likelihood that the packets will collide a second time. The HDLC performs a checksum on the received packets and, if the checksum fails, prevents the sending of the acknowledgement. This will cause the sending node to resend the packet after a random waiting period.

The currently used radio modems operate in the 902-908 MHZ frequency range at about 725 mW, and have an outdoor range of up to 12 miles, line-of-sight. These characteristics are a good compromise for a light to moderately dense network. If the network becomes very dense, it may be preferable to reduce the power, since this will reduce the number of clients that hear a given packet. Also, other frequency ranges are also suitable, such as the 2.404 to 2.478 GHz range.

The currently sold Gina spread spectrum radio models have their transmission ("baud") rate artificially limited to 38.4 kHz. However, this artificial limit can be easily removed by a simple change to the program in PROM 262 to allow the modems to operate at 115.2 kHz, or nearly at full ISDN baud rates. At these baud rates, a single server can reasonably support three simultaneous WWW browser sessions and a dozen e-mail sessions. This compares very favorably to cellular networks which, as noted previously, can only support one user at the time. This also compares very favorably to the RICOCHET system which, since is limited to 28.8K baud, is not very useful for WWW browsing.

Figure 13:
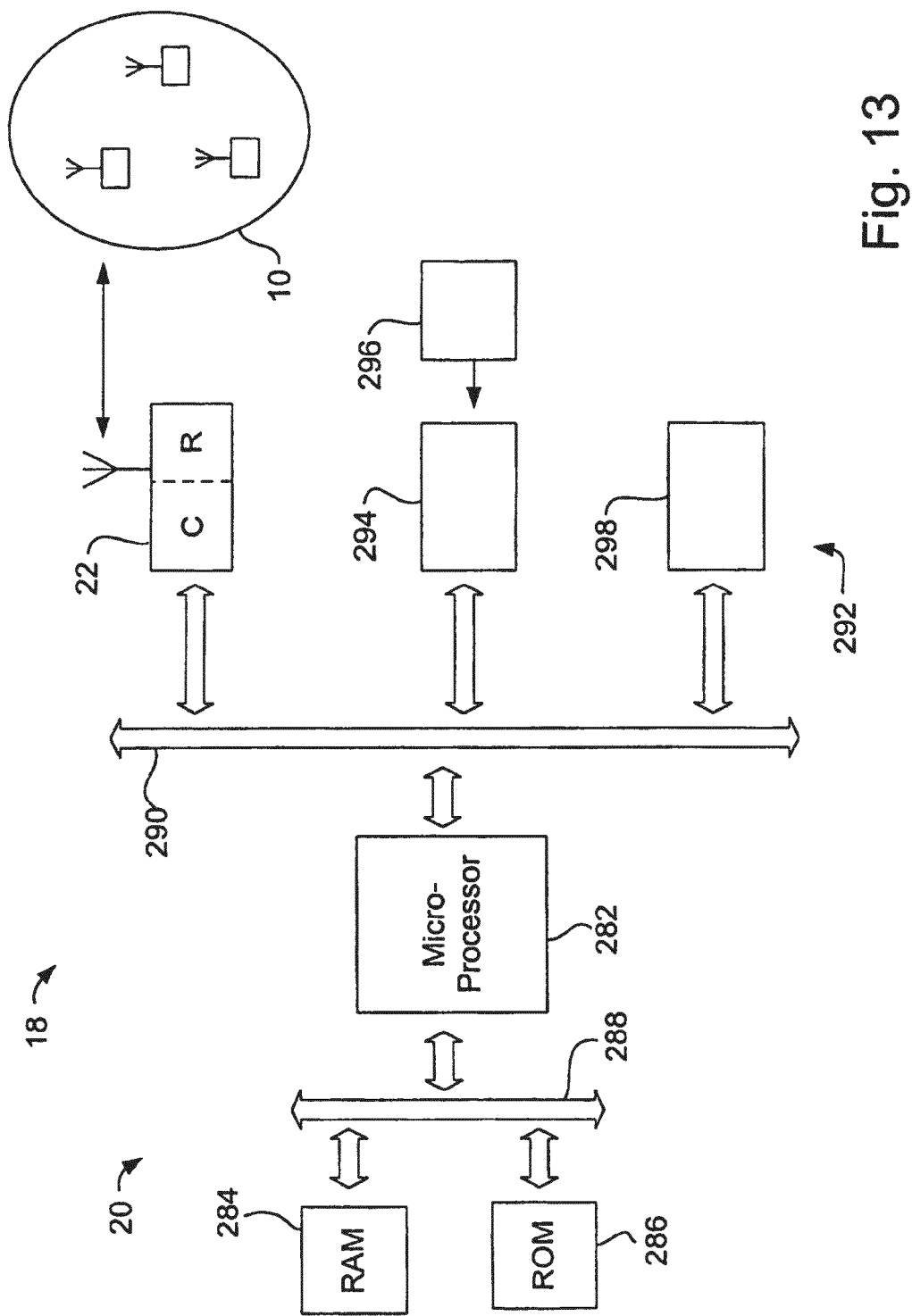
FIG. 13 illustrates a client, such as client A, B, C or D of FIG. 1.

In FIG. 13, a client 18 including a computer 20 and a radio modem 22 of FIG. 1 is illustrated in greater detail. Again, the client computer 20 can be any suitable form of digital processor including personal compute, work station, PDA, etc. A computer 20 includes a microprocessor 282, RAM 284, and ROM 286. The microprocessor is coupled to the RAM 284 and the ROM 286 by a memory bus 288. The microprocessor 282 is also coupled to an input/output (I/O) bus 290 to which a number of peripherals 292 may be attached, including the radio modem 22. As before, the radio modem 22 includes a control C portion and a radio R portion, where the control portion of the radio modem 22 is coupled to the I/O bus 290. With brief reference to FIG. 12, the control portion C is everything but the transceiver unit 278 and the antenna 280, and the radio portion R corresponds to the transceiver unit 278. Also, as before, the client process running on the client 18 can run on the computer 20, in the control C portion of the modem 22, or partially on both processors. The client 18 typically includes other peripherals 292 such as a removable media drive 294 receptive to removable media 296, (such as a floppy disk or a CD ROM) and to a hard disk drive 298. Those skilled in the design of computer system will readily understand how the hardware of client 18 is assembled and used.

In alternate embodiments of the present invention, uninterruptible power supplies and Global Positioning Systems (GPS) are added to the client 18. The uninterruptible power supplies ensure that the clients stay on the network, and the GPS can be used in conjunction with directional antennas (such as phased array antennas) attached to the radio modem 22 to direct the transmission to the desired next node in the link. This increases the efficiency of the system, and reduces "packet pollution" of the network. The GPS unit can be coupled to I/O bus 290, or can be incorporated into the radio modem 22.

Figure 14:
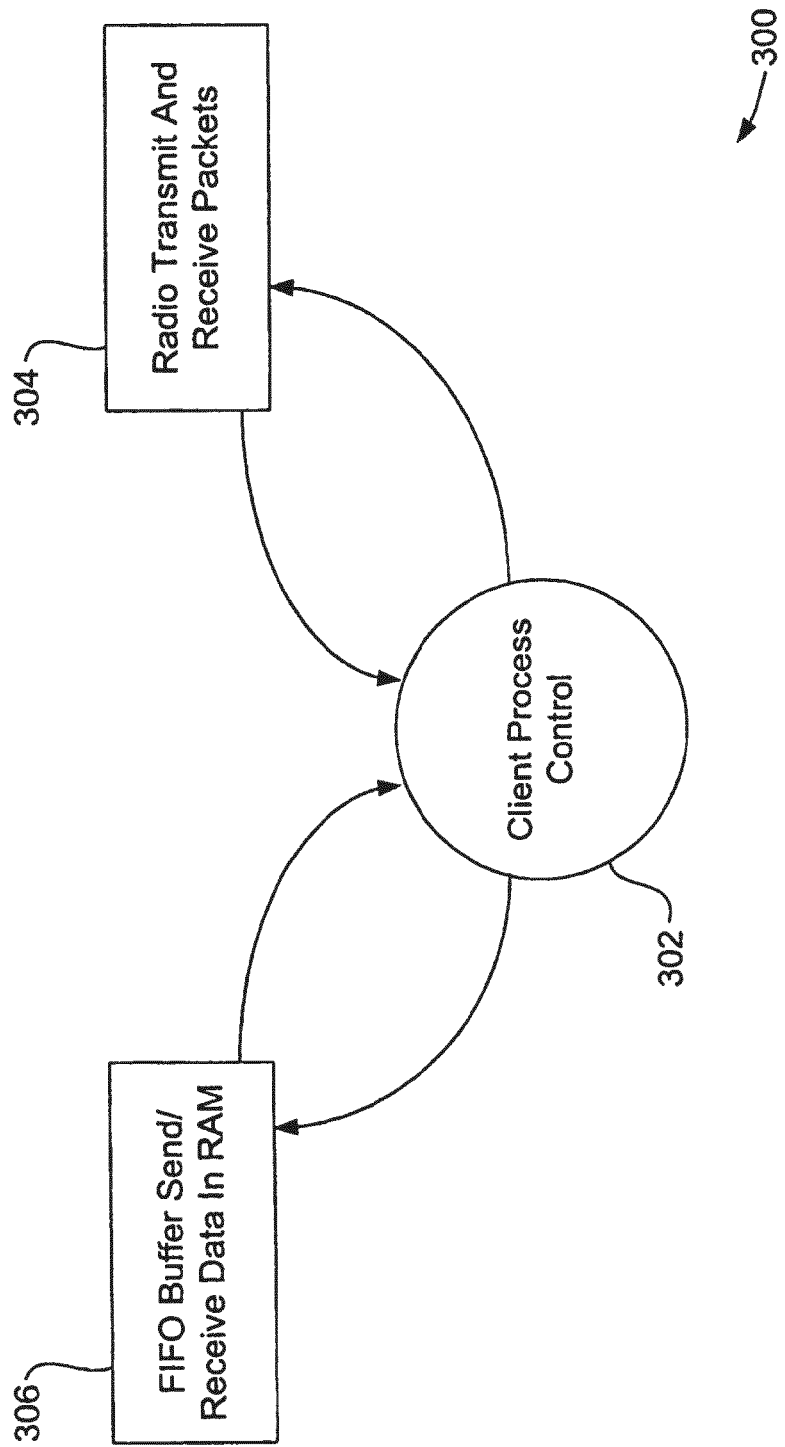
FIG. 14 is a flow diagram of a client process running on the client of FIG. 13.

In FIG. 14, a client process 300 is implemented in the hardware of client 18. Again, this process can run on the microprocessor 282, or it can be partially or wholly run on the microprocessor of the controller C of the radio modem 22. In this current preferred embodiment, the process 300 runs on the computer portion 20 of the client 18. The client process 30 includes a client process control 302, a process 304 for radio transmitting and receiving data packet, and a process 306 for maintaining a first-in-first-out (FIFO) buffer for send and receive data packets in RAM 284 for the computer 20.

Figure 15:
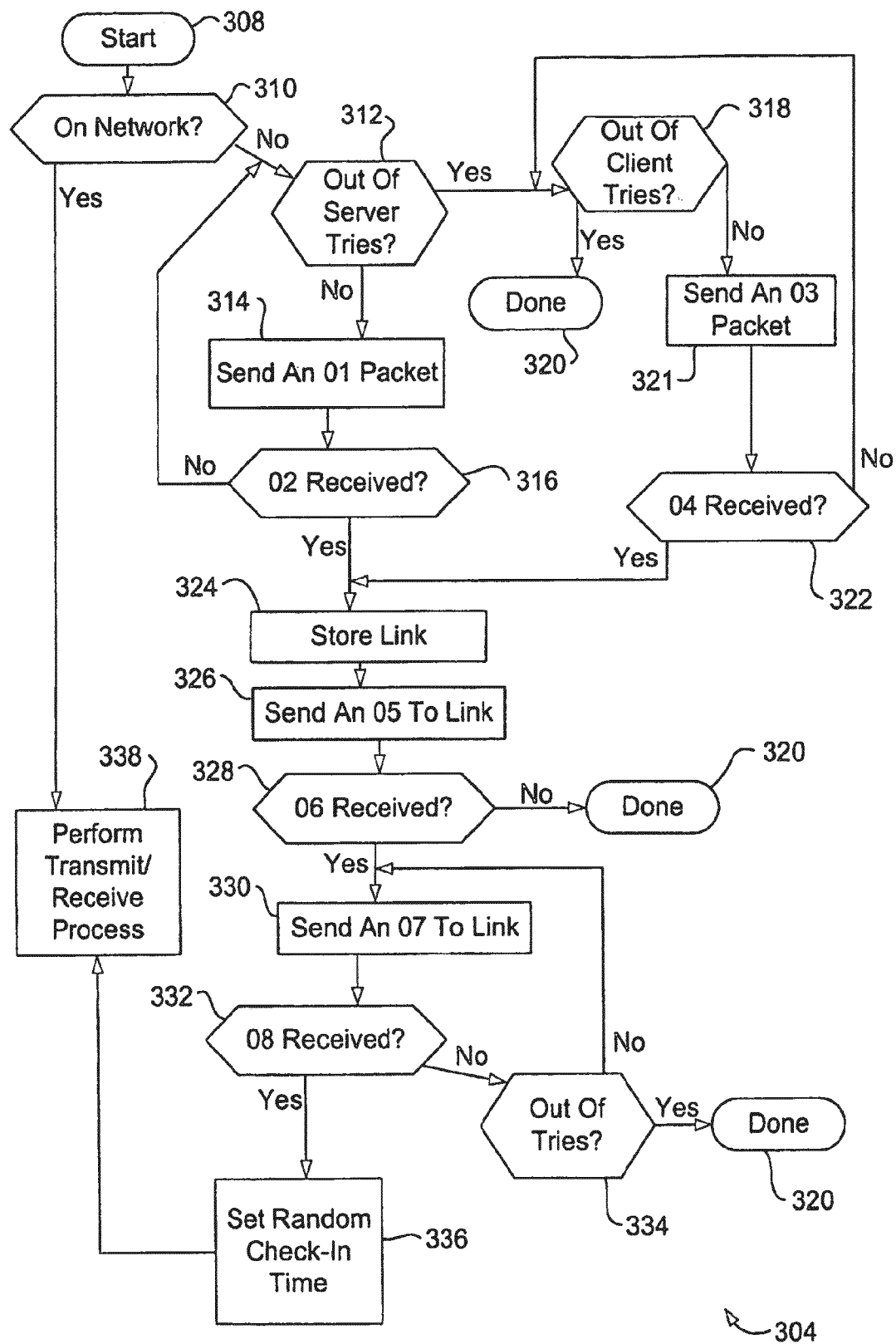
FIG. 15 is a flow diagram of the process "Radio Transmit and Receive Packet" of FIG. 14.

In FIG. 15, the process 304 of FIG. 14 is described in greater detail. The process 304 begins at 308 and, in a step 310; it is determined whether the client is on the network. If not, the client needs to get on the network before it can send data to the server. This connection process begins at 312 to determine whether it is out of tries in trying to reach the server. If not, it sends a 01 packet in a step 314 and waits to receive a 02 packet from the server or another client in a step 316. If it does not receive a 02 packet in response to 01 packet process control is returned to step 312 until it runs out of server tries. When it does run out of server tries, process control is turned over to step 318 which determines whether it is out of client tries. If yes, this particular client cannot reach either a server or another client and the process terminates at 320 with a failure. If it is not out of client tries in step 318, a 03 packet is sent in a step 321 and the client waits to receive a 04 from another client in a step 322. If a 04 is not received, the process control is returned to a step 318 until they are out of client tries.

If a 02 is received in a step 316 or a 04 is received in a step 322, then the client is in communication with the server or a client, respectively. In either instance, a step 324 stores the "link" i.e. the path to a server, whether it is direct to the server or through one or more intermediate clients. Next, in a step 326, a 05 is sent to the link and a step 328 determines whether a 06 is returned. If not, the process is terminated as indicated at 320. If a 06 has been received, then a 07 is sent to the link in a step 330, and a step 332 determines whether a 08 is returned. If not, a step 334 determines if they are out of tries, and if not, process control is returned to step 330 to send another 07 to the link. If after a certain number of tries, e.g. 3 tries, a 08 is received in response to 07 transmitted by the client, the process terminates with a failure at step 320. If a 08 is received as determined by step 332, a random check-in time is set in a step 336. A random check-in time is set so that not all clients will try to check in with the server at the same time. Preferably, the random times will equally distribute the check-in times for the various clients equally within the aforementioned period INTERVAL. Finally, at this point, the client is connected into the network and the transmit/receive process is accomplished in a step 338. Of course, if the client was on the network as determined by step 310, the step 338 can be performed directly. The step 338 will be performed until there is a time-out of the transmit/receive process due to the round-robin scheduling by the client process control 302 (see FIG. 14).

Figure 16:
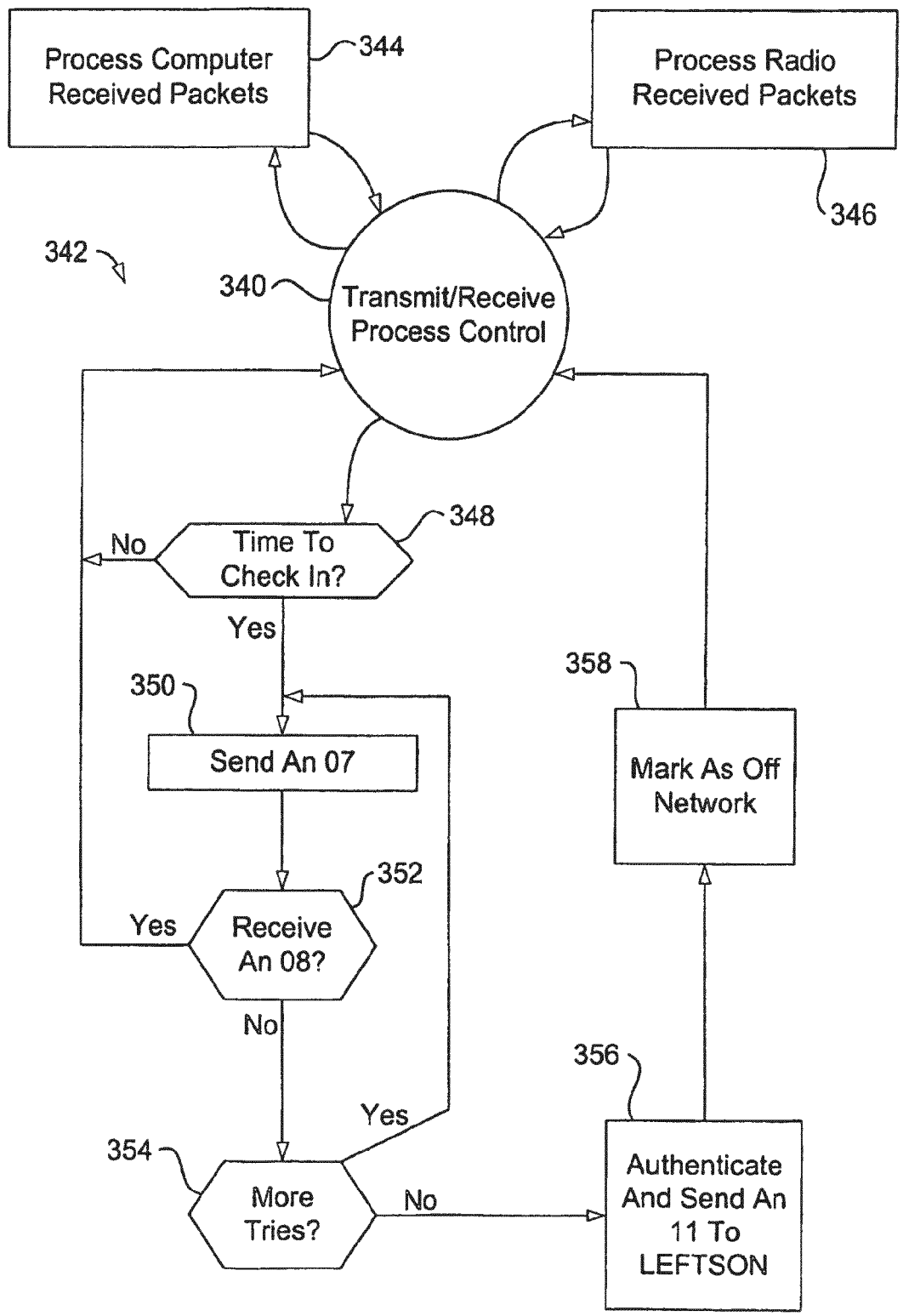
FIG. 16 is a flow diagram of the process "Perform Transmit/Receive Process" of FIG. 15.

In FIG. 16, the process 338 "Perfom/Transmit/Receive" is illustrated in greater detail. The process 338 has a transmit/receive process control 340 and the three subprocesses 342, 344 and 346. Again, the time allocated to the various subprocesses on a round-robin basis.

The subprocess 342 is the check-in routine where the client is required to check in on a periodic basis with the server to avoid being dropped from the server's routing list. As noted previously, the check-in start time is essentially random, and is within a given period INTERVAL. More particularly, the subprocess 342 begins with a decision 348 as to whether it is the proper time to check-in. If not, process control is immediately returned to process control 340. If it is check-in time, a 07 is sent to the server. If a 08 is received from the server, all is well and process control is returned to process control 340. If the expected 08 is not received, decision step 354 determines if there are any more tries. Typically, at least three tries will be allowed. If there are more tries, process control is returned to step 350. If there aren't any more tries, a step 356 will authenticate and send an 11 to the left son of the client that the client is removing itself from the network. Authentication prevents the situation where a "promiscuous" spooler could masquerade as a client and transmit an "11" packet with downstream client addresses, thereby disconnecting those downstream clients from the network. The client then marks itself as being disconnected or "off" of the network in a step 358, and a process control is returned to process control 340.

Figure 17:
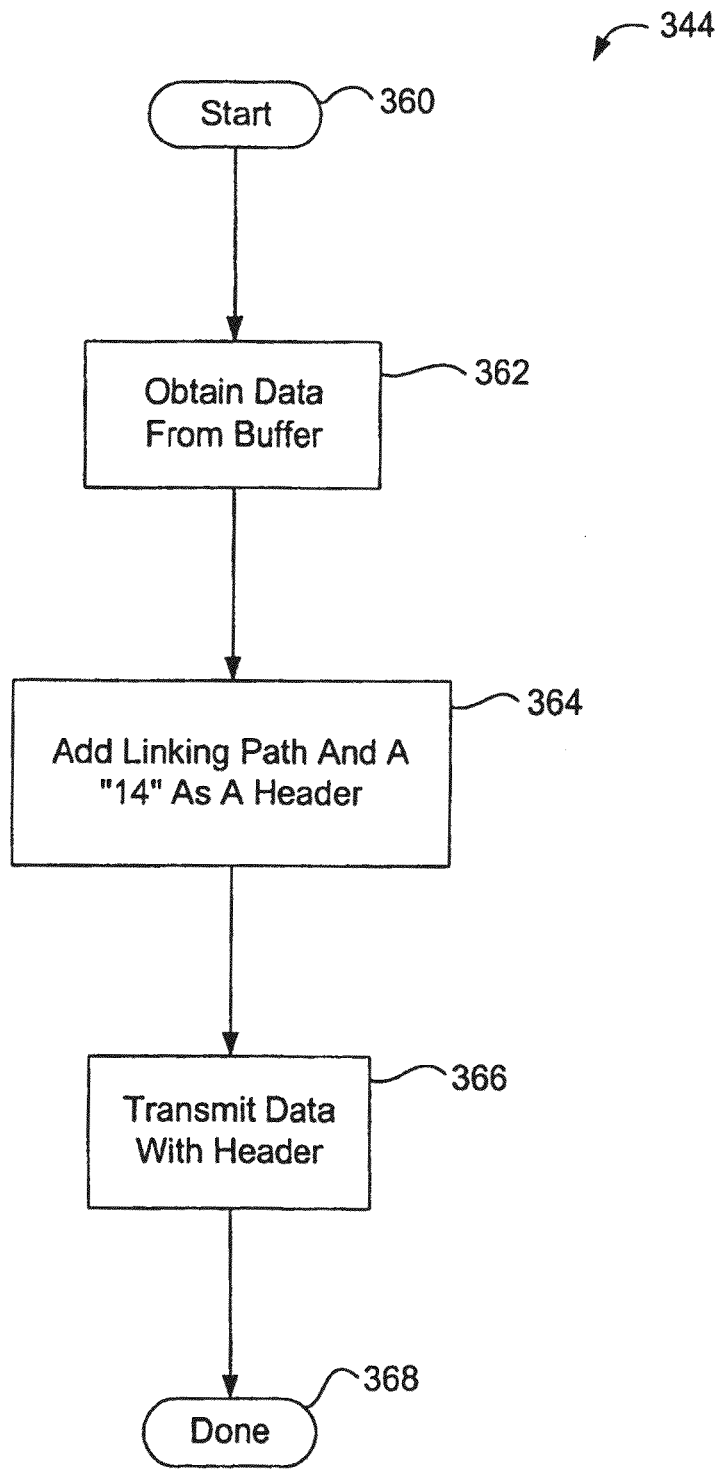
FIG. 17 is a flow diagram of the process "Process Computer receive Packets" of FIG. 16.

In FIG. 17, the process 344 "process Computer Received Packets" is shown in flow diagram form. The process 344 begins at 360 and, in a step 362, the data is obtained from a buffer. Next, in a step 364, the header is added to the data including the link and the packet type "14" to indicate that this is a data-type data packet. Next, the data packet, complete with header, is transmitted in a step 366 and the process is completed at step 368.

Figure 18:
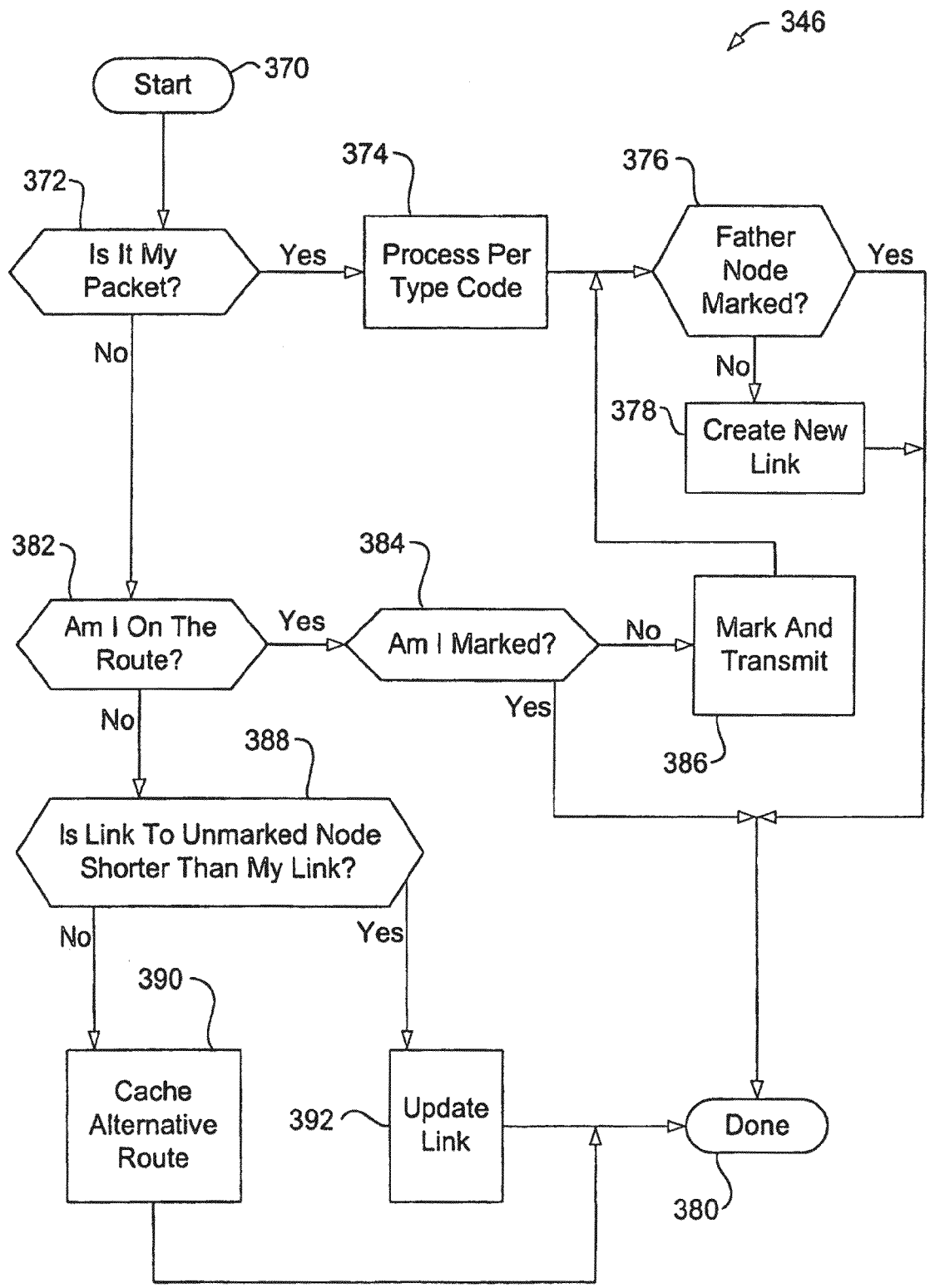
FIG. 18 is a flow diagram of the process "Process Radio Received Packets" of FIG. 16.

FIG. 18 illustrates the process 346 "Process Radio Packets" of FIG. 16 in grater detail. The process 346 begins at 370 and, in a step 372, determines if the received packet is for it. If yes, a step 374 will process the packet per the code type, as will be discussed in greater detail subsequently. Then, a step 376 determines if the father node of the client has been marked. If not, a new, shorter link is created, since the packet was received without being relayed by the father node. If the father node has been marked, or after a new link has been created, the process terminates at 380.

If step 372 determines that it is not that client's packet, a step 382 determines if that client is on the route for the packet. If yes, a step 384 tests to see if the client is marked. If it is marked, it has already sent that packet and the process is completed at 380. If the client hasn't been marked, it marks itself in the header of the data packet and transmits the packet in a step 386. Process control is then given to step 376 to see if the client's link can be upgraded as discussed previously.

If step 382 determines that the packet is not for that client, and that the client is not part of the link, steps 388-392 still analyze the packet in process known as "pooning". Since this client can hear this packet, there is an opportunity to upgrade its link. Step 388 determines whether the link to the last marked node plus one (i.e. the distance to the first unmarked node) is shorter than its own link. This is because this client is listening to the last marked node, and the number of hops through that last marked node is the number of hops of that last marked node plus one. If it is, the client's link is updated in a step 392 to this shorter link. If not, the alternative route is cached in case the client's current link becomes inoperative. Therefore, in the pooning process, the client listens to all packets to continuously and dynamically update its link to the best possible path.

Figure 18A:
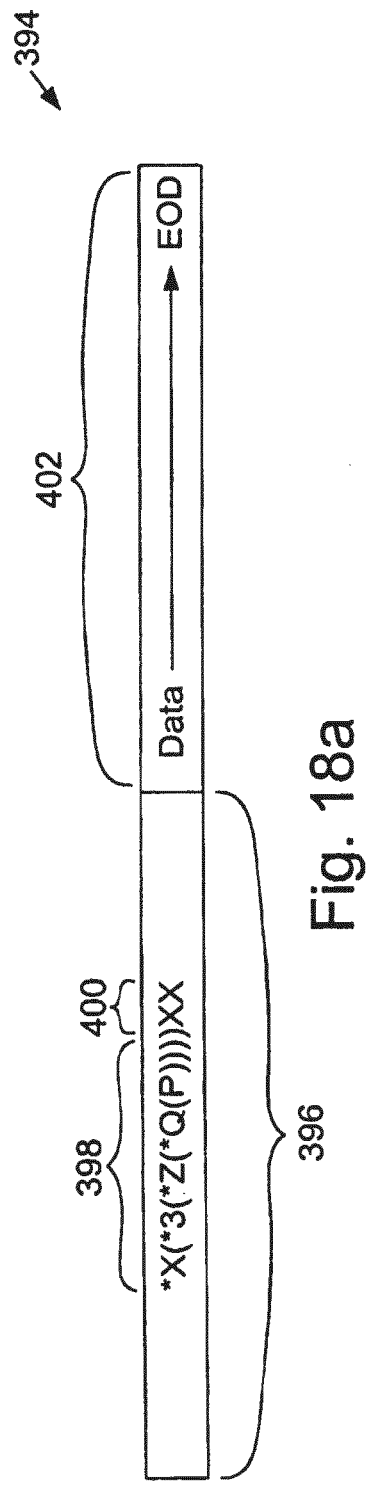
FIGS. 18A and 18B are used to illustrate the process "Is It My Packet?" of FIG. 18.
Figure 18B:
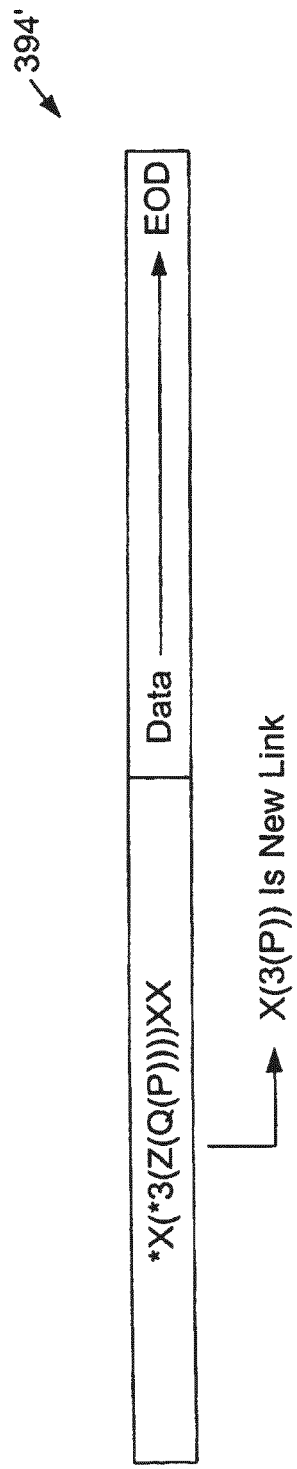

In FIG. 18A, a data packet 394 of the present invention includes a header portion 396 including a link section 398 and a data type section 400, and a data portion 402. The link 398 indicates that the destination of this data packet is the node P. The two digit data type 400 indicates what type of data is being sent, and the data field 402 includes the actual data and is terminated within EOD (end of data) marker. This packet corresponds to the tree of FIG. 9a. Since all upstream nodes (i.e. nodes Q, Z, 3, and X) are marked with asterisk ("*"), it is known that the data packet has passed through and has been marked by each of these nodes before reaching the node P. If, however, the data packet 394' of FIG. 18B is received where in only nodes X and 3 are marked, this means that the node 3 can hear the transmission of node (client) 3 directly. In this instance, there is no need to go through nodes Q and Z to reach server X. As a result, the new, upgraded link is from node P to node 3 to the server X. This is represented by the notation: X(3((P)).

The table of FIG. 19 is used to illustrate the process "Process Per type Code" step 384 of FIG. 18. The table of FIG. 19 includes tree columns 404, 406, and 408. The first column 404, lists the codes that can be received. These codes correspond to the 2 byte code 400 of the data packet 394 of FIG. 18A. The second column 406 corresponds to the server responses to receiving such codes, and the third column 408 are the client responses to receiving the codes. We will now discuss each of the codes, in sequence.

When the server receives a 01 code its response is 02 code plus a one-way seed as discussed previously. Since 01 code is never intended for a client, it will ignore or "drop" the 01 coded data packets.

For the 02, 03 and 04 codes, the server will ignore or drop those data packets because these data packets are only intended for clients. If a client receives a 02, it responds with a 05 and a one-way response. In response to a 03, a client will send a 04 and a seed or a null. In response to a 04, the client will send a 05 and a one-way seed. Again, one-way seeds and responses to one-way seeds were discussed previously.

When a server receives a 05, if it has previously sent a 02 and if the 05 is authentic, then it will send a 06. Otherwise, it will drop the packet. When a client receives a 05, if it had previously sent a 04, and if the 05 is authentic, then it sends a 06. Otherwise, the client will drop the data packet. If the server receives a 06, it will drop the data packet. If a client receives a 06 after it sent a 05, then it will send a 07. Otherwise, it will drop the packet as well.

When a 07 is received from the server, it will immediately respond with a 08. Since 07 coded packets are never intended for clients, it will be dropped.

Data packets coded with an 08, 09, 10 or 11 are all dropped if received by a server. If a client receives a 08, it will update the tree or repeat the data. In response to a 09, a client will send a 10. In response to a 10, a client will update the tremor repeat the data. In response to a type 11, it sends an 11 to the left son with the address the departing node plus a 01 to reconnect to the network.

Data packets of type 12 and 86 are currently reserved. In response to a data packet type 13, a server will delete the sender. Since this is a server destination data packet only, if a client receives a data packet of type 13, it will drop the data packet.

Finally, if a server receives a data packet of type 14, it will send it to the network transmit buffer. If a client receives a data packet of type 14, it will send it to the computer transmit buffer.

Figure 20:
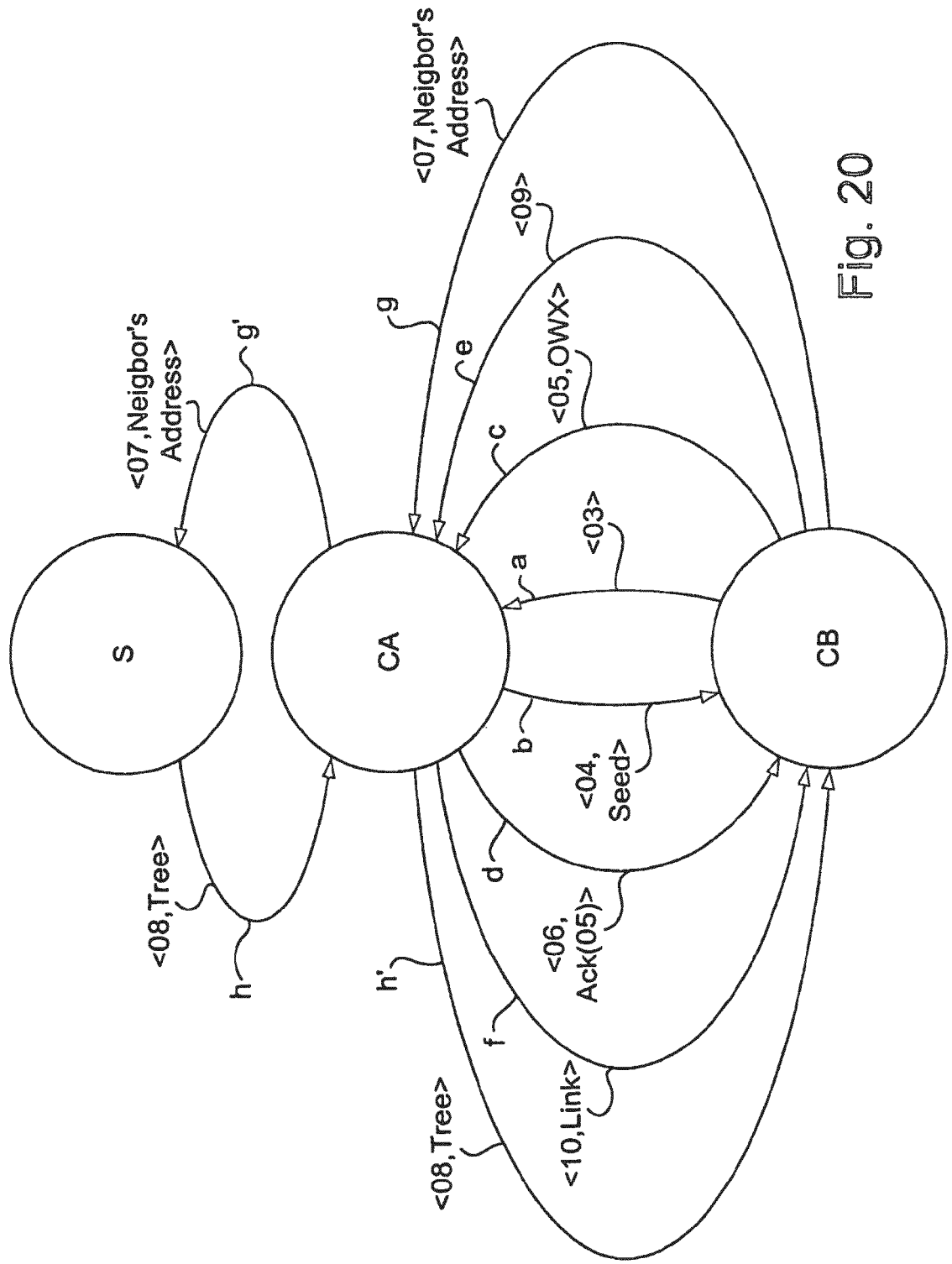
FIG. 20 illustrates an initialization routine of the client process of the present invention.

FIG. 20 illustrates an initialization routine which connects the client CB to a server S through another client CA. The sequence is a s follows. As indicated by arrow a, client CB sends a 03 to client CA. In return, the client CA sends a 04 and a seed back to client CB as indicated by arrow b. Client CB then sends a 05 and a one-way response as indicated by arrow c to client CA, and client CA sends a 06 and an acknowledgement with a 05 to a client CD as indicated by arrow d. Then, client CB sends a 09 to client CA as indicated by arrow d. Then, client CB sends a 09 to a client CA as indicated by arrow e, and client CA sends a 10 and the link to the client CB as indicated by arrow f. Client CB then sends a 07 and the neighbor's addresses to the client CA as indicated by arrow g, and client CA relays the 07 and the neighbor's address to the server S as indicated by arrow g'. The server S, then sends a 08 and the tree to the client CA as indicated by arrow h, and the client CA relays the 08 and the tree to the client CB as indicated by arrow h'. At this point, the client CB has the link tree to the server S and the complete tree of the network in its memory.

Figure 21B:
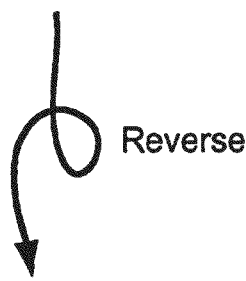
Figure 21D:
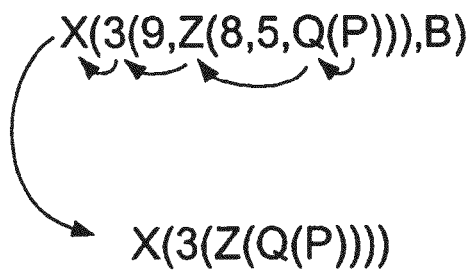

FIGS. 21a-21d illustrate a portion of the server process which deals with determining a return path from a received data packet at a server. Assume, for example, the tree is known to the server is as illustrated in FIG. 21a. this is the same tree as was illustrated in an example of FIGS. 9a and 9b. Then, assume that the server X receives the data packet from a client P as illustrated in FIG. 21b. The simplest way of determining the reverse address is simply reverse the link section of the header portion of the data packet of FIG. 21b to provide a return address of 21c. However, if the part of the address of the header of the data packet of FIG. 21b has been lost of corrupted during the transition process, the tree of FIG. 21a can be used to reconstruct the return path. This is accomplished by jumping from parent to parent in reverse order as indicated to determine the return path. In this example, the reverse order parent jumping indicates that the original path to the server X was P>Q>Z>3>X, which, when reversed, gives us the proper reverse path, namely X(3(Z(Q(P)))). As will be appreciated by those skilled in the art, this type of reverse tree transversal is easily accomplished with a recursive function.

While this invention has been described in terms of several preferred embodiments, there are alternations, permutations, and equivalents which fall within the scope of this invention. It should also be noted that there are many alternative ways of implementing both the process and apparatus of the present invention. It is therefore intended that the following appended claims be interpreted as including all such alternations, permutations, and equivalents as fall within the true spirit and scope of the present invention.

The invention claimed is:

1. A wireless network system comprising:
   a server including a server controller and a server radio modem, said server controller implementing a server process that includes the control of said server radio modem, said server process including the receipt and transmission of data packets via said server radio modem;
   a plurality of clients each including a client controller and a client radio modem, said client controller implementing a client process that includes the control of said client radio modem, said client process including the receipt and transmission of data packets via said client radio modem, wherein said client process of each of said clients initiates and selects a radio transmission path to said server that is one of a direct link to said server and an indirect link to said server through at least one the remainder of said plurality of clients; and wherein the server process is configured to:
receive information identifying the selected transmission path from each of the plurality of clients;
determine a server selected transmission path for each of the plurality of clients based on the selected transmission paths received from the plurality of clients;
send information identifying the server selected transmission path for each of the clients to the respective clients; and
maintain a client link tree having client link entries representing each of the plurality of clients.

2. A wireless network system comprising:
a server including a server controller and a server radio modem, said server controller implementing a server process that includes the control of said server radio modem, said server process including the receipt and transmission of data packets via said server radio modem; and
a plurality of clients each including a client controller and a client radio modem, said client controller implementing a client process that includes the control of said client radio modem, said client process including the receipt and transmission of data packets via said client radio modem, wherein said client process of each of said clients initiates and selects a radio transmission path to said server that is one of a direct link to said server and an indirect link to said server through at least one the remainder of said plurality of clients, wherein said server process further includes logic that maintains a client link tree having client link entries representing each of the plurality of clients, and wherein the server process is configured to:
receive information identifying the selected transmission path from each of the plurality of clients,
determine a server selected transmission path for each of the plurality of clients based on the selected transmission paths received from the plurality of clients, and
send information identifying the server selected transmission path for each of the clients to the respective clients.

3. A wireless network system as recited in claim 2, wherein said server process is further configured to:
compare a selected link from said client to said server to a current client link entry in said client link tree; and
update said client link tree when said comparison meets predetermined conditions.

4. A wireless network system as recited in claim 2, wherein said server process is further configured to:
determine if said client is authentic;
determine if said client is already in said client link tree if said client is determined to be authentic;
delete said client from said client link tree if said client is authentic and is already in said client link tree; and
insert said client in said client link tree if said client is authentic and is not already in said client link tree.

5. The wireless network system of claim 2, wherein the client link entries correspond to the server selected transmission path between the server and the respective client.

6. A wireless network system comprising:
a server providing a server process including receiving data packets via a server wireless communication means, sending data packets via said wireless communication means, communicating with a network, and performing housekeeping functions;
a plurality of clients, each client providing a client process including sending and receiving data packet via a client wireless communication means, maintaining a send/receive data buffer in digital memory, and selecting a transmission path to said server that is one of a direct link to said server and an indirect link to said server through at least one of the remainder of said plurality of clients; and
wherein said selected transmission path to said server is a path utilizing the least number of other clients, and wherein the server process is configured to:
receive information identifying the selected transmission path from each of the plurality of clients,
determine a server selected transmission path for each of the plurality of clients based on the selected transmission paths received from the plurality of clients,
send information identifying the server selected transmission path for each of the clients to the respective clients; and
maintain a client link tree having client link entries representing each of the plurality of clients.

7. A wireless network system comprising:
a server providing a server process including receiving data packets via a server wireless communication, sending data packets via said wireless communication, communicating with a network, and performing housekeeping functions; and
a plurality of clients, each client providing a client process including sending and receiving data packet via a client wireless communication, maintaining a send/receive data buffer in digital memory, and selecting a transmission path to said server that is one of a direct link to said server and an indirect link to said server through at least one of the remainder of said plurality of clients,
wherein said server process further comprises maintaining a client link tree having client link entries representing each of the plurality of clients, and
wherein the server process is configured to:
receive information identifying the selected transmission path from each of the plurality of clients,
determine a server selected transmission path for each of the plurality of clients based on the selected transmission paths received from the plurality of clients,
update the client link entries to provide the server selected transmission path, and
send information identifying the server selected transmission path for each of the clients to the respective clients.

8. A wireless network system as recited in claim 7, wherein said server process is further configured to:
compare a selected link from said client to said server to a current client link entry in said client link tree; and
update said client link tree when said comparison meets predetermined conditions.

9. A wireless network system as recited in claim 7, wherein said server process is further configured to:
determine if said client is authentic;
determine if said client is already in said client link tree if client is determined to be authentic;
delete said client from said client link tree if said client is authentic and is already in said client link tree; and insert said client in said client link tree if said client is authentic and is not already in said client link tree.

10. The wireless network system of claim 7, wherein the client link entries correspond to the server selected transmission path between the server and the respective client.

11. A method for providing wireless network communication comprising:
utilizing a server implementing a server process including receiving data packets via RF transmission, sending data packets via RF transmission, communicating with a network, and performing housekeeping functions; and
utilizing a plurality of clients, each client providing a client process including sending and receiving data packet via RF transmission, maintaining a send/receive data buffer in digital memory, and selecting a transmission path to said server that is one of a direct link to said server and an indirect link to said server through at least one of the remainder of said plurality of clients,
wherein the server process:
receives information identifying the selected transmission path from each of the plurality of clients,
determines a server selected transmission path for each of the plurality of clients based on the selected transmission paths received from the plurality of clients,
sends information identifying the server selected transmission path for each of the clients to the respective clients; and
maintains a client link tree having client link entries representing each of the plurality of clients.

12. A method for providing wireless network communication comprising:
utilizing a server implementing a server process including receiving data packets via RF transmission, sending data packets via RF transmission, communicating with a network, and performing housekeeping functions; and
utilizing a plurality of clients, each client providing a client process including sending and receiving data packet via RF transmission, maintaining a send/receive data buffer in digital memory, and selecting a transmission path to said server that is one of a direct link to said server and an indirect link to said server through at least one of the remainder of said plurality of clients,
wherein said server process further includes maintaining a client link tree having client link entries representing each of the plurality of clients, and
wherein the server process:
receives information identifying the selected transmission path from each of the plurality of clients,
determines a server selected transmission path for each of the plurality of clients based on the selected transmission paths received from the plurality of clients,
updates the client link entries to provide the server selected transmission path, and
sends information identifying the server selected transmission path for each of the clients to the respective clients.

13. A method as recited in claim 12, wherein said server process further includes:
comparing a selected link from said client to said server to a current client link entry in said client link tree; and
updating said client link tree when said comparison meets predetermined conditions.

14. A method as recited m claim 12, wherein said server process further includes:
determining is said client is authentic;
determining if said client is already in said client link tree if client is determined to be authentic;
deleting said client from said client link tree if said client is authentic and is already in said client link tree; and
inserting said client in said client link tree if said client is authentic and is not already in said client link tree.

15. The method of claim 12, wherein the client link entries correspond to the server selected transmission path between the server and the respective client.

16. A method for providing wireless network communication comprising the steps of:
a server process including a data packet reception step, a data packet transmission step, a network communication step, and a housekeeping step; and
a plurality of clients each providing a client process including a data sending and receiving step, a send and receive data buffer maintenance step, and a transmission path selection step wherein the transmission path is one of a direct link to a server and an indirect link to said server through at least one of the remainder of said plurality of clients,
wherein the server process:
receives information identifying the selected transmission path from each of the plurality of clients,
determines a server selected transmission path for each of the plurality of clients based on the selected transmission paths received from the plurality of clients,
sends information identifying the server selected transmission path for each of the clients to the respective clients; and
maintains a client link tree having client link entries representing each of the plurality of clients.

17. A method for providing wireless network communication comprising the steps of:
a server process including a data packet reception step, a data packet transmission step, a network communication step, and a housekeeping step; and
a plurality of clients each providing a client process including a data sending and receiving step, a send and receive data buffer maintenance step, and a link selection step wherein the transmission path is one of a direct link to a server and an indirect link to said server through at least one of the remainder of said plurality of clients,
wherein said server process further comprises the step of maintaining a client link tree having client link entries representing each of the plurality of clients, and
wherein the server process:
receives information identifying the selected transmission path from each of the plurality of clients,
determines a server selected transmission path for each of the plurality of clients based on the selected transmission paths received from the plurality of clients,
updates the client link entries to provide the server selected transmission path, and
sends information identifying the server selected transmission path for each of the clients to the respective clients.

18. A method as recited m claim 17, wherein said server process further comprises the steps of:
comparing a selected link from said client to said server to a current client link entry in said client link tree; and
updating said client link tree when said comparison meets predetermined conditions.

19. A method as recited in claim 17, wherein said server process further comprises steps of:
determining if said client is authentic;
determining if said client is already in said client link tree if client is determined to be authentic;

deleting said client from said client link tree if said client is authentic and is already in said client link tree; and inserting said client into said client link tree if said client is authentic and is not already in said client link tree.

20. The method of claim 17, wherein the client link entries correspond to the server selected transmission path between the server and the respective client.

21. A wireless network system comprising:

a first node including a first node controller and a first node radio modem, said first node controller implementing a first node process that includes controlling of said first node radio modem, said first node process including receiving and transmitting data packets via said first node radio modem;

a plurality of second nodes each including a second node controller implementing a second node process that includes controlling a second node radio modem, said second node process including receiving and transmitting data packets via said second node radio modem, wherein said second node process of each of said second nodes includes initiating a radio transmission path to said first node that is a link to said first node through at least one of the remainder of said plurality of second nodes, wherein said first node process dynamically updates a second node link tree comprising second node link entries representing each of the plurality of second nodes and dynamically modifies the second node link tree so that the data packet transmission path to the first node is optimized.

22. A wireless network system as recited in claim 21, wherein at least one of the second nodes is a mobile device and said first node process further comprises:

logic comparing a selected link from one of the plurality of said second nodes to said first node to a current second node link entry in said second node link tree; and logic dynamically updating said second node link tree when said comparison meets predetermined conditions.

23. A wireless network system as recited in claim 21, wherein said first node process further comprises:

logic determining if one of the plurality of said second nodes is authentic;

logic determining if one of the plurality of said second nodes is already in said second node link tree if one of the plurality of said second nodes is determined to be authentic; and logic inserting one of the plurality of said second nodes in said second node link tree if one of the plurality of said second nodes is authentic and is not already in said second node link tree.

24. In a wireless system comprising a plurality of second nodes, each second node implementing a second node process including sending and receiving data packet via a second node wireless radio, maintaining a send/receive data buffer in a digital memory, and selecting a link to a first node that is one of a direct link to said first node and an indirect link to said first node through at least one of the remainder of said plurality of second nodes, a first node configured to implement a first node process, the first node process including:

receiving data packets via a first node wireless radio;

sending data packets via said wireless radio;

communicating with a network;

performing node link tree housekeeping functions;

maintaining a second node link tree having second node link entries representing each of the plurality of second nodes;

dynamically updating the tree to reflect the current operational status of the second nodes; and rerouting data packets around inactive or malfunctioning second nodes.

25. The first node of claim 24, wherein the first node process further includes:

comparing a selected link from one of the plurality of said second nodes to said first node to a current second node link entry in said second node link tree; and dynamically updating said second node link tree when said comparison meets predetermined conditions.

26. The first node of claim 24, wherein the first node process further includes:

determining if one of the plurality of said second nodes is authentic;

determining if one of the plurality of said second nodes is already in said second node link tree if one of the plurality of said second nodes is determined to be authentic;

deleting one of the plurality of said second nodes from said second node link tree if one of the plurality of said second nodes is authentic and is already in said second node link tree; and inserting one of the plurality of said second nodes in said second node link tree if said second node is authentic and is not already in said client link tree.

27. In a wireless system comprising a plurality of second nodes and a first node configured to implement a first node process, the first node process including receiving data packets via a first node wireless radio, sending data packets via said wireless radio, communicating with a network, performing node link tree housekeeping functions, maintaining a second node link tree having second node link entries representing each of the plurality of second nodes, dynamically updating the tree to reflect the current operational status of the second nodes, and rerouting data packets around inactive or malfunctioning second nodes, a second node in the plurality of second nodes, the second node configured to implement a second node process including:

sending and receiving data packet via a second node wireless radio;

maintaining a send/receive data buffer in a digital memory; and selecting a link to the first node that is one of a direct link to the first node and an indirect link to the first node through at least one of the remainder of the plurality of second nodes.

28. A method for providing wireless network communication comprising:

utilizing a first node process including a data packet reception step, a data packet transmission step, a network communication step, and a housekeeping step; and utilizing a plurality of second nodes, each providing a second node process including a data sending and receiving step, a send and receive data buffer maintenance step, and a link selection step that selects one of a direct link to said first node and an indirect link to said first node through at least one of the remainder of said plurality of second nodes; and utilizing the least number of other second nodes to provide the selected link so that the transmission path from one of the plurality of said second nodes to said first node is optimized, wherein the first node process further includes maintaining a second node link tree having second node link entries representing each of the plurality of second nodes.

29. A method of providing wireless network communication in a wireless network comprising a first node and a plurality of second nodes, the first node in communication with at least one of the plurality of second nodes, the second nodes implementing a second node process including a data sending and receiving step, a send and receive data buffer maintenance step, and a link selection step that selects one of a direct link to said first node and an indirect link to said first node through at least one of the remainder of said plurality of second nodes by analyzing the link between neighboring second nodes and the first node, the method comprising:
    implementing a first node process with a first node, the first node process comprising:
        receiving a data packet;
        transmitting a data packet;
        performing housekeeping functions; and
        dynamically updating a second node link tree having a second node link entries representing each of the plurality of second nodes.

30. A method as recited in claim 29, wherein said first node process further comprises:
    comparing a selected link tree from one of the plurality of said second nodes to said first node to a current second node link entry in said second node link tree; and
    dynamically updating said second node link tree when said comparison meets predetermined conditions.

31. A method as recited in claim 30, wherein said first node process further comprises:
    determining if said one of the plurality of said second nodes is authentic;
    determining if one of the plurality of said second nodes is already in said second node link tree if one of the plurality of said second nodes is determined to be authentic;
    deleting one of the plurality of said second nodes from said second node link tree if one of the plurality of said second nodes is authentic and is already in said second node link tree; and
    inserting one of the plurality of said second nodes in said second node tree if said second node is authentic and is not already in said client link tree.

32. A method of providing wireless network communication in a wireless network comprising a first node and a plurality of second nodes, the first node in communication with at least one of the plurality of second nodes, the first node implementing a first node process comprising receiving a data packet, transmitting a data packet, performing housekeeping functions, and dynamically updating a second node link tree having a second node link entries representing each of the plurality of second nodes, the method comprising:
    implementing a second node process with at least one of the second nodes, the second node process comprising:
        transmitting a data packet;
        receiving a data packet;
        selecting a link to the first node that is one of a direct link to the first node and an indirect link to the first node through at least one of the remainder of said plurality of second nodes by analyzing the link between neighboring second nodes and the first.

33. In a wireless network system comprising a plurality of second nodes each including a second node controller configured to implement a second node process that includes controlling a second node radio modem, receiving and transmitting data packets via said second node radio modem, and initiating a radio transmission path to a first node that is a direct link to said first node through at least one of the remainder of said plurality of second nodes, the first node comprising:
    a first node controller; and
    a first node radio modem,
    wherein said first node controller is configured to implement a first node process comprising:
        controlling said first node radio modem;
        receiving and transmitting data packets via said first node radio modem; and
        maintaining a second node link tree comprising second node link entries representing each of the plurality of second nodes.

34. A wireless network system as recited in claim 33, wherein said first node process further comprises:
    comparing a selected link from one of the plurality of said second nodes to said first node to a current second node link entry in said second node link tree; and
    updating said second node link tree when said comparison meet predetermined conditions.

35. A wireless network system as recited in claim 33, wherein said first node process further comprises:
    determining if one of the plurality of said second nodes is authentic;
    determining if one of the plurality of said second nodes is already in said second node link tree if one of the plurality of said second nodes is determined to be authentic; and
    inserting one of the plurality of said second nodes in said second node link tree if one of the plurality of said second nodes is authentic and is not already in said client link tree.

36. In a wireless network system comprising a plurality of second nodes and a first node, the first node comprising a first node controller and a first node radio modem, wherein said first node controller is configured to implement a first node process that includes controlling said first node radio modem, receiving and transmitting data packets via said first node radio modem, and maintaining a second node link tree comprising second node link entries representing each of the plurality of second nodes, at least one second node in the plurality of second nodes comprising:
    a second node controller configured to implement a second node process that includes controlling a second node radio modem, receiving and transmitting data packets via said second node radio modem, initiating a radio transmission path to a first node that is a direct link to said first node through at least one of the remainder of said plurality of second nodes.

37. A method for providing wireless network communication comprising:
    implementing in a first node a first node process including receiving data packets via R.F. transmission and sending data packets via R.F. transmission;
    implementing in each of a plurality of second nodes a second node process including sending and receiving data packet via R.F. transmission, maintaining a send/receive data buffer in digital memory, and selecting a transmission path to said first node that is one of a direct link to said first node and an indirect link to said first node through at least one of the remainder of said plurality of second nodes; and
    maintaining a second node link tree having second node link entries representing each of the plurality of second nodes at the first node.

38. A method as recited in claim 37, wherein said first node process further includes:
    comparing a selected link from one of the plurality of said second nodes to said first node to a second node link entry in said second node link tree; and
    updating said second node link tree when said comparison meets at least one of several predetermined conditions.

39. A method as recited in claim 37, wherein said first node process further includes:
    determining if one of the plurality of said second nodes is authentic;
    deleting one of the plurality of said second nodes from said second node link tree if one of the plurality of said second nodes is authentic and is already in said second node link tree; and
    inserting one of the plurality of said second nodes in said second node tree if said second node is authentic and is not already in said client link tree.

40. In a network including a plurality of client nodes having a client radio modem and a client controller which implements a client process including receiving and transmitting data packets via said client node to other nodes in the network, a server node comprising:
    a server node radio modem; and
    a server node controller implementing a server process, said server process configured to:
        receive information identifying selected transmission paths from each of the plurality of client nodes, wherein said transmission path is one of a direct link to the server node and an indirect link to said server node through at least one other client node;
        determine a server selected transmission path for each of the plurality of client nodes based on the selected transmission paths received from the plurality of client nodes;
        send information identifying the server selected transmission path for each of the plurality of client nodes to the respective client node; and
        maintain a client link tree having client link entries representing each of the plurality of client nodes.

41. The server node of claim 40, wherein the server process is further configured to perform gateway functions.

42. A server for use in a wireless network system including a plurality of clients each including a client controller and a client radio modem, said client controller implementing a client process that includes controlling said client radio modem, receiving and transmitting data packets via said client radio modem, wherein said client process of each of said clients initiates and selects a radio transmission path to said server that is one of a direct link to said server and an indirect link to said server through at least one the remainder of said plurality of clients, said server comprising:
    a server controller and a server radio modem, said server controller implementing a server process that includes the controlling of said server radio modem, receiving and transmitting of data packets via said server radio modem, maintaining a client link tree having client link entries representing each of the plurality of clients, and receiving information identifying the selected transmission path from each of the plurality of clients, determining a server selected transmission path for each of the plurality of clients based on the selected transmission paths received from the plurality of clients, and sending information identifying the server selected transmission path for each of the clients to the respective clients.

43. The server of claim 42, wherein said server selected transmission path for each of the plurality of clients is the transmission path utilizing the least number of client nodes.

44. The server of claim 42, wherein the client link entries correspond to the server selected transmission path between the server and the respective client.

45. A first node for use in wireless network system including a plurality of second nodes each including a second node controller implementing a second node process that includes controlling a second node radio modem, receiving and transmitting data packets via said second node radio modem, wherein said second node process of each of said second nodes includes initiating a radio transmission path to said first node that is a link to said first node through at least one of the remainder of said plurality of second nodes, said first node comprising:
    a first node controller and a first node radio modem, said first node controller implementing a first node process that includes controlling said first node radio modem, receiving and transmitting data packets via said first node radio modem, and dynamically updating a second node link tree comprising second node link entries representing each of the plurality of second nodes so that the data packet transmission path to the first node is optimized.

* * * * *